Figure 1:
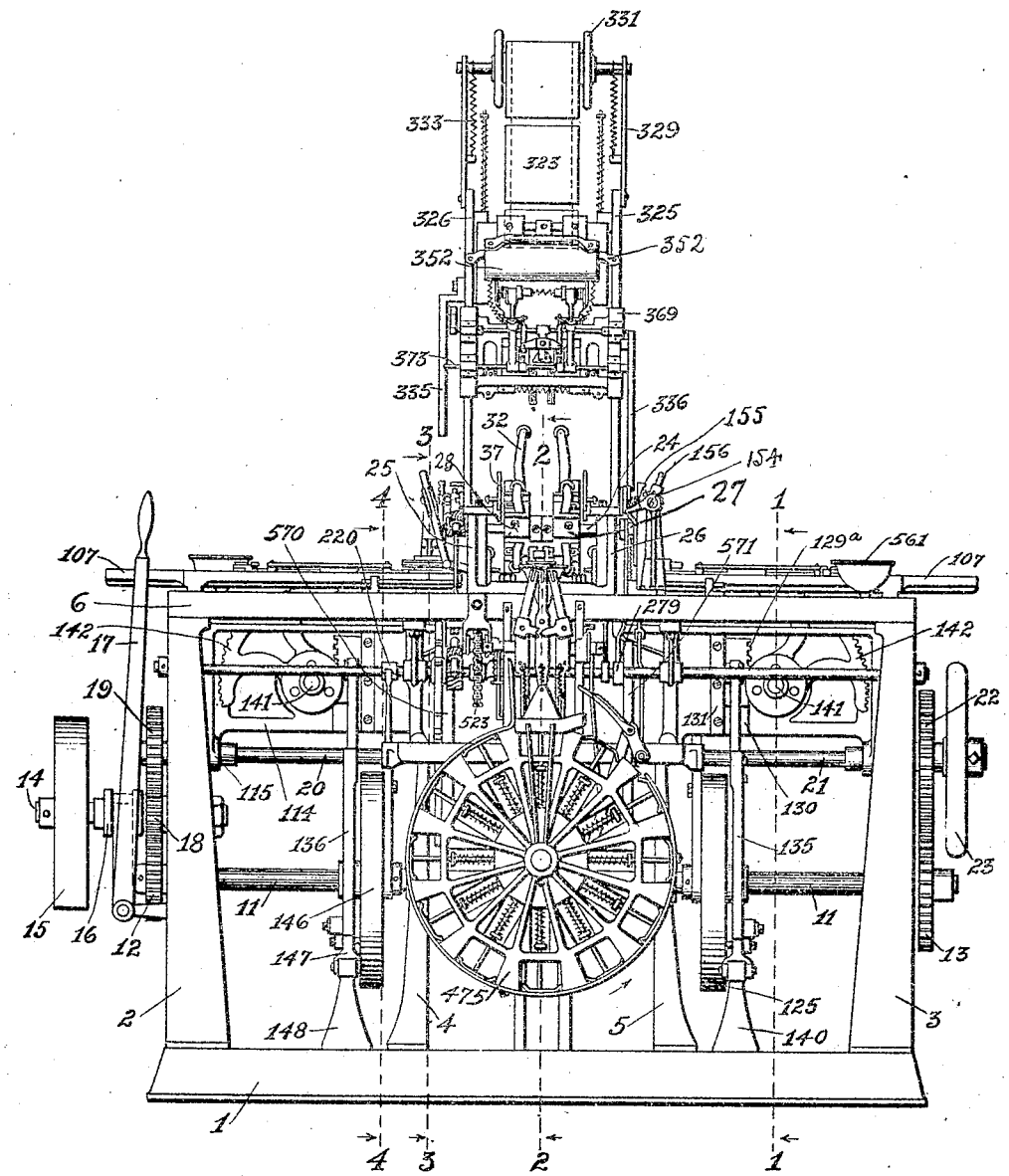

J. T. DALTON.
BAG STRINGING MACHINE.
APPLICATION FILED DEC. 31, 1909. RENEWED FEB. 9, 1912.

1,036,973.

Patented Aug. 27, 1912.
21 SHEETS—SHEET 4.

Witnesses

Inventor
John T. Dalton
by Nicholas L. Bogan
Attorney

J. T. DALTON.
BAG STRINGING MACHINE.
APPLICATION FILED DEC. 31, 1909. RENEWED FEB. 9, 1912.

1,036,973.

Patented Aug. 27, 1912.
21 SHEETS—SHEET 6.

Witnesses
Inventor
John T. Dalton
by Nicholas L. Bogan
Attorney

J. T. DALTON.
BAG STRINGING MACHINE.
APPLICATION FILED DEC. 31, 1909. RENEWED FEB. 9, 1912.
1,036,973.
Patented Aug. 27, 1912.
21 SHEETS—SHEET 7.
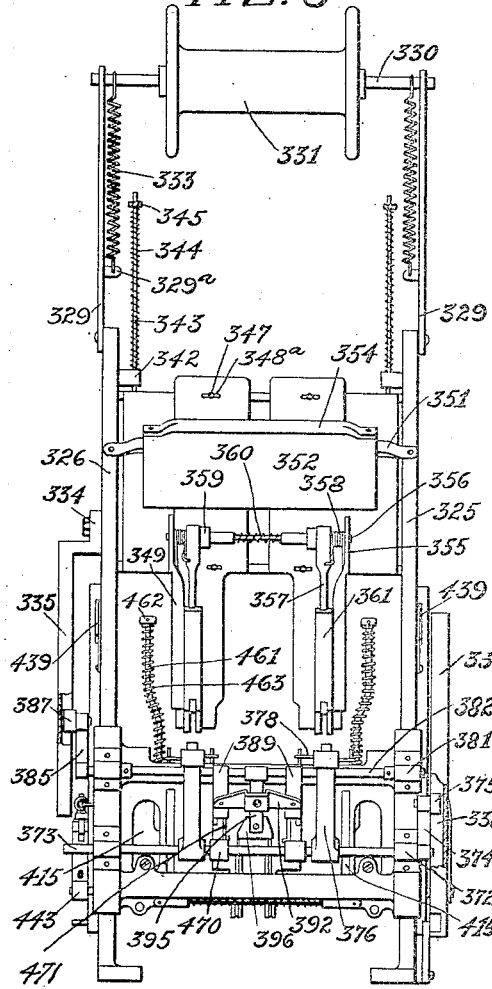
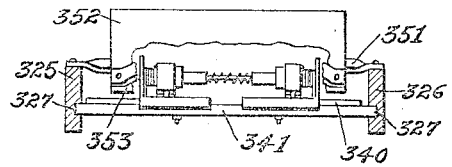
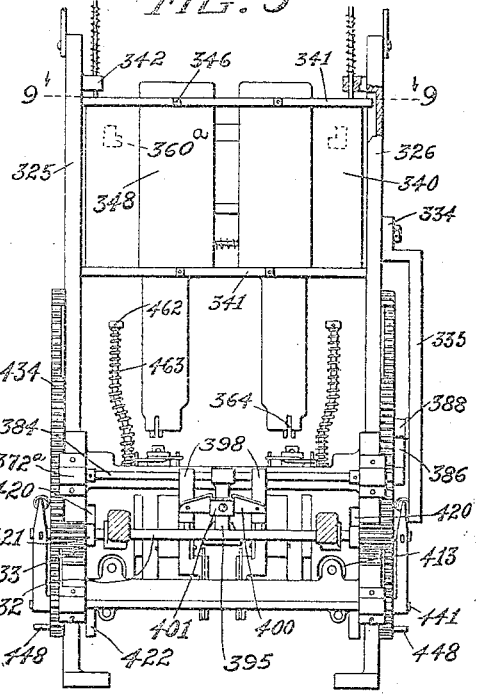
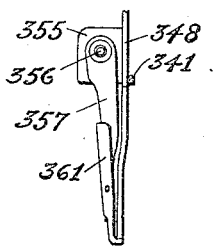
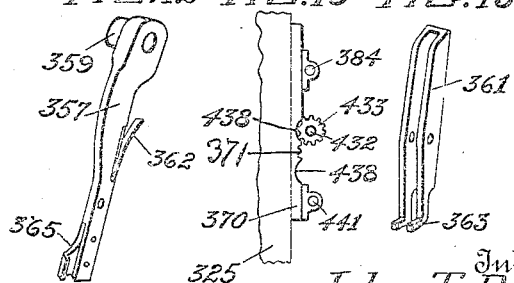
Witnesses
Inventor
John T. Dalton
by Nicholas L. Bogan
Attorney

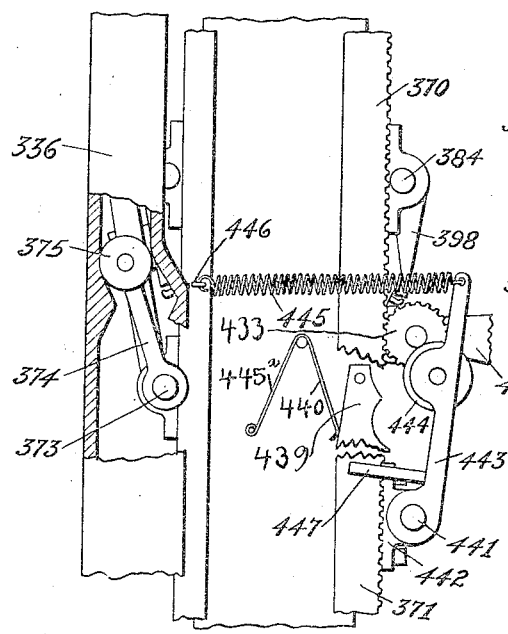
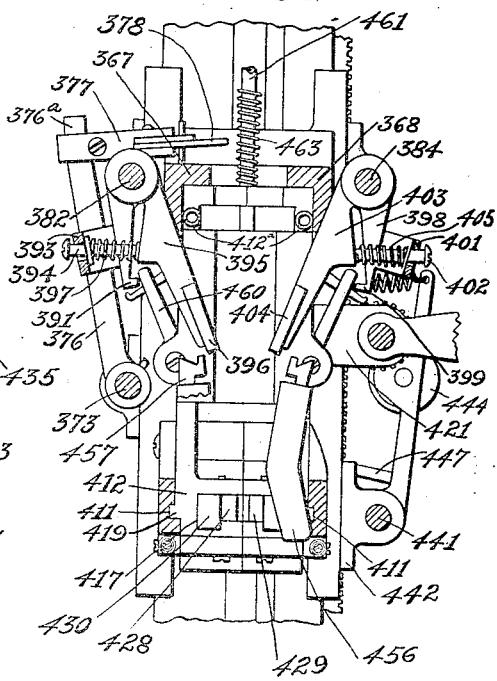
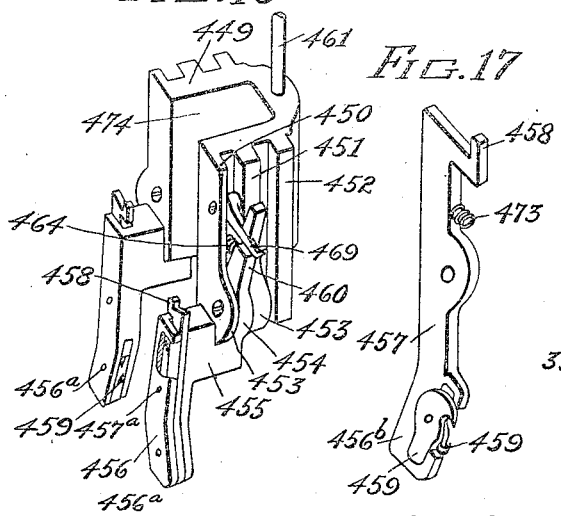
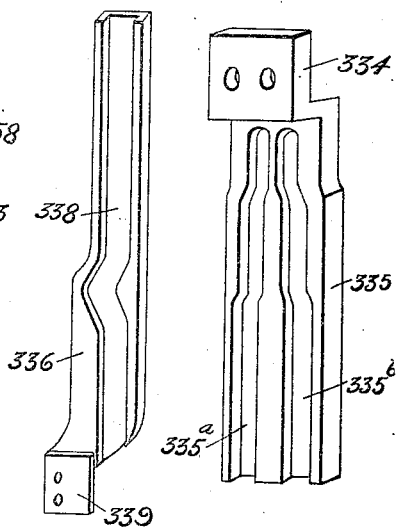

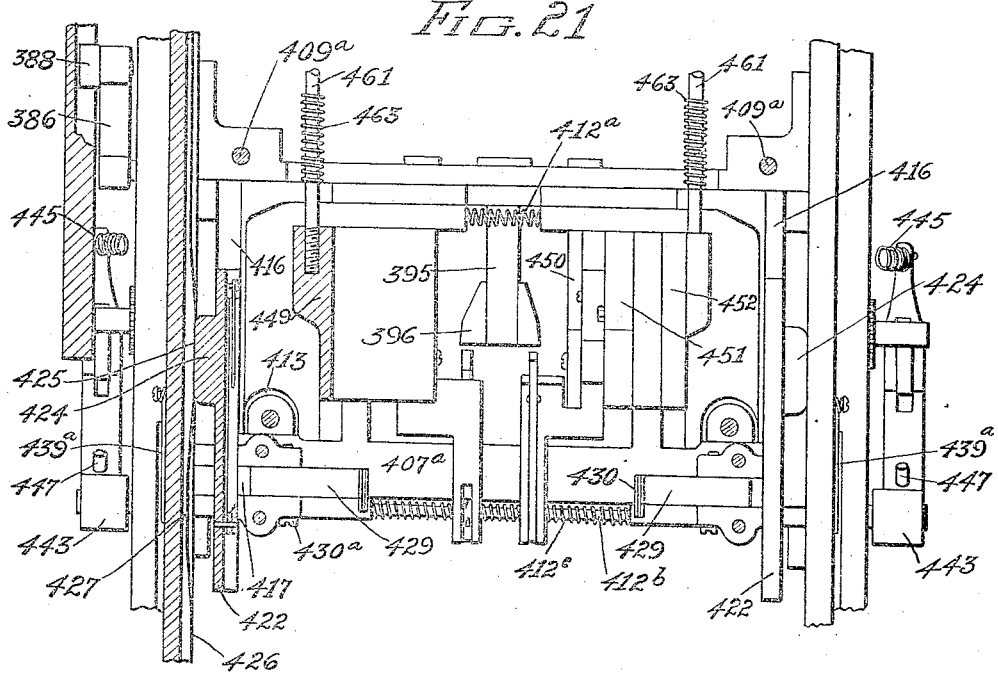
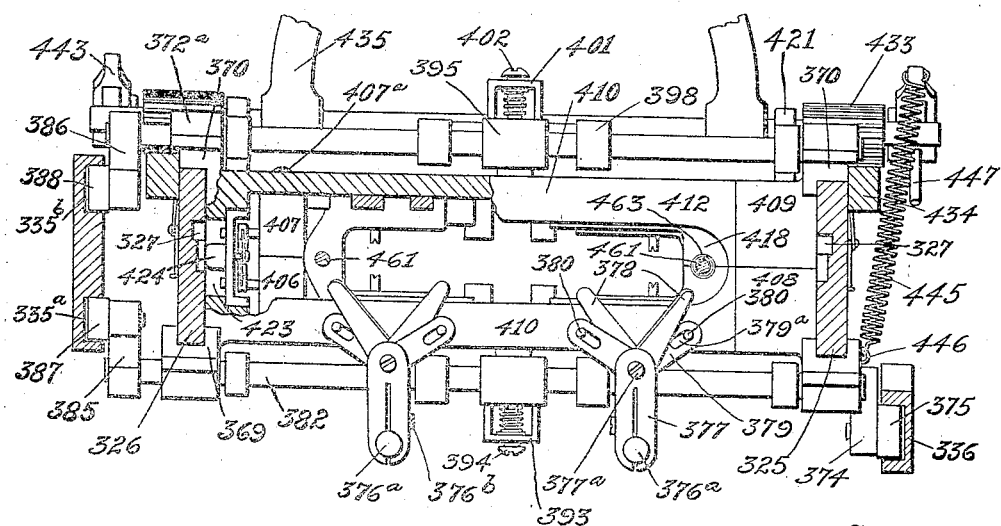

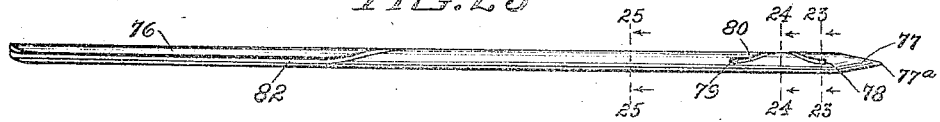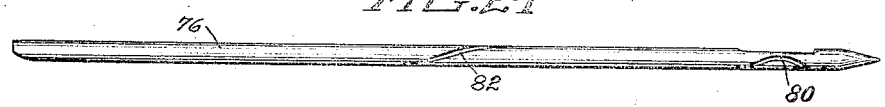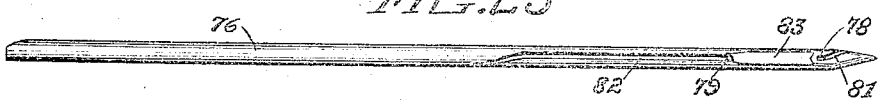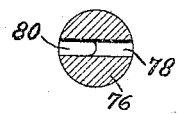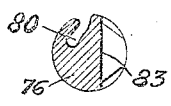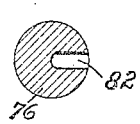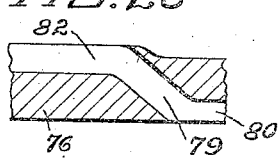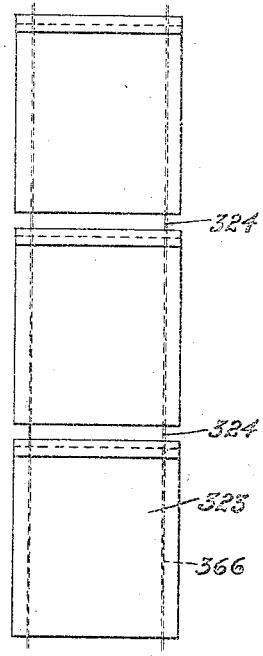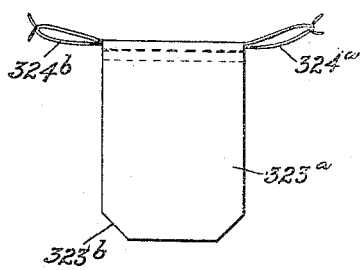

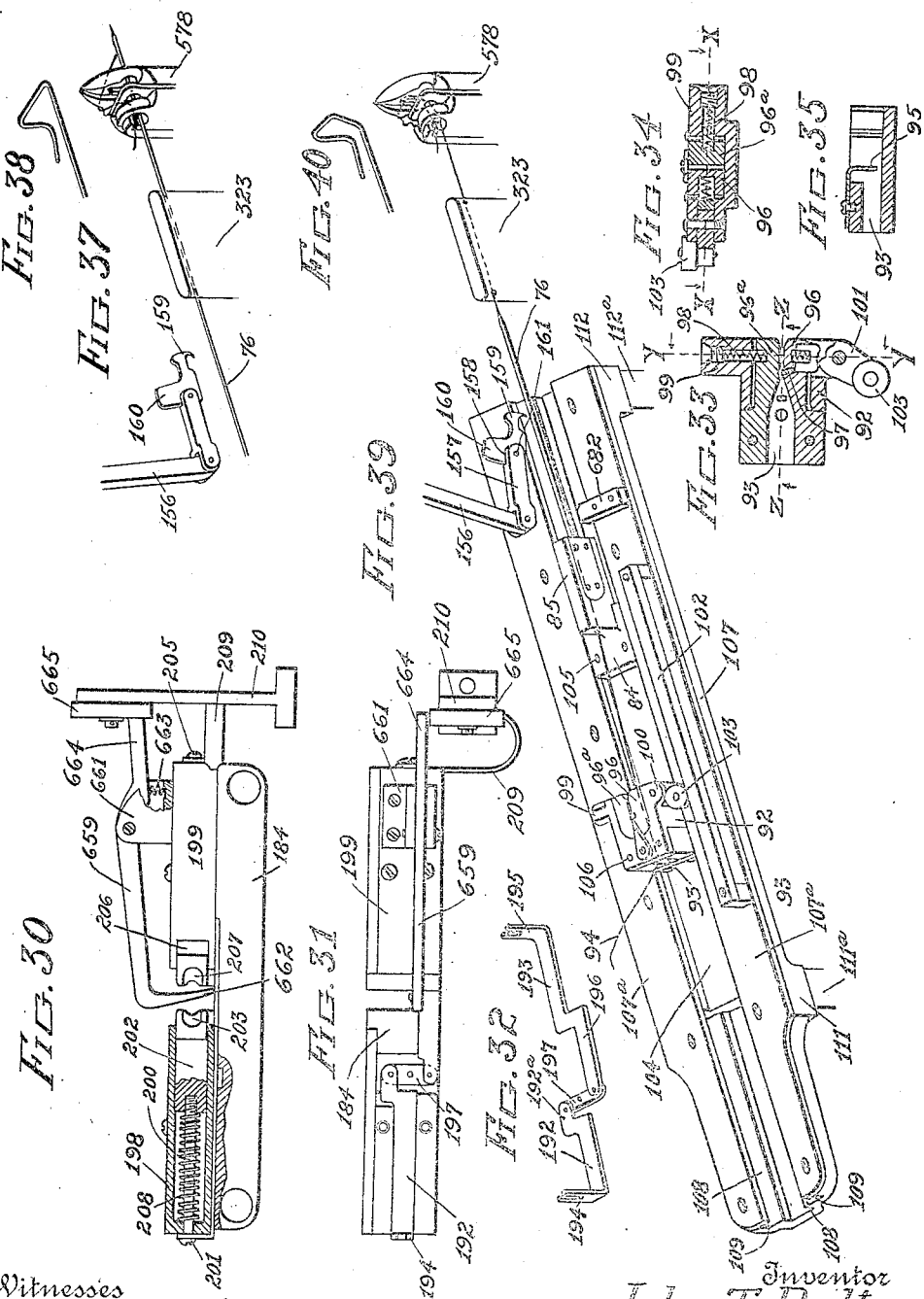

J. T. DALTON.
BAG STRINGING MACHINE.
APPLICATION FILED DEC. 31, 1909. RENEWED FEB. 9, 1912.
1,036,973.
Patented Aug. 27, 1912.
21 SHEETS—SHEET 12.
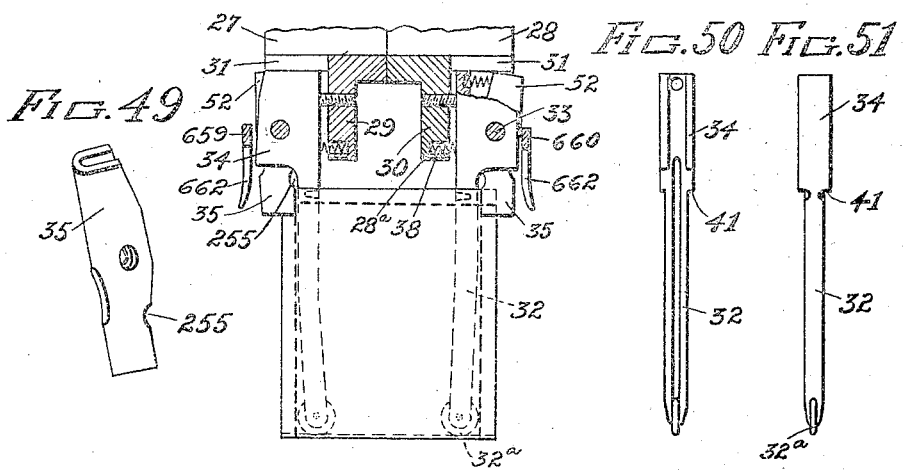
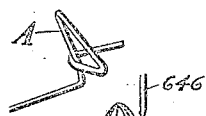
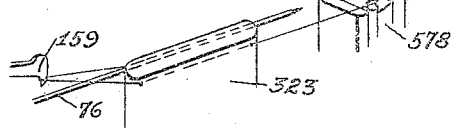
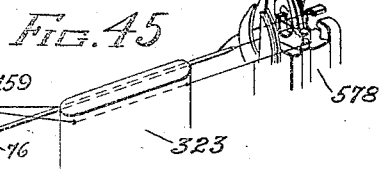
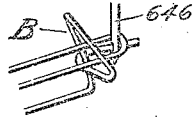
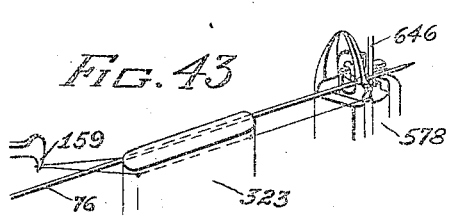
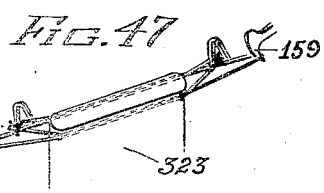
Witnesses
Inventor
John T. Dalton
by Nicholas L. Bogan
Attorney J. T. DALTON.
BAG STRINGING MACHINE.
APPLICATION FILED DEC. 31, 1909. RENEWED FEB. 9, 1912.

1,036,973.

Patented Aug. 27, 1912.

21 SHEETS—SHEET 13.

Witnesses

Inventor
John T. Dalton
by Nicholas L. Bogan
Attorney

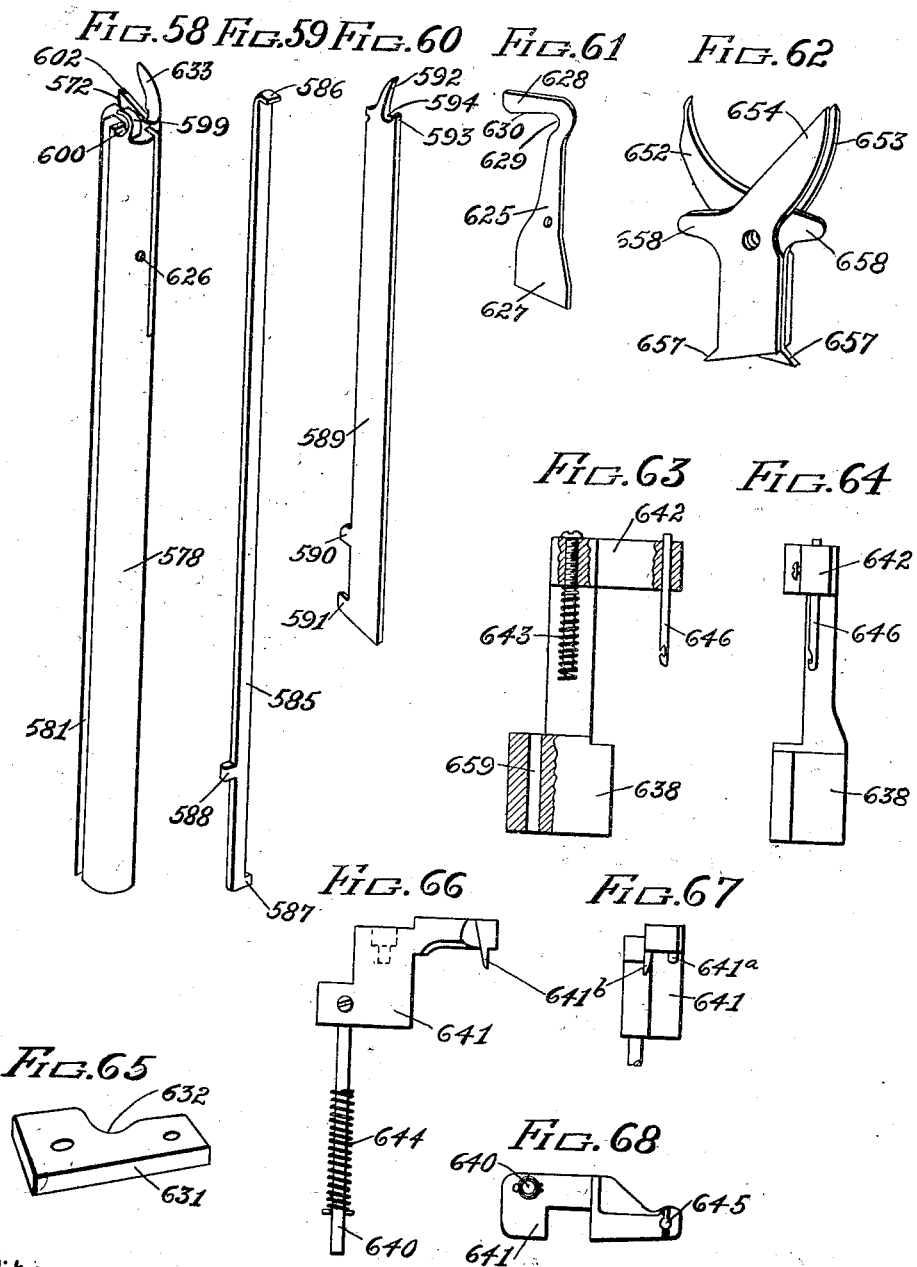

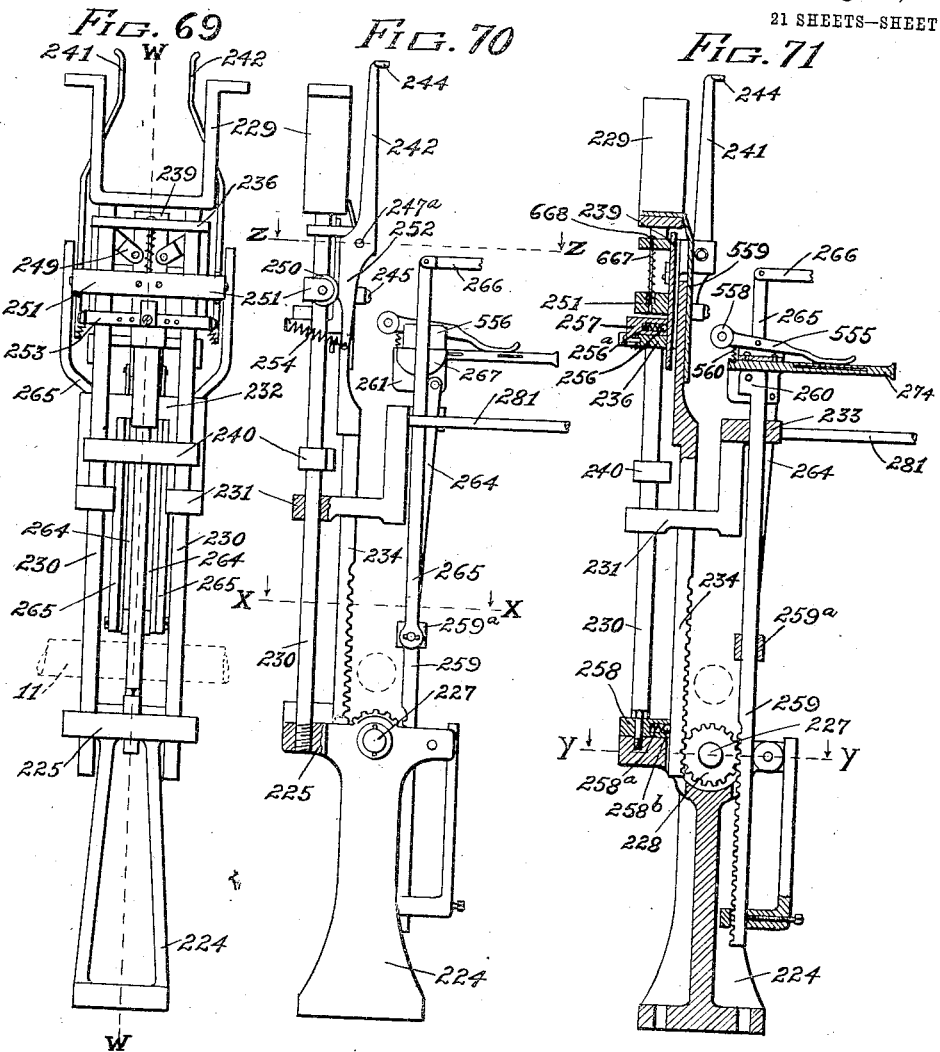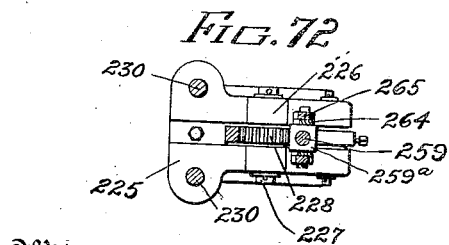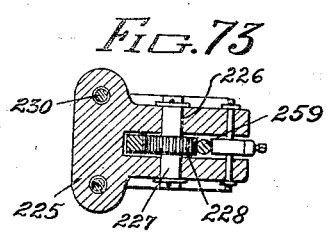

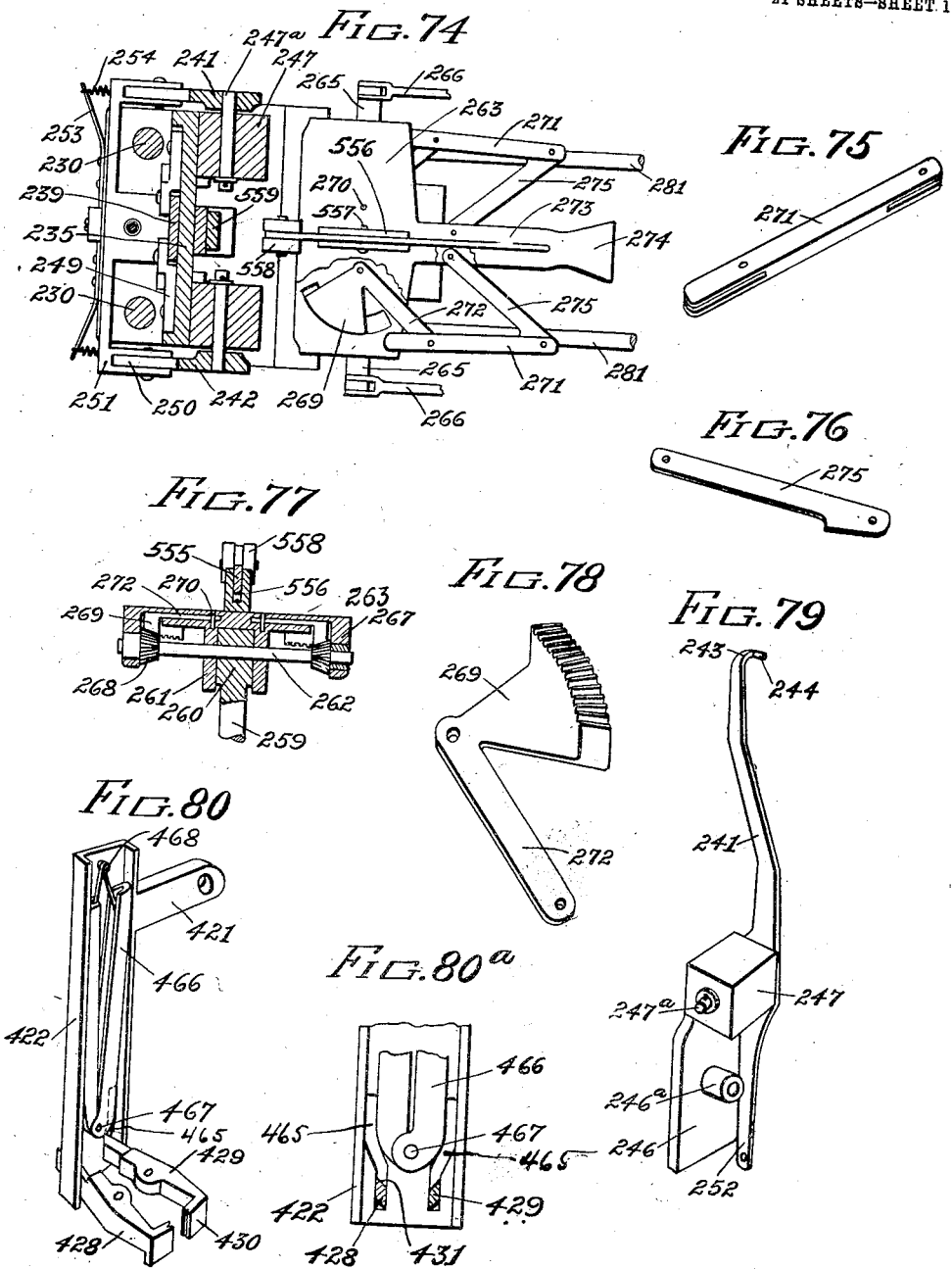

J. T. DALTON.
BAG STRINGING MACHINE.
APPLICATION FILED DEC. 31, 1909. RENEWED FEB. 9, 1912.
1,036,973.
Patented Aug. 27, 1912.
21 SHEETS—SHEET 17.
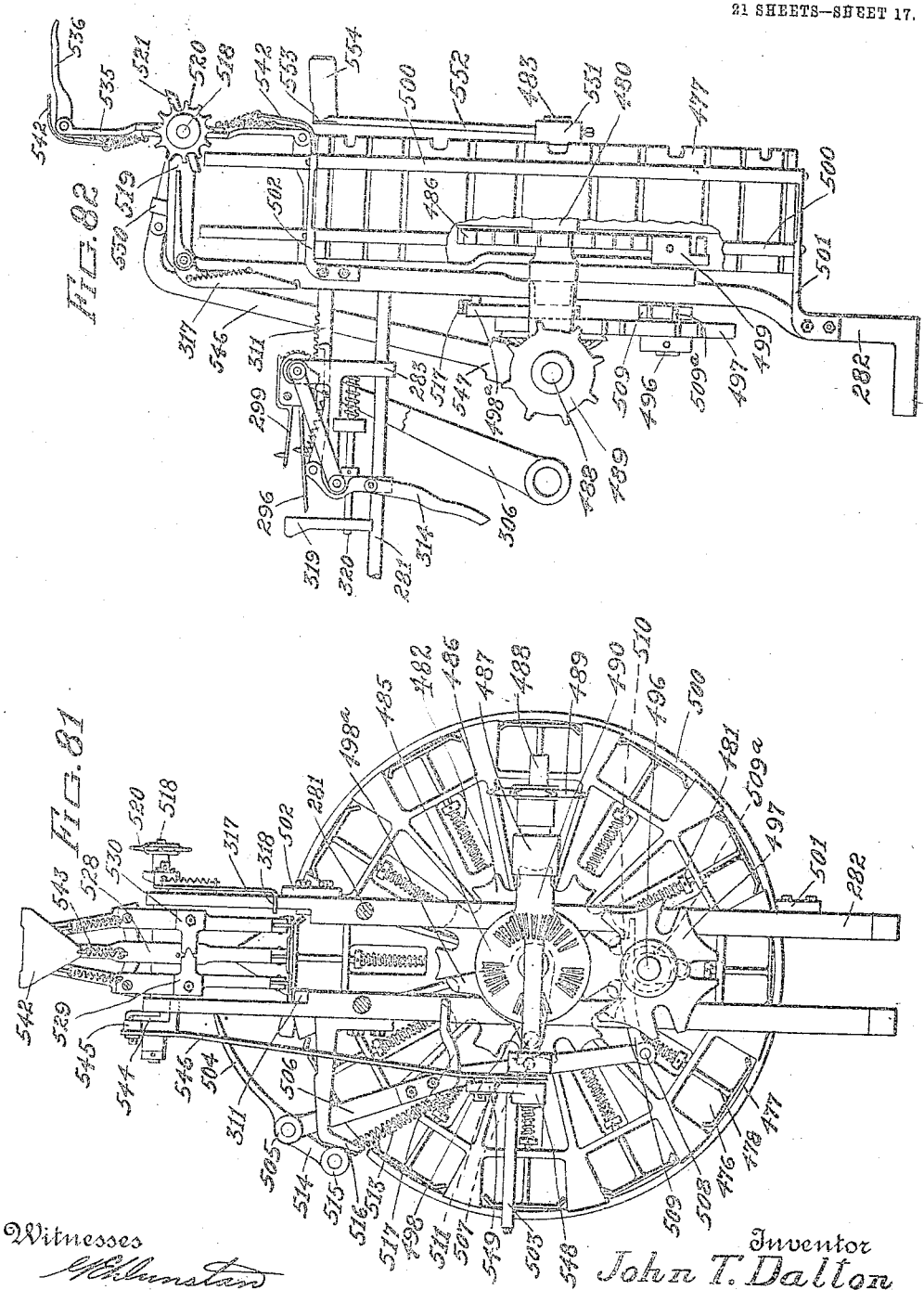
Witnesses
Inventor
John T. Dalton
by Nicholas L. Bogan
Attorney

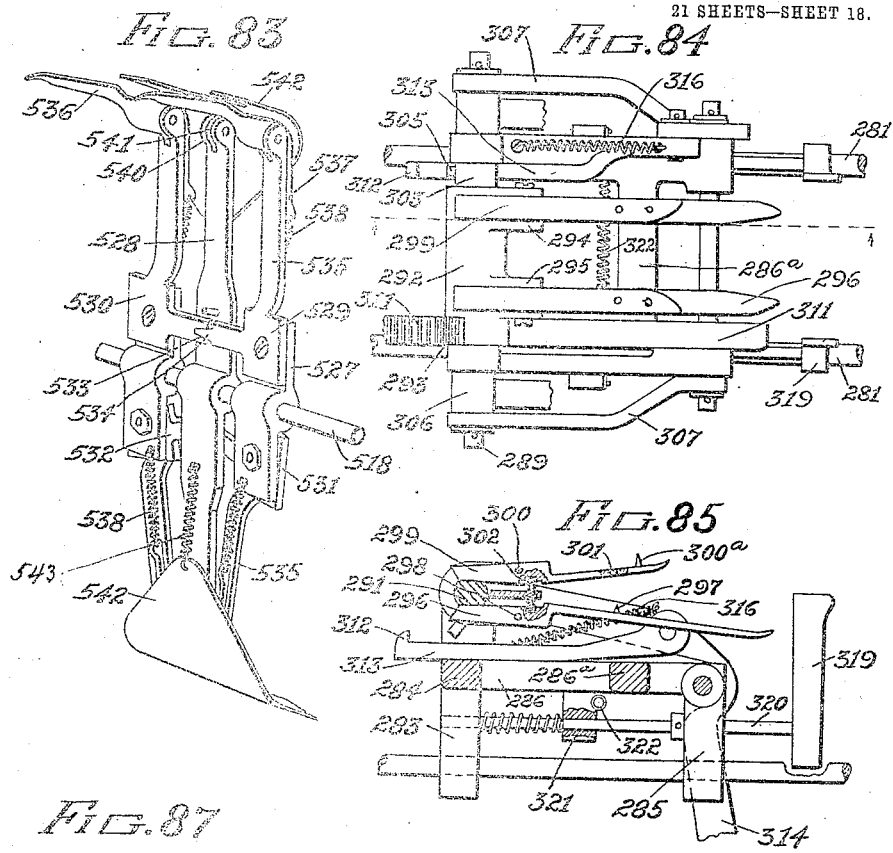

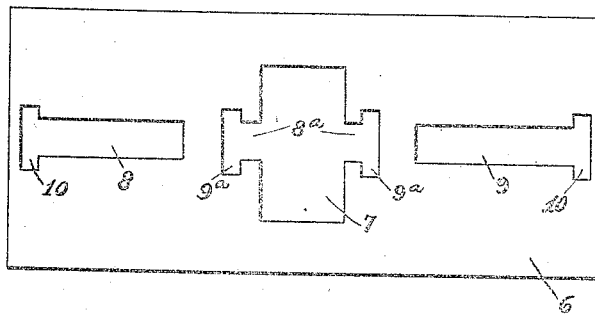
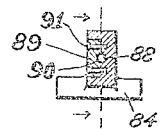
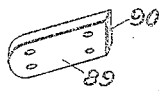
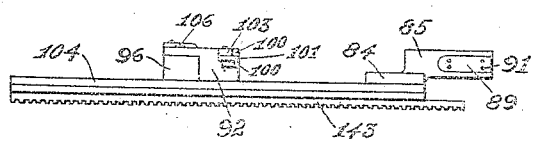
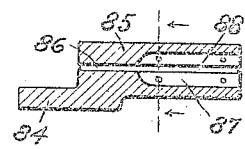
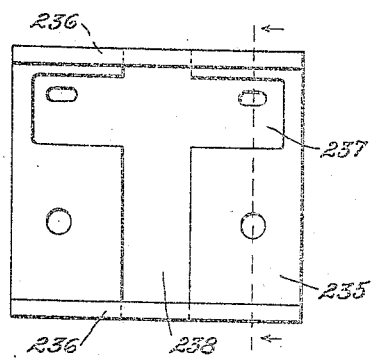
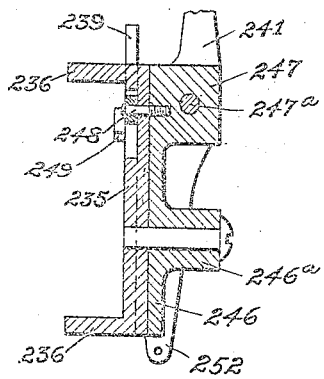

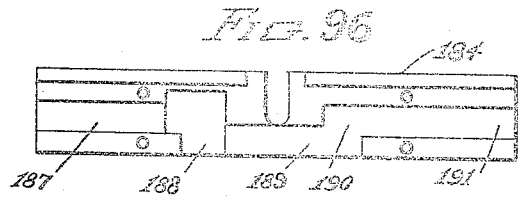
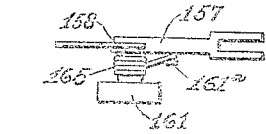
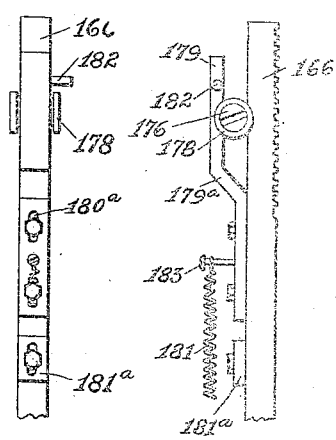
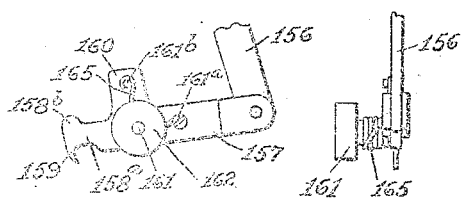
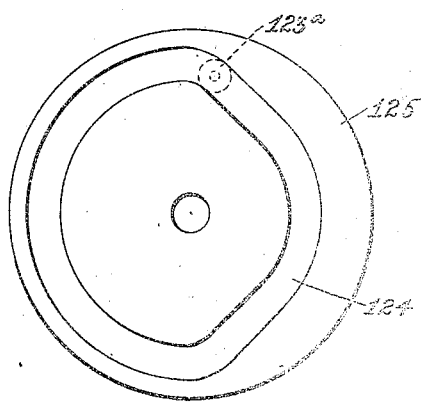
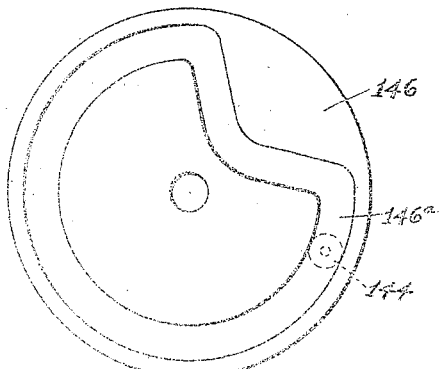

J. T. DALTON.
BAG STRINGING MACHINE.
APPLICATION FILED DEC. 31, 1909. RENEWED FEB. 9, 1912.
1,036,973.
Patented Aug. 27, 1912.
21 SHEETS—SHEET 21.
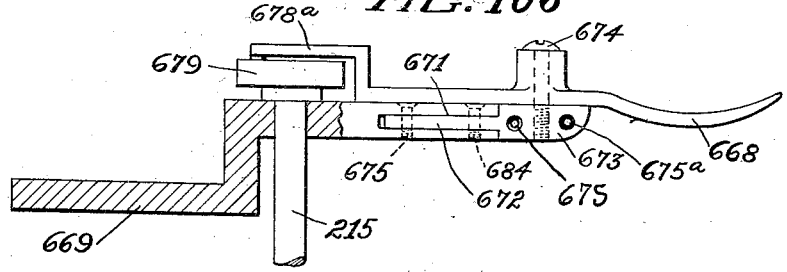
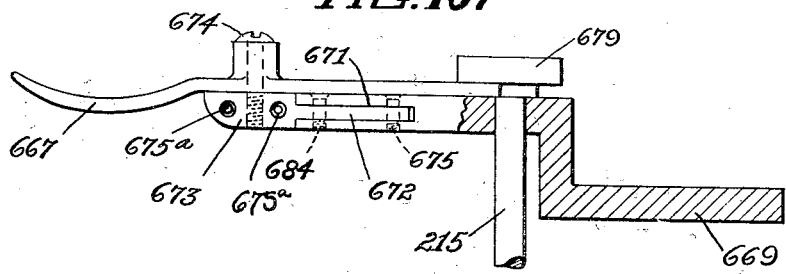
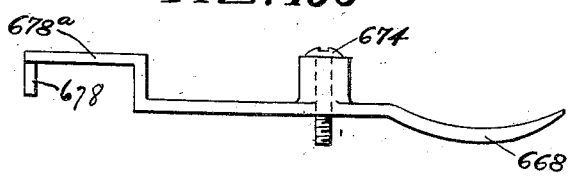
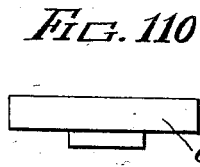
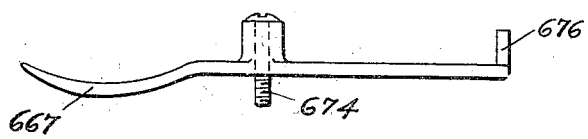
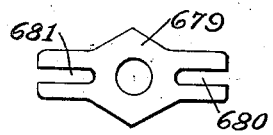
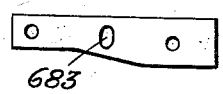
Witnesses
Inventor
John T. Dalton
By Nicholas L. Bogan
Attorney

UNITED STATES PATENT OFFICE.

JOHN T. DALTON, OF BALTIMORE, MARYLAND, ASSIGNOR TO THE AUTOMATIC BAG STRINGER COMPANY, OF BALTIMORE, MARYLAND, A CORPORATION OF WEST VIRGINIA.

BAG-STRINGING MACHINE.

1,036,973. Specification of Letters Patent. Patented Aug. 27, 1912.

Application filed December 31, 1909, Serial No. 535,893. Renewed February 9, 1912. Serial No. 676,691.

*To all whom it may concern:*

Be it known that I, JOHN T. DALTON, a citizen of the United States, residing at Baltimore, in the State of Maryland, have invented certain new and useful Improvements in Bag-Stringing Machines, of which the following is a specification.

This invention relates to bag stringing machines, particularly adapted for providing the mouth end of a tobacco bag with a pair of draw strings for closing the mouth of the bag and the object thereof is to provide a machine of such class with means for feeding and positioning a bag in the path of the line of travel of needle mechanisms whereby on the operation of the latter and the operation of knotter mechanisms there will be inserted in the bag at the mouth end thereof, a pair of strings extending at opposite directions with respect to each other and which are adapted when pulled in opposite directions with respect to each other to close the mouth end of the bag.

The machine is particularly designed for use in connection with the inserting at the mouth end thereof, of the form of fabric tobacco bags now in general use, a pair of draw strings, although it is to be understood, that the machine can be used for stringing any form of bag for which the machine is found applicable.

The invention further aims to provide a machine of the class referred to which will be automatic and accurate in action, strong, durable, efficient in its use, permitting in a convenient manner the removal of an injured element without knocking down the entire machine, and comparatively inexpensive to set up.

With the foregoing and other objects in view, the invention consists of the novel construction, combination and arrangement of parts as hereinafter more specifically described and illustrated in the accompanying drawings, wherein is shown one embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views, and in which—

Figure 2:
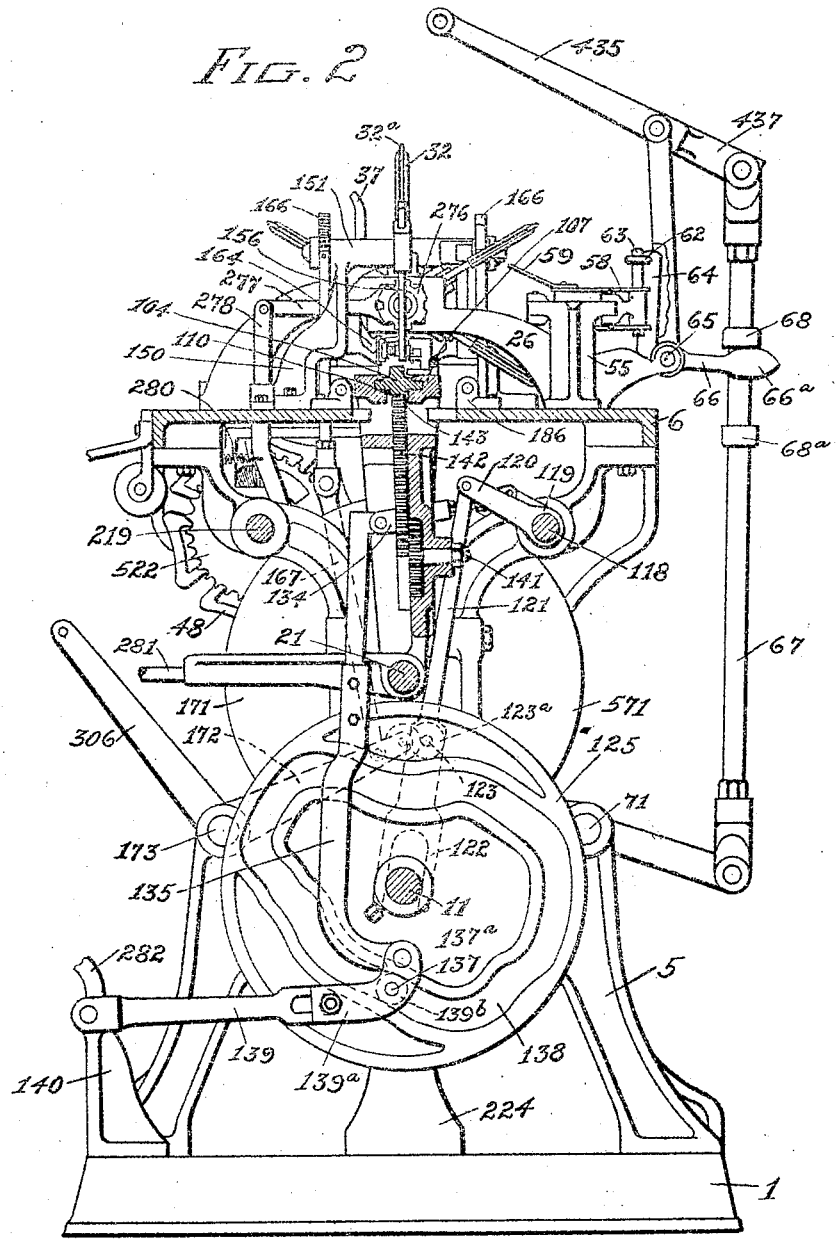
Figure 3:
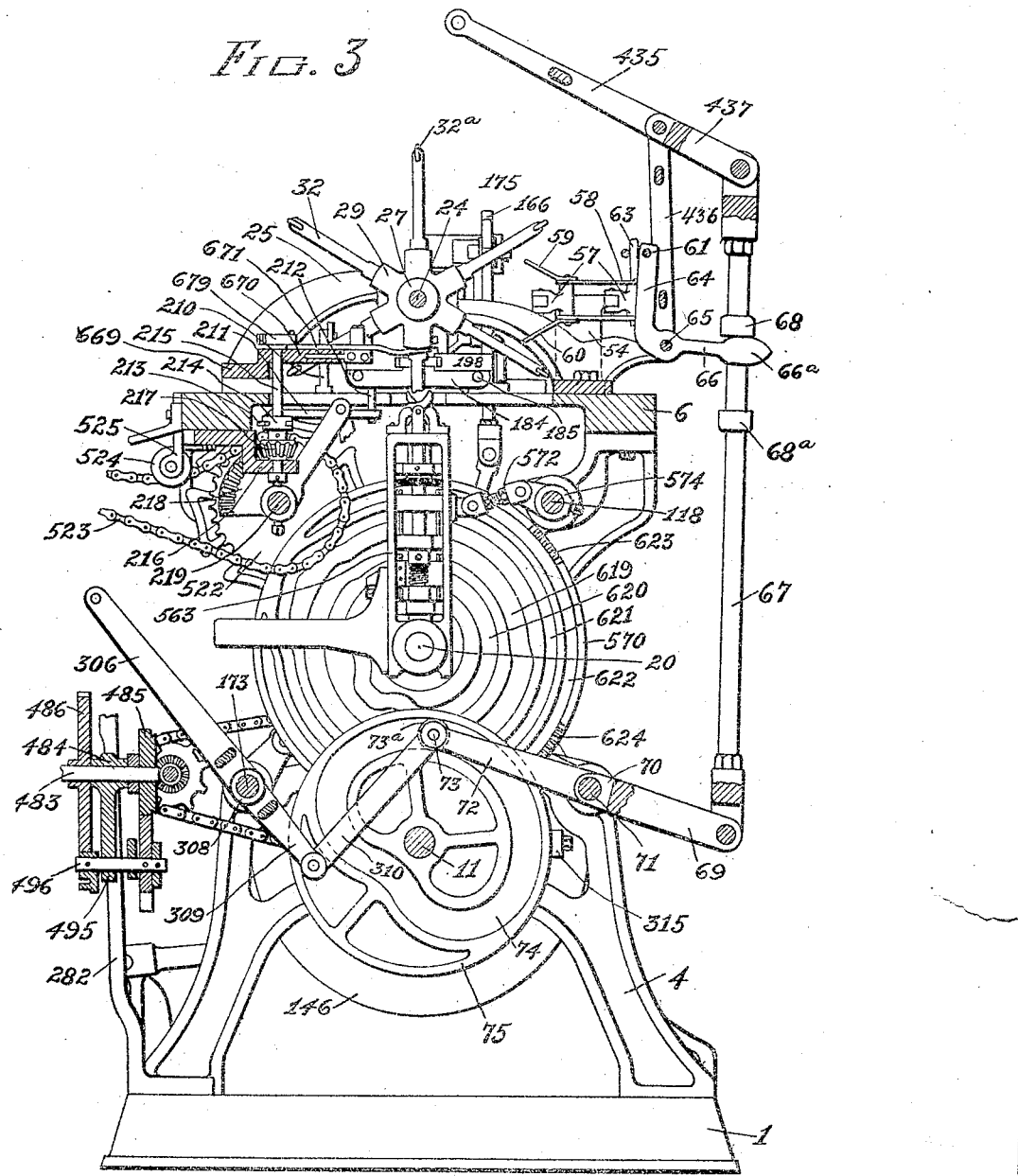
Figure 4:
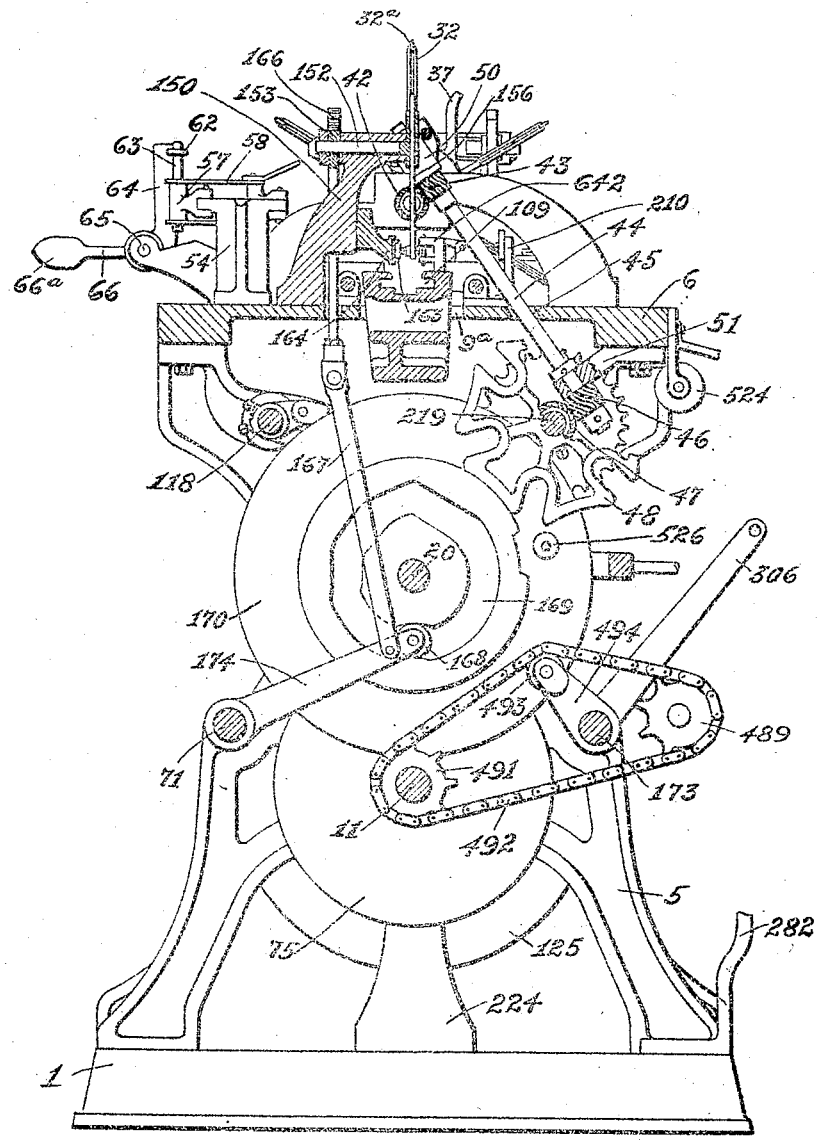
Figure 5:
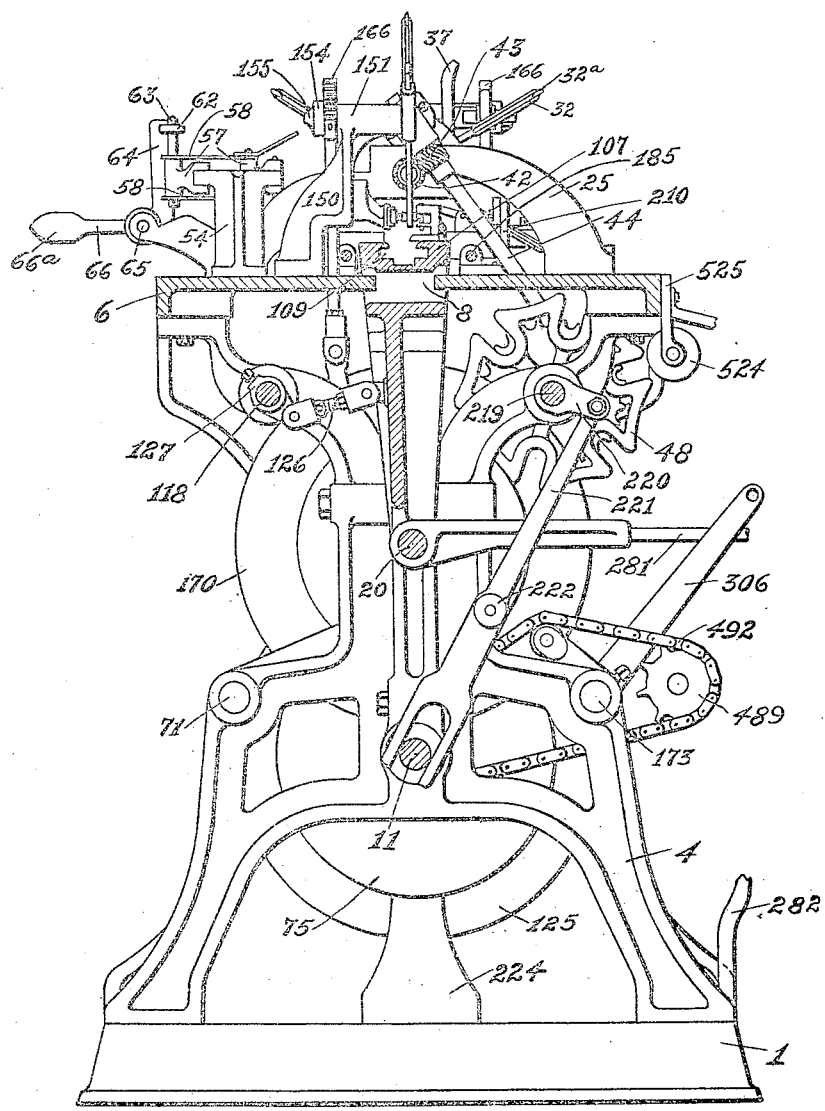
Figure 6:
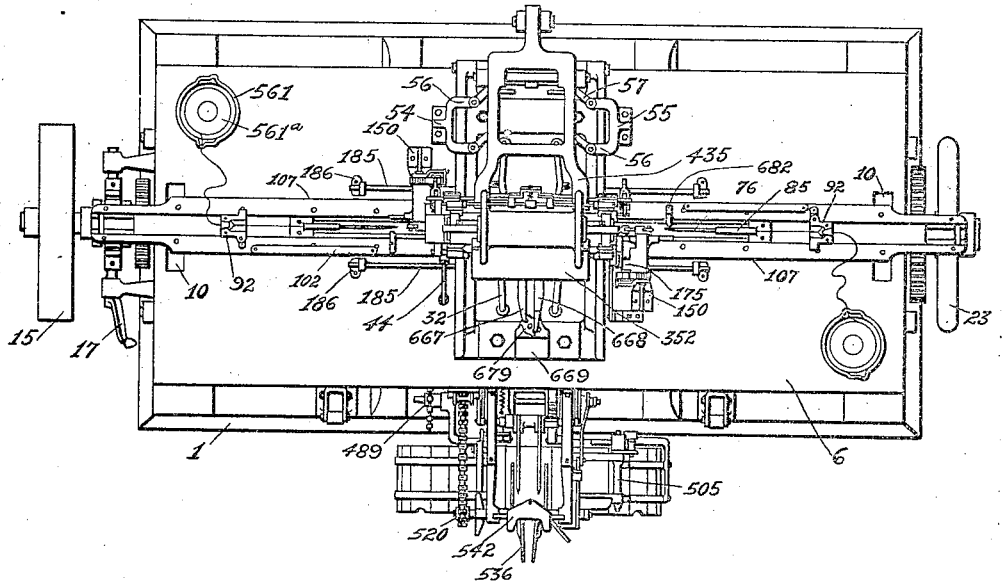
Figure 7:
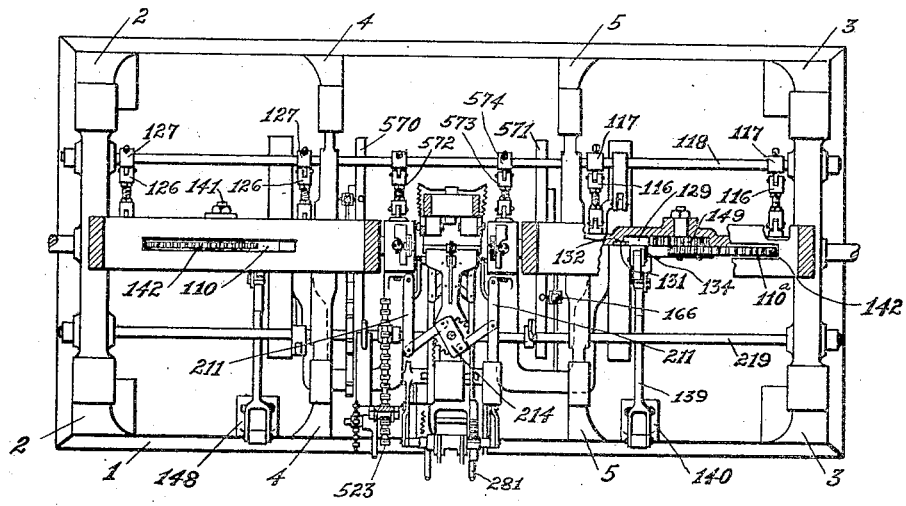
Figure 52:
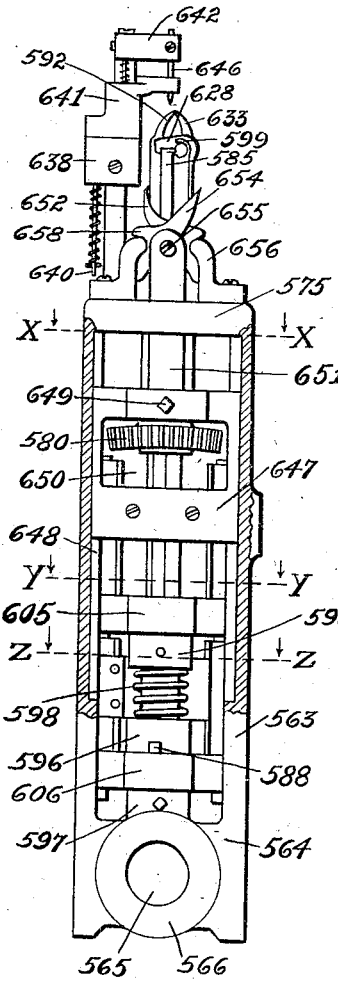
Figure 53:
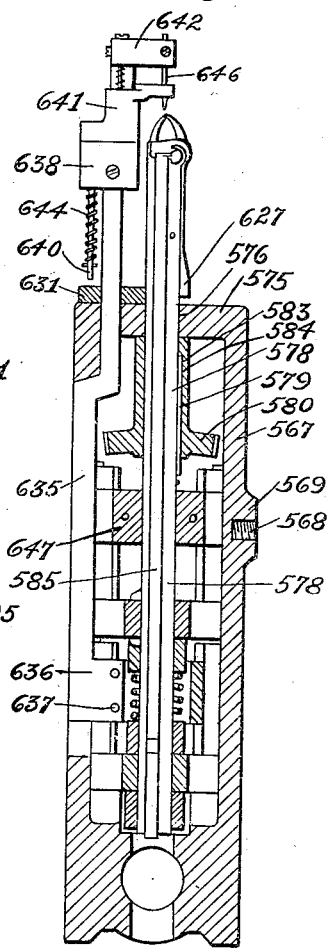
Figure 54:
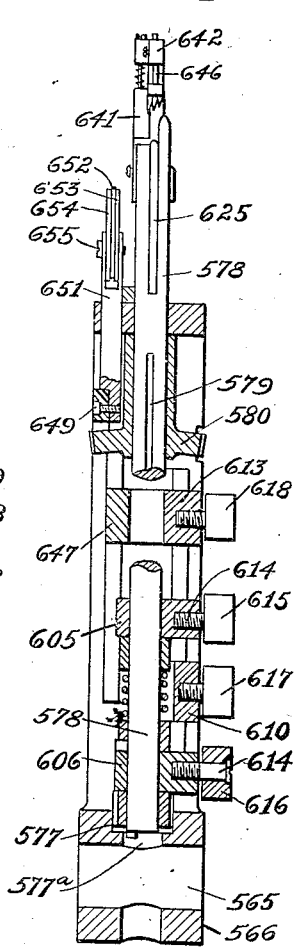
Figure 55:
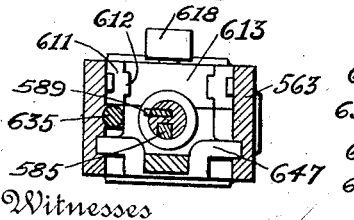
Figure 56:
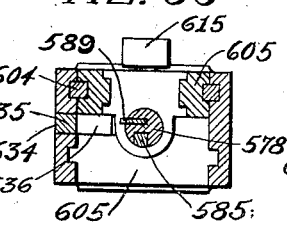
Figure 57:
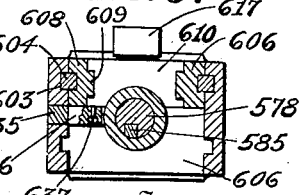

Figure 1 is a front elevation of a bag stringing machine in accordance with this invention, Fig. 2 is a section on line 1—1, Fig. 1 looking in the direction of the arrow, but also showing one of the elements for shifting a needle carriage in full and also with the bag feeding mechanism removed, Fig. 3 is a section on line 2—2, Fig. 1 looking in the direction of the arrow with certain of the elements at the front of the machine broken away and further with the bag turning mechanism removed and also with the bag feeding mechanism removed, Fig. 4 is a section on line 3—3, Fig. 1 looking in the direction of the arrow with the bag feeding mechanism removed and also the mechanisms at the front of the machine below the plane of the platform removed, Fig. 5 is a section on line 4—4, Fig. 1 looking in the direction of the arrow and with the bag feeding mechanism removed and also the mechanisms at the front of the machine below the plane of the platform removed, Fig. 6 is a top plan of the machine, Fig. 7 is a sectional plan of the machine, Fig. 8 is a front elevation of the bag feeding mechanism, Fig. 9 is a rear elevation of the bag feeding mechanism with the top thereof removed, Fig. 10 is a section on line 9—9, Fig. 9, Figs. 11, 12, 13 and 13ᵃ are details of the bag feeding mechanism, Fig. 14 is a sectional side elevation of the bag feeding mechanism broken away, Fig. 15 is a vertical sectional view of the bag feeding mechanism broken away at the top and bottom, Figs. 16, 17, 18 and 19 are perspective views of elements of the bag feeding mechanism, Fig. 20 is a detail of an element of the bag feeding mechanism, Fig. 21 is a sectional elevation of the bag feeding mechanism, Fig. 22 is a section plan of the bag feeding mechanism, Fig. 23 is a front elevation of the needle which carries the thread, Fig. 24 is a plan of the needle, Fig. 25 is a rear elevation, Fig. 26 is a section on line 23—23, Fig. 23, Fig. 27 is a section on line 24—24, Fig. 23, Fig. 28 is a section on line 25—25, Fig. 23, Fig. 28ᵃ is a longitudinal section broken away, Fig. 28ᵇ is an enlarged view of the end of the needle, Fig. 29 is a view of a chain of tobacco bags which are strung by the machine, Fig. 30 is a side elevation partly in section of a needle guide mechanism, Fig. 31 is a plan with a portion of the needle guide mechanism removed, Fig. 32 is a perspective view of an element of the needle guide mechanism, Fig. 33 is a section on line x—x, Fig. 34 of the thread feeding and holding device, Fig. 34 is a section on line y—y, Fig. 33 of the thread feeding and holding device, Fig. 35 is a section on line z—z, Fig. 33 of the thread holder and feeder, Fig. 36 is a view illustrating the needle carriage in side elevation, Fig. 37 is a perspective view illustrating the first step of the knot formation, also showing the arrangement of the knotter mechanism with respect to the bag and the needle entering the knotter mechanism, Fig. 38 is a perspective view illustrating the contour of the thread after the first step of the knot formation, Fig. 39 is a perspective view illustrating a needle holder, thread feeding and holding device, needle carriage and also showing a knotter mechanism arranged in operative relation with respect to a bag and with one end of the thread caught by the knotter after the needle has withdrawn from the bag which is the second step of the knot formation, Fig. 40 is a perspective view illustrating the position of the thread after the second step in the formation of the knot is completed, Fig. 41 is a perspective view illustrating the needle, bag and knotter during the formation of the third step in making the knot, Fig. 42 is a perspective view illustrating the arrangement of the thread after the completion of the third step of the knot formation, Fig. 43 is a perspective view illustrating the arrangement of the knotter, bag and needle in perspective at the fourth step of the knot formation, Fig. 44 is a perspective view illustrating the thread after the fourth step has been completed, Fig. 45 is a perspective view of the bag, knotter and needle at the last step of the knot formation, Fig. 46 is a perspective view showing the arrangement of the thread when the knot is drawn, Fig. 47 is a perspective view illustrating the changing the position of the ends of the draw strings after they have been completed, Fig. 48 is a sectional detail of the bag holding arms showing the bag in position for the reception of the threads, Fig. 49 is a perspective view of the gripper which associates with the bag holding arms, Figs. 50 and 51 are side elevations of the bag holding arms, Fig. 52 is a side elevation partly in section of the knotter mechanism, Fig. 53 is a vertical sectional view of the knotter mechanism, Fig. 54 is a vertical section at right angles to that of Fig. 53, Fig. 55 is a section on line x—x, Fig. 52 looking in the direction of the arrow, Fig. 56 is a section taken on line y—y, Fig. 52 looking in the direction of the arrow, Fig. 57 is a section taken on line z—z, Fig. 52 looking in the direction of the arrow, Figs. 58, 59, 60 and 61 are views in perspective of elements of the knotter mechanism, Fig. 62 is a perspective view of the cutter associating with the knotter mechanism, Figs. 63, 64, 65, 66, 67 and 68 are details of the knotter mechanism, Fig. 69 is a rear elevation of the bag stripping and turning mechanism, Fig. 70 is a side elevation, Fig. 71 is a section taken on line w—w, Fig. 69, Fig. 72 is a section taken on line x—x, Fig. 70 looking in the direction of the arrow, Fig. 73 is a section taken on line y—y, Fig. 71 looking in the direction of the arrow, Fig. 74 is an enlarged sectional view on line z—z, Fig. 70, Figs. 75 and 76 are details of the bag stripping and turning mechanism, Fig. 77 is a sectional detail of the bag stripping and turning mechanism, Fig. 78 is a detail in perspective of the bag stripping and turning mechanism, Fig. 79 is a perspective view of one of the strippers of the bag stripping and turning mechanism, Fig. 80 is a perspective view illustrating gripper elements of the bag feeding mechanism, Fig. 80$^a$ is a sectional elevation broken away of the gripper elements, Fig. 81 is a rear elevation of the bag receiving mechanism, Fig. 82 is a side elevation, Fig. 83 is a perspective view of the bag smoothing and holding means, Fig. 84 is a plan of the bag delivering mechanism, Fig. 85 is a section of the bag delivering mechanism, Fig. 86 is a perspective view illustrating the shaft of the bag delivering mechanism, Fig. 87 is a detail in perspective of the means for actuating the bag holding arm, Fig. 88 is a view illustrating the completed bag, Fig. 89 is a plan illustrating the platform of the machine frame, Figs. 90, 91 and 92 are details illustrating the needle holder, Figs. 93, 94 and 95 are details of the combined bag turner, stripper and stretcher mechanism, Fig. 96 is a plan illustrating the bar for supporting the pair of needle guides, Figs. 97, 98, 99, 100 and 101 are details of the looper mechanism, Figs. 102 and 103 are views of two of the cams, Figs. 104 and 105 are details of the bag delivering mechanism, Fig. 106 is a side elevation showing one, and Fig. 107 is a side elevation showing the other of the arms and its support of the bag holding arms spreading mechanism, Figs. 108 and 109 are views illustrating arms of the bag holding arms spreading mechanism, Figs. 110, 111 and 112 are details of the bag holding arms spreading mechanism.

Fabric tobacco bags as now manufactured are made in chains or lengths with the bags wrong side out and with each section of the bag at the mouth end formed with a hem. The bags in such condition are distributed to the stringers for the connecting to the mouth end of the bag by a manual operation, a pair of draw strings, after which the bags are manually turned right side out with the corners tucked in so that when the bags are filled with tobacco, the forming of sharp corners will be obviated. The manner in which the bags are received from the manufacturer, in chains or lengths, is illustrated by Fig. 29 of the drawing.

A machine in accordance with this invention is designed not only to connect to the mouth end of the bag a pair of draw strings for the purpose of closing the mouth ends when the strings are pulled in opposite directions, but also to feed the bags to the stringer mechanism, to turn the bags right side out, to provide the bag with the tucked in corners after the bag has been strung and turned, to deliver the completed bags from the machine, to smooth out the delivered bags and to arrange the delivered bags in packs containing a predetermined number.

A machine in accordance with this invention not only comprises a frame for supporting the various mechanisms, and what may be termed a primary operating mechanism, but also comprises a bag holding mechanism; a bag edge positioning mechanism, a bag feeding mechanism, shifting means for the bag edge positioning mechanism, and which further constitutes means for opening the bag feeding mechanism, a pair of reciprocatory and transversely shiftable needles, a pair of needle holders, a pair of thread feeding and holding devices, a pair of reciprocatory needle carriages, duplex operating mechanism for the needle carriages, a pair of loop forming mechanisms, a pair of duplex needle guide mechanisms, a combined bag turning, stretching and stripping mechanism, a locking mechanism for the bag holding mechanism, bag retaining means, a pair of knotter mechanisms, a pair of string positioning and loop releasing mechanisms, a bag stripping mechanism, a bag delivering mechanism, and bag receiving, smoothing and pack forming mechanisms.

The term thread hereinafter used, is employed as a generic one to cover cord, thread, twine, string or any suitable means which may be employed for the formation of a pair of draw strings or members at the mouth end of a bag.

*Machine frame.*—All the various mechanisms constituting the machine are supported by the machine frame and the said frame consists of a base 1 provided at each end with an upright, the uprights being indicated by 2, 3, and are connected to the base 1. Secured to the base and arranged intermediate the uprights 2, 3 are a pair of vertically-disposed supports 4, 5 which are suitably spaced apart. The support 4 opposes the upright 2 and the support 5 opposes the upright 3. Mounted upon the top of the said uprights and supports is a platform 6 having a transversely-extending rectangular opening 7 at the center thereof and a pair of longitudinally-extending elongated slots 8, 9. The platform 6 is furthermore provided with oppositely disposed recess $8^a$ merging into the opening 7 and also into transversely-extending openings $9^a$. The slot 8 extends in an opposite direction with respect to the slot 9, and each of said slots terminates in a transversely-extending opening 10 at its outer end, the openings 10 being positioned in proximity to the ends of the platform 6.

*Primary operating mechanism.* (Figs. 1 to 5.)—The function of this mechanism is to drive the various elements of the machine and the said operating mechanism consists of a longitudinally-extending transmission shaft 11 which is journaled in the lower portion of the uprights and supports as well as projecting from each of the uprights. The end of the shaft 11 which projects from the upright 2 carries a gear wheel 12 and that end of the shaft 11 which projects from the upright 3 carries a gear wheel 13 of greater diameter than the gear wheel 12. Mounted in the upright 2 is a stud 14 carrying a pulley 15 adapted to be connected to a prime mover and the said stud 14 has also mounted thereon a clutch 16 for coupling the pulley 15 to a pinion 18 loose on the stud 14. A clutch actuating lever 17 is pivoted to the upright 2 and engages with the clutch 16 for actuating the clutch when occasion so requires. The pinion 18 meshes with the gear wheel 12 on the shaft 11 and also with a gear wheel 19 fixed to the projecting end of a driven shaft 20 which is journaled in the upright 2 and support 4 and projects from the inner face of said support. Journaled in the upright 3 and in the support 5 and projecting beyond the inner face of the said support 5 is a driven shaft 21, which also projects outwardly from the upright 3 and carries a gear wheel 22, which meshes with the gear wheel 13 and the said end of the shaft 21 which projects from the support 5, is also provided with a hand wheel 23 for manually actuating the operating mechanism when occasion so requires. From the foregoing construction and arrangement of parts it is evident that when the pulley is clutched to the pinion 18 the driven shafts 20 and 21 will be actuated in opposite directions with respect to each other.

*Bag holding mechanism.* (Figs. 1, 2, 3, 4, 5, 38, 49, 50, 51.)—The function of this mechanism is to receive the bags from the bag feeding mechanism and to position and hold the bags with the mouth end thereof in the path of the needles, so that the thread can be inserted in position to provide the mouth end of the bag with a pair of draw strings. The bag is mounted upon the bag holding mechanism wrong side out, and after the strings have been inserted, the bag is removed from the bag holding mechanism and during its removal it is turned right side out and stretched by the strippers and combined bag turner and stretcher to be hereinafter referred to and when removed from the holding mechanism and turned right side out, has its corners tucked in, as shown in Fig. 88. This is the usual arrangement of a tobacco bag before it is filled, as the tucked in corners of the bag prevent, after the bag is filled sharp corners. The bag holding mechanism comprises an intermittently operable shaft 24 which extends over the opening 7 and is supported above said opening and above the platform 6 by the transversely-extending spaced supports 25 and 26 which are secured to the upper face of the platform 6 by suitable hold fast devices. Mounted upon the shaft 24 is a pair of sleeves 27, 28 (Fig. 1) which abut against each other and are keyed to the shaft 24. Each of said sleeves is provided with a circumferentially-disposed and radially-extending series of protuberances, (best shown in Fig. 3) the protuberances which project from the sleeve 27 being indicated by the reference character 29 and the protuberances which project from the sleeve 28 being indicated by the reference character 30 (see Fig. 48). The protuberances 29 and 30 are recessed as at 31 to provide sockets, each having one side open. The sockets of the protuberances 30 are oppositely-disposed with respect to the sockets of the protuberances 29 (Fig. 48) and in each of said sockets 31 is pivotally-mounted a bag holding arm 32 which is pivotally-connected as at 33 to its respective protuberance and each of said bag holding arms at its inner end is formed with a right angularly-disposed bifurcated extension 34, in which extends a gripper 35. Each of the arms 32 has its outer end provided with a roller 32ª to facilitate the passage of the bag thereon. The bifurcated extensions 34 of each series of arms 32 project outwardly from the socket 31 and in the path of the curved offset 36 formed on a spring-controlled trip 37 (Figs. 87 and 1) and said offset portion when in engagement with the bifurcated extension swings the arm 32 inwardly on its pivot 33 against the action of a spring 38, seated in a pocket 28ª formed in the protuberance and the said arm 32 is maintained in such position until the trip 37 is actuated by an element of the bag feeding mechanism, whereby the lower end of the arm 32 is released and the spring 38 forces said arm 32 outwardly toward the gripper 35, so that the arm 32 and the gripper 35 will secure the bag upon the bag holding arm. The bag holding arms carried by the sleeve 27 are arranged opposite the arms carried by the sleeve 28 and by such disposition of the bag holding arms they are arranged in pairs. Two trips 37 are provided and they are pivotally connected to the plates 39 fixed to the supports 25, 26. The springs which are employed to maintain the trips 37 in operative position are indicated by the reference character 40 and one end of the said springs 40 are connected to the trips 37 and the other ends to the plates 39. The function of the trips 37 are to force the bag holding arms of each pair toward each other, so that when a bag is fed to a pair of arms, the arms will readily enter the mouth end of the bag, the bag being moved upon the arms by the bag feeding mechanism until the edges of the bag are arranged in close proximity to the shoulders 41 (Fig. 50) formed at a point in proximity to the bifurcated extension of each of the arms 32. The bag when moved to a position in close proximity to or against the shoulder 41, will extend between the grippers 35, so that when the trips 37 are actuated to release the arms of a pair, the said arms will be caused to swing in an opposite direction through the medium of the springs 38 and the bag will then be gripped in position upon the pair of bag holding arms between the inner portion of the arms and the grippers. The thickness of the grippers 35 with respect to the thickness of the arms 32 is such, that the grippers will be positioned inwardly of the sides of the arms 32 so as to not interfere with the operation of the needles when connecting the string at the mouth end of the bag. The bags are positioned upon the pair of bag holding arms when the arms of each pair assume a vertical position so as to lie in the path of the bag feeding mechanism which operates in a vertical direction.

The shaft 24 projects from the support 25 and is provided with a worm pinion 42 (Fig. 4) which engages with a worm gear 43 carried on the upper end of an upwardly-extending inclined transmission shaft 44, which projects through an opening 45 in the platform 6 and is provided on its lower end with a worm gear 46, which meshes with a worm pinion 47 carried by a Geneva element, 48, mounted on a rock shaft 219, which is journaled in the upper portions of the uprights 2, 3 and supports 4, 5. A bearing for the upper end of the shaft 44 is indicated by the reference character 50, and a bearing for the lower end of the shaft 44 is indicated by the reference character 51. The Geneva element 48 is loose upon the rock shaft 219 and is actuated intermittently in a manner as hereinafter set forth.

As before stated, the holding arms 32 are swung inwardly by the offsets 36 of the trips 37, so as to allow of the arms 32 to conveniently enter the mouth end of the bag and which also permits of the mouth end of the bags being moved to a position on the arms in proximity to or against the shoulders 41, to facilitate the positioning of the mouth end of the bags, the grippers 35 are rocked outwardly on their pivots, the pivots for the holding arms being the same as that for the grippers, and to cause the rocking outwardly of the grippers, when the holding arms are moved from a vertical position, the inner portions 52 of the grippers project beyond the protuberances carried by the sleeves and the said extending portions 52 of the grippers are adapted to be engaged by the lugs 53, whereby the grippers are rocked on their pivots. The lugs 53 are carried by the plates 39 and arranged in a plane below the offsets 36 of the trips 37 and are also arranged in the path of the portions 52 of the grippers as the arms are carried to a vertical position.

*Bag edge positioning mechanism.*—The function of this mechanism is to position the edges of the bags at the mouth end in parallelism with respect to each other when occasion so requires, so that the threads to form the strings will always be inserted through both hems of the bag simultaneously, and to furthermore, so dispose the free edges of the bag so they will always be in the path of the needles to receive the thread. The bag edge positioning mechanism is best shown in Figs. 2 to 6, and the said mechanism is arranged at the rear of the platform 6 and is partly arranged over the opening 7 and is adapted to be projected in the path of the bag holding arms 32. The bag edge positioning mechanism is so set up that it will operate upon two bags simultaneously, the outer side of an upper bag and the inner side of a lower bag, that is to say, assuming that side of the bag which faces the front of the machine when the bag is positioned by the feeding mechanism upon a pair of bag holding arms to the outer side and the side that faces the rear of the machine the inner side. The bag edge positioning mechanism consists of a pair of vertically-disposed brackets 54, 55 arranged exteriorly of the inner ends of the supports 25 and 26 and each of the brackets 54, 55, is formed at its top with a pair of inwardly-extending right angularly-disposed angle-shaped arms 56 (Fig. 6) to each of which is pivotally-connected a link 57 (Figs. 3 and 4). Each pair of links 57 are connected together by transversely-extending superposed arms 58 and to the upper of said arms is attached an upwardly inclined pusher 59 and to the lower of said arms is secured a downwardly inclined pusher 60 (Fig. 3). The pushers 59 operate upon the inner side of the bag so as to shove the edge thereof in proximity to or against the shoulders 41 and the pushers 60 operate upon the outer side of the bag so as to shove the edge thereof in proximity to or against the shoulders 41 of the bag holding arms 32. The pairs of pushers are normally out of the path of the bag holding arms, are operated simultaneously and are swung in the path of the bag holding arms 32, so as to position the edges at the mouth end of the bags in parallelism and after performing their function are moved out of the path of the bag holding arms 32. The operation of the bag edge positioning mechanism is had when the bag holding mechanism is temporarily arrested in its movement and during the positioning of a bag in a pair of bag holding arms and during the stringing of a bag. The pairs of pushers are operated simultaneously by an arm 61 having a loop 62 at each end. The loops 62 have extending therethrough the vertically-disposed lugs 63, which project from the rear links of the pairs of links 57, and the said arm 61 is connected to the arm 64 of a bell crank lever mounted upon a longitudinally-extending shaft 65, secured in the rear ends of the supports 25 and 26. The other arm of the bell crank lever is indicated by the reference character 66 and which is bifurcated for straddling a shifting means therefor to be hereinafter referred to.

*Shifting means for the bag edge positioning mechanism and which further constitutes means for operating the bag feeding mechanism.* (Figs. 2 to 5.)—The said shifting means consists of a vertically-operable rod 67, provided with a pair of collars 68, 68ª, between which is arranged the bifurcated end 66ª of the arm 66 of the bell crank, the rod 67 extending through the end 66ª so that during the vertical movement of the rod 67, the collar 68ª engaging with the end 66ª of the arm 66, will rock the bell crank, so the arm 64 will move toward the front of the machine carrying the arm 61 therewith, shifting the arms 58 in the same direction, swinging the links 57 outwardly on their pivots and move the pushers 59 and 60 to engage the bags and aline the edges at the mouth edge or in other words will shift the bag edge positioning mechanism to operative position to perform its function and on the downward movement of the rod 67 the collar 68 will engage the end 66ª of the arm 66, and shift the arm 64 outwardly, whereby a reverse operation will be had, which will move the bag edge positioning mechanism to an inoperative position and out of the path of the bag holding arms 32. The lower end of the rod 67 is pivotally-connected to a link 69, projecting from a rocking member 70 mounted upon a shaft 71, which is fixed in the lower portion of the supports 4, 5. Projecting inwardly from the member 7 is a pair of lever arms 72, to which are connected pins 73, having rollers 73ª traveling in cam grooves 74, formed on the inner faces of the disks 75 fixed to the transmission shaft 11. It is evident from the foregoing construction that when the transmission shaft 11 is rotated, the disks 75 will be carried therewith and as the rollers 73ª travel through the grooves 74, it is evident that the lever arms 72 will be shifted, rocking the member 70 and vertically moving the rod 67, whereby the bag edge positioning mechanism will be shifted to and from operative position.

*The reciprocatory and transversely-shiftable needles.* (Figs. 23 to 28.)—Two needles are employed, for the reason that two threads are inserted to form a pair of strings; the needles reciprocate in an opposite direction with respect to each other, but both operate upon the bag at the same time. While one needle is passing through the hem at one side of the mouth end of the bag, the other needle is passing through the opposite hem, both needles eventually pass through both hems of the bag but always in opposite direction with respect to each other. As the construction of both needles is the same, but one needle will be described, the same reference characters being applied to both. Of course, it is evident that the shank of the needle is of the desired length and which is indicated by the reference character 76. The needle point is indicated by the reference character 77 and is somewhat elongated and terminates in an end of greater taper than the remaining portion of the point as at 77ª, the eye of the needle is indicated by the reference character 78 and the needle is provided at a point removed from the eye with an opening 79 through which the string extends after which it passes through a curved groove 80 and then through the eye 78. The point of the needle at its inner terminus is formed with an inclined groove 81 so as to direct the string below the plane of the needle point. The shank of the needle from the opening 79 to its rear end is formed with a spiral groove 82 which constitutes a guide for the string. That side of the needle opposite the side which is formed with the curved groove 80 is flattened as at 83 to provide a clearance for the operation of an element of the knotter to be hereinafter referred to.

*Needle holder.* (Figs. 36 and 39.)—The function of the holder is to maintain the needle in a longitudinal position with respect to the platform 6 and the said holder consists of a plate 84 provided centrally with a vertically-disposed and longitudinally-extending arm 85 provided with an opening 86 for the passage of the string. The opening 86 extends only a portion of the length of the arm 85 and terminates at a milled portion 87 of said arm 85, the portion 87 is formed on one face with a longitudinal groove 88 for the reception of the needle shank. The milled portion 87 is of greater length than the shank of the needle. The arm 85 overlaps the top and bottom of a securing plate or clamp 89 positioned against the grooved face of said arm 85 and which has formed on its inner face a groove 90 which registers with the groove 88, said groove 90 also receives the needle shank. The retaining member 89 is secured to the arm 85 by the hold-fast devices 91 and abuts against one end of the milled portion. The grooves 88 and 90 form a continuation of the opening 86. By the foregoing elements the needle is fixedly secured in position. Two holders are employed, one for each needle.

*Combined string or thread feeding and holding device.* (Figs. 33, 34, 35 and 39.)—Two combined thread feeders and holders are employed, one for each needle and the function of which is to feed a certain length of thread from a thread supply and then permit the necessary length of thread to be taken up by the needle and after which hold the thread to prevent any additional thread being fed to the needle until occasion so required. The combined thread feeders and holders are arranged in parallelism with respect to the needle holders, but spaced therefrom, and each of the said combined feeders and holders consists of a housing 92, open at one end as at 93 and through the said end enters the thread 94, the thread passing through the guide 95 which is supported by the housing 92. Arranged within the housing 92 is a pair of pivoted grippers 96, 96ª, between which extends the thread 94 and which are adapted to be shifted transversely with respect to the housing so as to grip the thread and hold it from further feed to the needle. To assist in the gripping of the thread, the gripper 96 is provided with a grip 97 on its inner face, which when the holders are shifted to clamping position grips the thread 94 against the inner face of the gripper 96ª. The grippers are maintained in an inoperative position through the medium of a transversely-extending spring 98, carried by an extension 99, projecting at right angles with respect to the housing 92 and bearing against the gripper 96ª, the action of the spring 98 being such as to force the grippers to one side of the housing 92, the thickness of the forward ends of the grippers with respect to the housing providing for such movement, but the tension of the spring 98 is such as not to prevent the feed of the thread 94 when the holders are in an inoperative position, such position being when the grippers are forced by the spring 98 of the housing. To move the grippers 96, 96ª to operative position, so as to clamp the thread to prevent any further feed thereof, the housing 92 is formed with a pair of right angularly-disposed lugs 100, between which is pivoted a clamping lever 101, which engages the gripper 96, and which when shifted in one direction, will force the grippers to that side of the housing in which is arranged the spring 98 and when the grippers are retained in such shifted position, they will grip the thread 94 to prevent the feed thereof to the needle, the grip 97 assists in holding thread also, therefore the feed of the thread will be discontinued until the clamping lever is released. The clamping lever is operated in one direction to clamp the thread when the needle moves forwardly toward the bag by a longitudinally-extending bar 102, which is positioned in the path of a roller 103 carried on the outer end of the lever 101. When the combined thread feeder and holder moves in an opposite direction, that is to say, when the needle is moving away from the bag, the bar 102 engages the roller 103 and operates the lever 101 in an opposite direction so that the grippers are released and the feed of the thread can be had.

*Reciprocatory needle carriage.* (Figs. 6 and 39.)—Two carriages are employed, one for each needle, the carriages although reciprocating simultaneously move in opposite directions with respect to each other. Each of the carriages consists of a rectangular grooved plate 104 having seated in the groove and attached to one end thereof by the hold fast devices 105 the plate 84, and to the plate 104 is also secured approximately centrally thereof by the hold-fast devices 106, the combined thread feeder and holder. The holder is seated in the groove of the plate.

*Transversely-shiftable guide members for the reciprocatory carriages.*—Two members are employed, one for each carriage, said members extend longitudinally of the platform 6 and project from each end of the platform (Fig. 6) and are furthermore disposed upon the platform over the longitudinally-extending slots 8 and 9 and are arranged one at one side of the support 25 and the other at one side of the support 26. Each of the said members is indicated by the reference character 107 and in its upper face is formed with a pair of tracks 108 upon which the reciprocatory carriage travels and the said member is provided with a pair of guide grooves 109 (Figs. 4 and 5) into which the reciprocatory carriage extends. Each of said members 107 is furthermore provided with an elongated slot 110, (Fig. 2) through which extends an operating means for the reciprocatory needle carriage, said operating means will be hereinafter referred to. Secured to the upper face of each of the members 107 are the plates 107ª which form the top walls of the grooves 109. Each of the members 107 at one end is provided with a depending lug 111 and at its other end with a depending lug 112 (Fig. 7). The lugs 111 are connected to lugs 111ª which project upwardly through the openings 10 and the lugs 112 are connected to lugs 112ª which project upwardly through openings 9ª. Formed integral with the lower terminus of the lugs 111ª and 112ª and arranged at a point removed from the lower face of the platform 6 is a depending supporting bracket 114 (Figs. 1 and 7) provided with a pair of collars 115 (Fig. 1) which are loosely mounted upon a driven shaft 20 or 21 as the case may be, depending upon what side of the machine the bracket is positioned. Pivotally connected to each end of that bracket 114 at the right end of the machine is an adjustable link 116 (Fig. 7) and the said links are also pivotally-connected to collars 117 fixed to a rock shaft 118 journaled in the uprights 2, 3 and supports 4, 5. Fixed to the rock shaft 118 is a sleeve 119 (Fig. 2) formed with a crank arm 120, which is pivotally-connected to an elongated lever 121, provided at its lower end with a forked end 122 through which extends the transmission shaft 11. The elongated lever 121, at a point removed from its lower end, carries a pin 123, provided with a roller 123ª, which travels in a cam groove 124 formed on the inner face of a disk 125 fixed to the transmission shaft 11. When the transmission shaft 11 is rotated and the roller 123ª travels through the cam groove 124, the lever 121 will be actuated, rocking the shaft 118, and transversely shifting the bracket 114, so as to shift the needle carriage to properly position the needle. Pivotally-connected to each end of that bracket at the left end of the machine, (Fig. 7), is a link 126, each of which is pivotally-connected to a collar 127, fixed to the rock shaft 118. The links 126 are oppositely disposed with respect to the links 116, so that when the rock shaft 118 is actuated, the links 116 will transversely shift the member 107 at the right side of the machine in an opposite direction with respect to the direction in which the links 126 at the left end of the machine shift the other member 107.

*Operating mechanism for the reciprocatory needle carriages.* (Figs. 1, 2 and 7.)—The function of this mechanism is to reciprocate the carriages so as to move the needles through the hems of the bag. Two of these mechanism are employed, one for the needle carriage at the right end of the machine and the other for the needle carriage at the left end of the machine, and as both mechanisms are alike, but one mechanism will be described, as the description of one applies to the other. Each of said mechanisms for imparting a reciprocatory movement to a needle carriage consists of a vertically movable plate 129, provided with teeth 129ª the said vertically-disposed plate being arranged in a groove 130 (Fig. 1) formed in one side of the bracket 114 and retained in position by a plate 131 secured as at 132 (Fig. 7) to the bracket 114. The plate 129 is formed with an outwardly-extending lug 134, to which is pivotally-connected a link, the link for the operating mechanism at the right end of the machine is indicated by the reference character 135 and the link for the operating mechanism at the left end of the machine is indicated by the reference character 136. The link 135 is adjustable and at its lower end is pivotally connected to the inner end of a lever 139, which has an adjustable inner end 139$^a$ provided with a pin 137 having a roller 139$^b$ (Fig. 2), which travels in a cam groove 138, formed in the outer face of the disk 125. The lever 139 has its outer end pivoted to a support 140 carried by the base 1. Each of the brackets 114 is provided with a transversely-extending stud 141 carrying a toothed sector 142, (Fig. 1) which is adapted to extend up through the slots 110 and also slot 110$^a$ (Fig. 7) and engage with a toothed rack 143 (Fig. 2) secured to the lower face of the plate 104 which constitutes the reciprocatory needle carriage. The link 136 for the operating mechanism for reciprocating the carriage at the left end of the machine has an adjustable lower end which is pivotally connected to the adjustable inner end of a lever 147, which at a point intermediate its ends is provided with a roller 144, which engages in a cam groove 146$^a$ formed in the outer face of a disk 146 secured to the transmission shaft 11. The outer end of the lever 147 is pivotally connected to a support 148 carried by the base 1. The lever 147 is similar in construction as the lever 139. From the foregoing construction and arrangement of parts, it is evident that when the transmission shaft is actuated, motion will be imparted to the links 135 and 136, so as to vertically move the toothed plates 129, which are adapted to mesh with pinions 149 (Fig. 7) carried by the sectors 142 loosely mounted in the studs 141, imparting movement to said toothed sectors so as to reciprocate the needle carriages. The links 135 and 136 operate in such a manner as to vertically move the toothed plates 129, when the said plates move downwardly, the carriages are shifted toward the work and when moved upwardly the carriages are shifted away from the work. The shaft 11 is not only adapted to transmit movement to the gear wheel 22, but also constitutes a means for actuating the operating means to impart a reciprocatory movement to the needle carriages and also to actuate the means for shifting the members 107 to position the needles so they will operate upon the proper side of the bag.

*Loop forming mechanism or looper.* (Figs. 1 to 6.)—The function of the looper is to catch the thread after the needle has inserted the thread through one hem of the bag and is about to make its stroke to insert the thread through the other hem of the bag, this, as is evident, will form a loop at one end of the draw strings. The function of looping the thread is not only performed by the looper, but the latter also acts as a means to tension the thread and furthermore hold the loop until the knot is tied, then when the knotter turns the knot loose, the looper pulls the pivot against a string reversing means, the looper moves forward as the string reversing means operates and drops the loop and passes under the knotted end of the string so that the knotted end of the string will be held on the string reversing means until the gripper pulls the bag off of the bag holding members far enough to allow of the looped ends of the strings to engage the sides of the bag. Two loopers are employed, but as the construction of both are the same, but one will be described.

Each loop forming mechanism or looper is arranged in proximity to the inner end of the member 107 and each consists of a vertically-disposed supporting bracket 150, (Fig. 2) having at its top a sleeve 151 extending transversely with respect to the platform 6 and over the member 107 and journaled in said sleeve is a shaft 152 (Fig. 4), which projects from each end of said sleeve 151 and has the outer projecting end provided with a pinion 153 (Figs. 1 and 4) and a disk 154 provided with an arm 155 (Fig. 1). The inner projecting end of the shaft 152 has depending therefrom a lever arm 156, which has pivotally connected to its lower end a carrier 157 (Figs. 37 and 39) extending in a longitudinal direction with respect to the platform 6. The free end of the carriers 157 is bifurcated as at 158 and to the said bifurcated end 158 of the carrier 157, is pivotally-connected a shank 158$^a$ having a hook 159 which is formed with a vertical extension 160 (Figs. 37 and 39). The hook is formed with an offset 158$^b$ for a purpose to be hereinafter referred to. The pivot for the hook 159 is indicated by the reference character 161 and which projects from the carrier 157 and carries on its projecting end a roller 162, which travels in a longitudinally-extending guide 163 secured to an offset 164 projecting from the bracket 150. The guide 163 extends to a point in close proximity to the opening 7. Surrounding the projecting end of the pivot 161 is a spring 165, which has one end attached to a pin 161$^a$ on the carrier and its other end to a pin 161$^b$ on the extension 160, and the function thereof is to normally maintain the hook in a lowered position, the lower position of the hook being its normal position, that is to say, a position for holding the thread. The hook is shifted from normal position so as to drop the thread by an element to be hereinafter referred to.

The reference character 166 denotes a vertically movable rack bar engaging with the pinion 153, for rotating the shaft 152 to reciprocate the carrier 157. The rack bar 166 (Fig. 4) is connected to a lever 167, pivotally-connected to the inner end of a crank arm provided with a roller 168 which travels in a cam groove 169 formed in the outer face of a disk 170. Two disks are employed, one for each looping mechanism, the disk for the looping mechanism at the left end of the machine is carried by the driven shaft 20 and the disk of the looping mechanism at the right end of the machine carried by the driven shaft 21. The lever 167 at the right side of the machine is pivotally-connected to a crank arm 172 mounted upon a shaft 173 fixed to the supports 4, 5 and arranged in parallelism with respect to the shaft 71. The lever 167 at the left end of the machine is pivotally-connected to a crank arm 174 which is mounted upon the shaft 71. The sleeve 151 is formed with an offset 175 (Fig. 6) in which is fixed a stud 176 provided with a roller 178 (Fig. 1), which is interposed between the rack bar 166 and a vertically-extending arm 179 (Fig. 98), the latter being secured at its lower end as at 180 to the rack bar 166 and has its upper end offset as at 179ª. Connected with the arm 166 is a spring 181 (Fig. 98) which at its lower end is connected to the platform 6. The function of the spring 181 is to maintain tension on the thread, after the disks 170 and 171 have actuated the levers 167, to shift the carriers 157, with the hooks 159 in a position to pick the thread up as the needles shift around the hooks 159 and when shifted in such position, the springs 181 have a tendency to pull the carriers 157 to inoperative position, whereby an increase tension will be had upon the thread, so that all slack will be overcome and a tight knot can be made by the knotter mechanism to be hereinafter referred to. The arm 179 is provided with a lug 182 adapted to be engaged by the arm 155 which projects from the disk 154, said engagement being had when the shaft 152 is shifted in a direction to move the carrier 157 to operative position. When the shaft 152 is shifted in such direction, the arm 155 will engage the lug 182 and shift the arm 179 upwardly, thereby expanding the spring 181 and increasing the pulling action thereof. The connection between the lower end 180 of the arm 179 and the rack bar 166 is a pin and slot one as at 180ª whereby the shifting movement of the arm 179 by the arm 155 can be had as is obvious. The upper end of the spring 181 is connected to a pin 183 carried by the lower portion of the arm 179. An adjustable stop 181ª is provided for regulating the pull of the spring 181. The stop is carried by the rack bar 166.

*Needle guide mechanism.* (Figs. 3, 30, 31 and 32.)—Two needle guide mechanisms are employed, one for each needle, each mechanism in itself being what is termed a duplex needle guide mechanism to provide for the guiding of the needle on its two strokes, that is to say, to guide the needle as it inserts the thread through one hem of the bag and to guide the needle as it inserts the thread through the other hem of the bag. As each of the needle guide mechanisms is of the same construction, but one will be described and the description of one applies to the other. Each of the needle guide mechanisms is suspended in the rectangular opening 7, one at each side of said opening and inwardly of the knotter mechanism to be hereinafter referred to. Each of said mechanisms consists of a supporting bar 184 which extends transversely with respect to the platform 6 and is connected at each end to a pair of longitudinally-extending rods 185 (Fig. 6), which project in the keepers 186 secured to the platform 6 and at each side of the member 107. The bars 184 are capable of being simultaneously shifted, so that when shifted sufficient clearance will be had for the operation of the bag holding arms 32, whereby the needle guide mechanism will not interfere with the operation of the bag holding mechanism and at the same time the needle guides will be positioned in proper relation with respect to the bag carried by a pair of the bag holding arms 32, so that the needles will be directed or guided in the necessary direction to pass through the hems of the bag to connect the thread thereto. The rods 185 constitute guides for the bar 184, as well as a means for suspending the bar 184 at the opening 7. The bar 184 is provided in its upper face with a groove extending in the direction of the length thereof and which consists of a longitudinally-extending portion 187, a transversely-extending portion 188, a longitudinally-extending portion 189, a transversely-extending portion 190, and a longitudinally-extending portion 191. The portion 188 is deeper than the other portions of said groove. Arranged in the longitudinally-extending portions 187 and 191 of the groove are slides 192, 193, the slide 192 projects from one end of the bar 184 and is formed with a vertically-disposed bifurcated lug 194. The slide 193 projects from the opposite end of the bar 184 and is provided with a vertically-disposed bifurcated lug 195. The inner end of the slide 193 terminates in an L-shaped extension 196 which is positioned in the transversely-extending portion 189 and the longitudinally-extending portion 190. The extension 196 is pivotally-connected by a link 197 to the inner end of the slide 192, the said inner end being offset as at 192ª, the link 197 being arranged within the transversely-extending portion 188 and the latter being of sufficient width to allow of the play of said links. From the foregoing arrangement it is evident, that if the slide 192 is shifted outwardly, slide 193 will be carried inwardly or vice versa as occasion so requires. Secured to the bar 184 are the casings 198 and 199, each of which has its inner end open, the inner end of the casing 198 opposing the inner end of the casing 199. Extending through the casing 198 is a bar 200 which projects from the outer end of the said casing and is formed with a head 201. The inner end of the bar 200 carries a guide 202 which is formed with a beveled groove 203 for the passage of the needle. Extending through the casing 199 is also a bar 200 having its outer end projecting from the other end of the casing 199 and formed with a head 205. The inner end of the bar 204 is provided with a guide 206 having a beveled groove 207 for the passage of the needle. The guide 202 opposes the guide 206 and the guide 202 is utilized for guiding the needle when the thread is inserted through what may be termed the hem on the inner side of the bag, and the guide 206 is utilized for guiding the needle when the thread is inserted through what may be termed the hem on the outer side of the bag. It is essential that two guides be employed owing to the fact that the needle is shifted transversely after each operation or stroke. Arranged within each of the casings 198, 199 is a spring 208 which surrounds the bar 200. The function of the springs 208 is to normally maintain the guides in a projected position, that is to say, the springs 208 have a tendency to force the guides toward each other. The springs 208 in connection with the bars 200 form what may be termed a yieldable supporting means for the guides. The lug 194 extends around the projecting end of the bar 200 of the casing 198 inwardly of the head 201 and the lug 195 extends around the bar 200 of the casing 199 inwardly of the head 205. By such an arrangement it is evident, that if the slide 192 is shifted when the guide 202 is forced outwardly, that a like movement will be had to the guide 206 or vice versa.

It is essential that both guides 202 be shifted outwardly simultaneously so that the passage of the needles will not be arrested and in this connection it will be stated that it will be assumed, that one needle is traveling in one direction and the other needle in the other direction, one needle passing first through one guide 206, the other needle passing first through one guide 202, the first needle then passes through the second guide 206 to the knotter, the second needle then passes through the second guide 202 to the knotter, therefore it is essential that the second guide 202 and 206 be shifted for the passage of the needles. The shifting of one pair of guides away from the other pair is had automatically, when the bars 184 are moved in a longitudinal direction with respect to the length of the machine and toward the ends of the machine, so as to allow of the operation of the bag mechanism. As the automatic shifting means for each guide mechanism is the same, but one will be described. Each of bars 184 is shifted away from the other, that is to say, toward the supporting member 107, by a shifting arm 211 (Fig. 3) which is connected to a lug 212 depending from the bar 184. The arms 211 are pivotally connected to one end of the links 213, which in turn have their other ends pivotally-connected to a cross head 214, carried by a vertically-disposed shaft 215, supported in bearings 216 carried by and depending from the platform 6 at one end of the opening 7 (Figs. 3 and 7). The shaft 215 extends above the platform 6 and has its lower end provided with a beveled gear 217, which meshes with a toothed segment 218 (Fig. 3), carried by a rock shaft 219, which is journaled in the uprights 2, 3 and supports 4, 5 and has connected thereto a crank 220, which is pivotally-attached to a lever arm 221, provided with a roller 222 traveling in a cam groove (not shown) formed in the inner face of the disk 146. To allow of the free passage of the strings after being turned loose from the loopers, the guides of each pair are automatically shifted away from each other as each pair of needle guides moves toward the ends of the machine to clear the bag holding arms. Said operation is had as follows: The bar 200 of the casing 199 has its outer end projecting in the path of an inclined arm 209 (Figs. 30 and 31), which, when the bar 184 is shifted toward the supporting member 107, will pull the said bar 200 outwardly as the latter rides against the arm 209. The arm 209 is carried by a support 210 mounted on the platform 6, at a position in proximity to the opening 7.

*Combined bag turning, stretching and stripping mechanism.* (Figs. 69 to 79 and 93 and 94.)—This mechanism is designed to turn the bag right side out, stretch the bags and strip the bags from the bag holding arms as well as strip any thread which has not entered the bag during the threading operation. This mechanism is located centrally of the machine and below the bag holding mechanism and is so designed, that as the bag is being turned right side out, it is also being stripped from the bag holding arms and after the bag is turned, it is stretched and removed from the stretcher. The mechanism comprises a support 224 mounted on the case 1 and provided with a laterally-extending plate 225 and furthermore provided with a bearing 226 in which is journaled a shaft 227 carrying a spur pinion 228. Secured to the side walls of and depending from the opening 7, is a yoke-shaped bracket 229, to which is connected a pair of depending guide rods 230 having their lower ends secured in the plate 225. ttached to the rods 230, at a point intermediate the ends thereof, is a bracket 231 consisting of a pair of transversely-extending arms terminating in vertically-extending arms, which are connected by a cross piece 232 provided with a boss 233. Extending through the plate 225 at one side of the pinion 228, is a vertically-disposed rack bar 234, which constitutes an operating means for the stripper element of the mechanism. The bar 234 is engaged by the pinion 228 and when the latter is rotated in either direction vertical movement will be imparted to the rack bar 234. Connected to the upper end of the rack bar 234, is a vertically-disposed slide 235 having rearwardly-extending flanges 236, through which extend the guide rods 230. The inner face of the slide 235 is formed with transversely-extending grooves 237 merging into a vertically-extending groove 238, and arranged within the groove 238, is a plunger 239 which normally projects below the lower flange 236, and which is adapted to be engaged by an abutment 240 carried by the guide rods 230, the abutment is so positioned, that when the slide 235, reaches the limit of its movement downwardly, the plunger 239 will be forced upwardly and cause, by a connection, to be presently described, the spreading of the strippers. The strippers are indicated by the reference characters 241 and 242, and each of which, has its upper portion extending inwardly and provided with an inturned portion 243, which terminates in a right angularly-disposed stripping end 244. The strippers are arranged at each side of the slide 235 and each is capable of pivoting on a longitudinally-extending axis and a transversely-extending axis. Pivotally-mounted upon the studs 245 which project from the slide 235, are plates 246 which are provided with bosses 246ª for the studs 245. Each of the plates 246 is provided with a protuberance 247 to which is pivotally connected by a pin 247ª a stripper. The strippers are indicated at 241 and 242. Each of the plates 246 is provided with a rearwardly-extending stud 248 upon which is pivotally-mounted a link 249, the latter being also pivotally-connected to the upper end of the plunger 239. The links are arranged in the transversely extending recesses 237 and operate against the action of a spring 667 carried by a rod 668 extending in the upper flange 236 and also in a cross bar 251. The studs 245 constitute the transverse axes upon which the strippers pivot and the pins 247ª constitute the longitudinal axes upon which the strippers pivot. From the foregoing construction and arrangement of parts it is evident that when the plunger 239 engages the abutment 240, the plunger will be elevated, shifting the links 249 to a position at right angles with respect to the plunger 239, and such operation of links 249 will shift the plates 246 upon the studs 245 and force the strippers away from each other, or in other words, spread the strippers. The strippers depend below the studs 245, and the depending portions thereof are adapted to be engaged by rollers 250, carried by the cross bar 251 fixed to the plunger 239. The depending portion of each of the strippers is indicated by the reference character 252, and the same has its rear edge extending at an inclination, so that when the rollers 250 engage the portions 252 of the stripper, the upper end of the strippers will be forced in a rearward direction. The engagement of the rollers 250 with the portions 252 of the strippers, is had when the plunger 239 is vertically moved by the engagement of the plunger 239 with the abutment 240. The lower flange of the slide 235 has secured thereto a bar 253, which is of a length as to project from each end of the said lower flange 236, and attached to the ends of the bar 253 are the springs 254, which are also connected to the lower ends of the strippers.

The function of the springs 254 is to force the upper portions of the strippers forwardly when the rollers 250 move out of engagement with the inclined lower portions 252 of the strippers. The bottom of the bracket 229 is in the path of the slide 235 and the said bottom constitutes an abutment, which is engaged by the plunger 239 for shifting the same downwardly, when the slide 235 has reached the limit of its movement in an upward direction. When the plunger moves downwardly, the rollers are moved out of engagement with the inclined edge of the strippers, and the springs 254 swing the strippers on the pins 247ª in such a manner, that the upper portions of the strippers will be moved forwardly, that is toward the front of the machine and the angular stripping ends 244 will extend in the openings 255 (Fig. 48) formed between the bag holding arms and the grippers, so that the said angular stripping ends 244, will be positioned over the top edge of the bag and when the slide 235 moves downwardly, the bag will be stripped from the holding arms. The lower flange 236 carries a frictional clamp (Fig. 71) consisting of a ball 256 and a spring 256ª mounted in a casing 257, secured to the flange 236, the ball, due to the action of the string, being adapted to engage the plunger for retaining it in the position to which it has been shifted. The plate 225 also carries a frictional clamp consisting of a casing 258, spring 258$^a$ and ball 258$^b$, the ball being adapted to engage the rack bar 234, to retain it in the position to which it has been moved, until the operating mechanism for the rack bar will again shift it. The turning and spreading element of the combined bag stripping, turning and spreading mechanism consists of a vertically-disposed rack bar 259 which engages with the pinion 228, the rack bar 259 extends through the plate 225 and also through the boss 233 and also extends through a reciprocatory cross head 259$^a$. The upper end of the rack bar 259 is provided with a rearwardly-extending lug 260, which extends between a pair of apertured ears 261, pivoted as at 262 to the lug 260. The apertured ears 261 depend from a turning head 263 which is in the form of a T-shaped plate. Connected to the ears 261 are depending links 264, which are connected to the cross head 259$^a$ and are adapted to swing the turning head from a horizontal to a vertical position or vice versa when occasion so requires. Connected to the cross head 259$^a$, are the lower ends of the links 265, the upper ends of the said links 265 are offset and pivotally-connected to the crank arms 266 carried by the rock shaft 219. The turning head 263 is provided with oppositely-disposed flanges 267 in which are journaled the pivot 262. The pivot 262 in proximity to each of the flanges 267 has fixed thereon a beveled pinion 268 (Fig. 77) and each of which is engaged by a toothed quadrant 269, the latter being mounted upon the pivot 270, carried by the turning head 263. By such a construction it is evident that when the turning head shifts from vertical to horizontal position, the quadrants 269 rolling over the beveled pinions 268, will cause the quadrants to shift on their pivots for a function to be presently referred to. The turning head is provided with means to spread the bag after it has been turned right side out, and said means consists of a pair of spreading arms 271, arranged in parallelism with respect to each other and at their lower ends extending in grooves formed in the top edge of the turning head, said grooves constituting guides. Pivotally-connected to each of the arms 271, at a point intermediate its ends, is a lever arm 272, which is fixed to the pivoted end of the quadrants 269. When the quadrants 269 travel over the beveled pinions 268, the pivoted ends of the quadrants will be shifted, which in turn will shift the lever arms 272 and move the spreading arms 271 outwardly, that is to say, the spreading arms will be moved away from each other when the turning head is shifted from vertical to horizontal position and when the turning head is shifted from horizontal to vertical position, the spreading arms 271 will be moved toward each other. The turning head comprises a bag turning member indicated by the reference character 273, and which at its free end is a contour, which may be turned dove-tailed as at 274, and the said end 274 is adapted to engage the bottom of the bag and turn the bag right side out on the vertical movement of the turning head. The turning member 274 has its longitudinal edges recessed for the reception of a pair of links 275, which are pivotally-connected at one end to the spreading arms 271 and at the other end to the turning member 273. In regard to the combined bag turning and spreading element it will be stated, that owing to the connection in a manner as set forth with the rock shaft 219, that the said element moves upwardly to turn the bag right side out and during the turning operation, the strippers remove the bag from the holding arms, after the turning operation, the turning head is shifted from a vertical to a horizontal position and during the shifting thereof the spreading arms 271 are forced away from each other and as they act upon the sides of the bag the bag is thoroughly stretched. The turning of the bag by the member 274 is had in such manner that when the turning member has completed its function the corners of the bag will be inturned and not straight, as shown in Fig. 88, such arrangement prevents the bag when filled from having sharp corners.

*Locking mechanism for bag holding mechanism.* (Fig. 2.)—This mechanism is provided to instantaneously lock the bag holding mechanism after a set of arms is positioned in the path of the bag feeding mechanism and to furthermore lock the bag holding mechanism during the positioning of the needle guides. The said locking mechanism consists of a notched flange 276 which forms a part of the projecting end of the shaft 24 and said notched flange is adapted to be engaged by a latch arm 277 which is pivotally-connected to a lever 278, fulcrumed upon the platform 6, as well as depending below said platform and having its depending end arranged in the path of a cam 279 carried by the rock shaft 219. Secured at one end to the lower face of the platform 6, is a spring 280 (Fig. 2) which has its other end attached to the depending end of a lever 278. The function of the spring 280 is to maintain the latch arm 277 in engagement with one of the notches of the flange 276 to arrest movement of the bag holding mechanism in either direction. The latch arm 277 moves to locking position immediately upon the bag holding mechanism being shifted to position a pair of bag holding arms in the path of the bag feeding mechanism. The function of the cam 279 is to intermittently actuate the lever 278, so as to move the lock arm 277 from engagement with the flange 276, to allow of the adjusting of the bag holding mechanism by its operating means.

*Bag delivering mechanism.* (Figs. 82, 84, 85 and 86.)—The function of this mechanism is to remove the bag from the turning head and deliver the bag from the machine. The bag delivering mechanism is arranged in operative relation with respect to the turning head and consists of a pair of guide rods 281, which extend transversely with respect to and below the platform 6 and are connected at their inner ends to the vertical arms of the bracket 231, and at their outer ends are coupled to the uprights 282 which are fastened to the machine base 1 and also to the platform 6. Slidably mounted upon the guide rods 281 is a carriage consisting of the vertical members 283 and 285, the members 283 are connected together at a point removed from their upper ends by a cross brace 284. The vertical members 283 are connected to the vertical members 285 by longitudinally-extending members 286, the members 285 being of less height than the members 283. The members 286 are connected together by the cross piece 286$^a$. Extending transversely with respect to the carriage and journaled in one of the vertical members 283 and in a collar mounted in the other vertical member 283, is a shaft 287, which is provided at each end with a journal 288, 289, the former mounted in the member 283 and the latter seated in the collar 290 mounted in the other vertical member 283. The journals are of much less diameter than the shaft 287 and the said shaft is provided with two pairs of flattened portions, one pair indicated at 291 and the other at 291$^a$. The remaining portion of the shaft is cylindrical. Mounted upon the shaft 287 is a sleeve 292 which at one end is toothed as at 293. The sleeve is formed with two pairs of protuberances, one pair indicated at 294 and the other pair at 295, the protuberances of each pair are arranged in parallelism with respect to each other and pivoted in each pair of protuberances is a lower delivering arm 296 provided on its upper face with a barb 297 adapted to engage the bag. The pivot for the arm 296 is indicated by the reference character 298. Between each pair of protuberances is pivotally-mounted an upper delivering arm 299, which is of less length than the lower arm. The upper arms extend in parallelism with respect to the lower arms, and the pivots for the upper arms are indicated at 300. The delivering arms project over the shaft 287, and are adapted to be engaged by the rounded portion of the shaft, so as to close the arms to grip the bag. The upper arms 299 have their inner faces provided with apertures 301 for the barbs 297. The upper arms 299 are further provided on their upper faces with barbs 300$^a$ the function of which will be hereinafter referred to. Interposed between the inner ends of each pair of delivering arms, each pair consisting of an upper and a lower arm, is a spring 302, the function of which is to normally retain the arms open, and the arms are maintained in such position until they are engaged by the rounded or enlarged portion of the shaft 287. The inner ends of the delivering arms when in their normal open position are adapted to extend against the flattened portions of the shaft 287, but when the latter is shifted so as to move its flattened portion away from the inner ends of the arms, the rounded portion of the shaft will engage the arms and close them, the arms being rocked on their pivots by such action and such movement is had against the action of the springs 302, these latter when the arms are released, that is to say, when the shaft 287 is shifted to allow the arms to enter against the flattened portions, will immediately open the arms.

Mounted upon the shaft 287 and at one side of the sleeve 292, is a collar 303, which is fixedly secured to the shaft 287. The collar 303 is provided with a lug 305, which is adapted to be engaged by a shifting means, so as to move the shaft 287 to shift the arms in a manner as hereinbefore stated. The lug 305 is also adapted to be engaged by an additional shifting means so that the shaft can be moved in an opposite direction as it requires two movements of the shaft, one to open the delivering arms and the other to close said arms.

The carriage of the delivering mechanism is reciprocated in a transverse direction with respect to the machine by a pair of levers 306, which at their upper ends are pivotally-connected to links 307, these latter being connected to the vertical members 285. The levers 306 project from a bracket 308 (Fig. 3) loosely mounted upon the shaft 173. The bracket 308 is provided with a pair of cranks 309, which are connected by the links 310 to the cranks 72, these latter being operated by the rollers 73 traveling in the grooves 74 of the disk 75. Connected to one of the uprights 282 and extending inwardly and upon the carriage of the delivering mechanism is a rack bar 311, which is adapted to engage with the toothed portion 293 of the sleeve 292 for shifting it upon the shaft 287 to swing the delivering arms outwardly and inwardly, when the carriage of the delivering mechanism moves inwardly the sleeve 292 is so shifted as to move the delivering arms inwardly, and when the carriage moves outwardly the sleeve 292 is shifted in an opposite direction so as to move the delivering arms outwardly. The delivering arms when the carriage moves inwardly are adapted to straddle the bag upon the turning head and after arriving at such position are closed, so as to grip the bag and remove it from the turning head, the closing of the arms against the bag is had by the shifting of the shaft 287 in one direction, so that the rounded portion of the shaft will engage the inner ends of the arms, swing the arms on their pivots and cause the outer ends of the arms to grip the bag. The shifting of the shaft 287 is had through the medium of the moving of the collar 303. The collar is moved by the hooked end 312 of a spring-controlled trip arm 313, which is arranged upon the carriage below the collar 303, so that when the trip arm 313 is shifted inwardly, the hooked end 312 will engage the lug 305 and turn the collar, thereby shifting the shaft to move the flattened portions thereof away from the inner ends of the holding arms and cause the rounded portion of the shaft 287 to ride against said arms thereby closing them. The trip arm 313 is provided with a depending lever arm 314 adapted to be engaged by a stud 315 carried by one of the disks 75. The lever arm 314 is pivoted to one of the vertical members 285 of the carriage of the delivering mechanism and the upper end of said lever arm 314 has one end of a spring 316 connected thereto, while the other end of said spring is attached to the trip arm. The spring 316 maintains the trip arm in its inoperative position and returns it to such position after the trip arm has been shifted by the lever arm. To shift the shaft 287 in an opposite direction through the medium of the lug 305 and collar 303, so that the inner ends of the delivering arms can be positioned at the flattened portion of the shaft 287, whereby the springs 302 will maintain the delivering arms open, a spring-controlled trip arm 317 is carried by one of the uprights 282 (Fig. 81) and is provided at its lower end with an angularly-disposed protuberance 318, which when the trip arm 317 is actuated in a manner as hereinafter referred to, will engage the lug 305 and shift the collar 303, and as the latter is connected to the shaft 287, it is evident that the shaft will move with the collar. When the collar 303 is shifted by the trip arm 313 the lug 305 is positioned in the path of the protuberance 318, so that when the trip arm 317 is actuated, the protuberance will engage the lug and cause the shifting of the shaft 287. The delivering mechanism is furthermore provided with an auxiliary bag turning device, in case the bag has not been entirely turned right side out by the turning head and the said auxiliary turning device consists of a pair of vertically-disposed spring-controlled turning arms 319 carried on the inner end of a pair of bars 320, pivotally-mounted in the carriage of the delivering mechanism and the said bars intermediate their ends are provided with vertical ears 321 connected together by a transversely-extending spring 322, the function of which is to shift the bars so that the turning arms will be moved toward each other and so position the turning arms that they will slide down the sides of the bag and engage in the inturned portion and cause the said portion to be turned to complete the turning of the bag right side out.

*Bag feeding mechanism.* (Figs. 8 to 22 and 80.)—The function of this mechanism is to feed the bags and position them upon the bag holding arms, after which the bag holding arms shift the bags in the path of the needle for the purpose of inserting the threads in the hems of the bags. As before stated fabric tobacco bags as now in use are manufactured in chains or lengths, the bags being connected together by threads and furnished to the stringer wrong side out. It may be well to state that the draw or shirring strings of tobacco bags have heretofore been placed in the mouth end of the bag by hand, after which the stringer turns the bag manually right side out with the corners tucked in. This machine as heretofore stated embodies a bag turning mechanism which operates upon the bags after the strings have been connected thereto. The bags in the form coming from the manufacturer are shown in Fig. 29, and, as before stated, furnished in chains or lengths including a hundred or more bags connected together by the threads which are utilized to stitch the sections of the bags together. The bags are designated by the reference character 323 and the connecting threads or strings between each bag by 324. In some cases the bags when furnished are irregular at the mouth end, that is to say, the two edges of the bag are not in parallelism with respect to each other, the machine as heretofore set forth, embodies what may be termed a pusher mechanism for shifting the edges of the bag upon the bag holding arms, so that the edges will be in parallelism, prior to the connecting of the string to the mouth end of the bag by the needles. The said pusher mechanism operating upon the bags after they have been positioned by the bag feeding mechanism. As the bags are connected together by the threads 324, it is essential that said threads must be cut during the bag feeding operation and under such conditions the bag feeding mechanism embodies a cutting device to separate one bag from the other. The bag feeding mechanism is positioned centrally of the machine and above the bag holding mechanism and is vertically-movable, so as to take up the bag and carry it, as well as mount it, upon a pair of bag holding arms which are disposed in the bath of the bag feeding mechanism, when the latter moves downwardly. The bag feeding mechanism comprises a pair of vertically-disposed supports 325 and 326, each having its inner face grooved as at 327, to provide guides for certain of the movable elements of the said mechanism. The supports 325 and 326 are fixedly secured to the supports 25 and 26 approximately centrally thereof. The support 325 as well as the support 326 has attached to the top thereof a vertically-disposed supporting arm 329, each of said arms being bifurcated at its top for the reception of a shaft 330 carrying a drum or spool 331, upon which is wound a length or chain of bags as at 323 (Fig. 1). The drum 331 is tight upon the shaft 330, so that it will readily revolve with the shaft when the movable elements of the bag feeding mechanism travel downwardly and by such operation the bags are withdrawn from the drum. To maintain the shaft 331 in the bifurcated ends of the arms 329, and also to act as a means to support the shaft from turning freely, a pair of vertically-disposed springs 333 are provided, the upper end of the said springs 333 being connected around the shaft 330 and the lower ends thereof to the lugs 329ª. Secured to the outer face of the support 325 is the angle-shaped upper end 334 of a depending cam plate 335, provided on its inner face with a pair of oppositely-disposed cam grooves 335ª, 335ᵇ. The angle-shaped upper end of the plate 335 maintains the latter away from the support 326. The plate 335 extends in parallelism with respect to the support 326.

The reference character 336 denotes a cam bar having its inner face formed with a cam groove 338. The lower end of the bar 336 extends rearwardly as at 339 and is secured to the lower end of the support 325. The bar 336 is offset with respect to the support 325 as well as projecting forwardly from said support.

The bag feeding mechanism embodies what may be termed a combined guide and supporting means for the bags, said means guiding the bags toward the feeding element and further holding the bags to be taken up by the feeding element of the bag feeding mechanism. The said combined guide and supporting means consists of a frame formed of a pair of vertically-disposed bars 340 and a pair of longitudinally-disposed bars 341, the bars 341 extending in a longitudinal direction with respect to the platform 6. The bars 340 are flat and fixedly secured to the front of the bars 341 at points removed from the ends of the bars 341, whereby the said bars 341 will project from the bars 340 and engage in the guide grooves 327 formed on the inner faces of the supports 325 and 326. Projecting inwardly from each of the supports 325 and 326 is an apertured lug 342, through each of which extends a vertically-disposed rod 343 projecting from the upper bar 341 and which carries a coil spring 344. The springs being interposed between collars 345 carried on the upper end of the rods 343 and the lugs 342. By the employment of the rods 343 in connection with the springs 344, a spring controlled suspension means is set up for the said bag guide and support. The bars 341 are provided with openings 346 through which extends removable hold fast devices 347 and the said devices 347 constitute means for connecting flat depending tracks 348 to the bars 341 and against which the bags travel during the feed thereof to the bag holding arms. The tracks 348 are provided with slots 348ª through which extend the hold fast devices 347, whereby an adjustable connection is had between the tracks and bars. The tracks 348 are of such length as to depend below the lower of the bars 341 and the depending portion of each of the tracks 348 has its outer side edge inturned as at 349 to provide guides for the side edges of the bags. Secured to the forward face of the bars 340 are forwardly-extending pushers 360 for actuating an element of the feeding mechanism to be hereinafter referred to. Secured to the front edge of the supports 325 and 326 is a bar 351, having attached thereto a downwardly inclined plate 352, which constitutes a deflector for holding the bags away from the bag-feeding mechanisms if they should drop from the drum. The plate 352 is extended inwardly and is curved or rounded as at 353 to provide a guide for the bags as they move against the tracks 348. The plate 352 has secured to its outer face near its upper end a tensioning arm 354 under which the bags travel before they pass over the guide 353 and engage the tracks 348. The tracks 348 at a point intermediate the ends thereof are provided with forwardly extending apertured ears 355, in which is mounted a shaft 356. Suspended from the shaft 356 and loosely mounted thereon is a pair of bag holding fingers 357, the function of which is to hold the bag against the track as the bags are being fed.

Each of the fingers 357 has connected thereto one end of a spring 358, while the other end of said spring is secured to an ear 355, and the said springs tend to constantly keep the fingers bearing toward the tracks 348. Each of the fingers 357 at its upper end is provided with a laterally-extending annular projection 359, the said projections extend toward each other and interposed between the projections and upon the shaft 356, is a spring 360, for maintaining the fingers apart. Pivotally-connected to as well as straddling each of the fingers 357, is a stop arm 361 and interposed between the stop arm and the finger 357, is a spring 362, which bears against the upper end of the stop arm thereby normally projecting the lower end of the arm rearwardly. The lower end of each of the stop arms 361, is formed with a rearward extension 363, which constitutes in itself a stop for the edge of the bag or in other words the extensions 363 arrest the downward movement of the bags. The extensions 363 project below the lower end of the tracks 348 and slightly beyond the inner face thereof. The lower end of each of the stop arms 361 is bifurcated, as well as each of the extensions 363, and the furcation formed thereby registers with a vertically-disposed slot 364 in the lower end of the track. The function of the furcations at the lower end of the stop arms 361 and also the slots 364 is to allow of the operation of the grippers of the feeding element of the mechanism, so that the grippers can engage the bag, and withdraw the same from the tracks. Fixed to the inner face at the lower end of each of the fingers 357, is a blade 365, which engages against the row of side stitches 366 of the bag 323, and the blades 365 under such circumstances prevent any puckering of the bag as it leaves the track, or in other words, maintains the bag flat against the tracks, and furthermore keeps the bag in its proper position as it is withdrawn by the grippers from the track. The blades 365 operate against the inner side of the side rows of stitching of the bag. The stop arms 361 are adapted to be shifted by the feeding element of the mechanism, so as to move the extensions 363 clear of the edge of the bag, to allow the latter to be taken up by the grippers of the feeding element and withdrawn from the tracks. The manner in which the stop arms 361 are shifted to release the bags will be presently referred to. Arranged below the combined guide and bag support, as well as being vertically-movable for withdrawing the bags from the tracks, as well as supporting the bags, and also as well as opening the mouth end of the bag and positioning the bags upon the bag holding arms, is what may be termed the feeding element of the bag feeding mechanism. The said feeding element consists of a vertically-reciprocatory carrier formed of a front and a rear frame, the front frame being indicated at 367 and the rear frame 368. The two frames are connected together by suitable hold-fast devices, so that the frames will move in unison. The frame 367 is offset at each end as at 369 and travels upon the forward edge of the supports 325 and 326. The frame 368 is arranged between the supports 325 and 326 and travels against the inner face thereof. The rear frame 368 is arranged between the supports 325 and 326 and is offset at each end as at 370, said offset portions traveling upon the rear edge of the supports 325 and 326. The offset portions 370 of the rear frame 368 are provided with the toothed portions or racks 371. Connected to the offset portions 369, of the front frame 367 are a pair of bearing brackets 372, in which is journaled a rock shaft 373, provided at one end with a crank arm 374, which carries a roller 375, traveling in the cam groove 338. The shaft 373 is furthermore provided with a vertically-disposed pair of lever arms 376, each having a reduced upper end $376^a$, to which is connected by a hold fast device $376^b$, an inwardly-extending coupling member 377, which has pivotally-connected to its inner end, as at $377^a$, a pair of blades 378 constituting thread cutters. Each of the blades 378 of each pair of blades is provided with an angle-shaped slotted extension 379, through the slot $379^a$ of which extends a stud 380, projecting vertically from the top of the front frame 367. The extensions 379 of each pair of blades extend in opposite directions with respect to each other.

From the foregoing construction and arrangement of parts it is evident that when the carriage is moved downwardly, the roller 375 traveling in the cam groove 338, will rock the shaft 373, which shifts the upper ends of the levers 376 inwardly, carrying the coupling members 377 therewith, moving the extensions 379 to a position substantially at right angles with respect to the coupling members 377 and the blades of each pair will be moved toward each other to cut the strings between a pair of bags. The cutters are utilized to disconnect one bag from the other, for the reason as heretofore stated, the bags are connected together by the threads utilized for securing the sections of the bag together and after a bag is removed from the tracks 348, and taken up by the feeding element, it is disconnected from the upper bag by the cutters, the cutters moving in and severing the threads when the upper bag engages the extensions of the stop arm 361. The cam groove 338 is of such contour, that the shaft 373, will be rocked to open and close the blades, not only on the upward movement of the carriage, but also on the downward movement, but the bags are not disconnected from one another on the upward movement, but only on the downward movement of the carrier. Connected to the offset portions 369 of the frame 367 at the top thereof by the bearing brackets 381, is a rock shaft 382, and connected to the offset portions 370 of the rear frame 368 by the bearing brackets 372ª, is a rock shaft 384, the said shafts 382 and 384 are arranged in parallelism with respect to each other and extend longitudinally with respect to the platform 6, and further project from the support 325, and each has its projecting end provided with a crank arm, the crank carried by the shaft 382 is indicated by the reference character 385, and the crank arm carried by the shaft 384 is indicated at 386, the crank arms 385 and 386 extend toward each other and one is provided with a roller 387 which travels in the cam groove 335ª, and the other is provided with a roller 388 which travels in the cam groove 335ᵇ. Depending from the shaft 382 at the center thereof is a pair of lever arms 389, which are fixed at their upper ends to the shaft 382, and have their lower ends bent in an angular manner toward the carrier as at 391. Connected to the lever arms 389 at their lower ends is a supporting member 392, having the central portion thereof formed of yoke-shape as at 393. Extending through the yoke-shape portion 393, of the member 392, is an adjusting screw 394, which engages in a depending lever arm 395 loosely mounted upon the shaft 382. The lower end of the lever arm 395 has a dove-tail-shaped plate 396 connected thereto, the function of the lever arm 395 will be presently referred to. Interposed between the lever arm 395 and the yoke-shaped portion 393 of the member 392, and mounted upon the screw 394, is a tension controlling spring 397, for forcing said arm 395 inwardly when occasion so requires, so that the dove-tailed plate 396 will perform its function. Depending from the shaft 384 at the center thereof, is a pair of depending lever arms 398, which are fixed at their upper ends to the shaft 384 and have their lower ends bent in an angular manner to extend toward the carrier, as at 399. Connected to the lever arms 398 at their lower ends is a supporting member 400, having the central portion thereof formed of yoke-shape as at 401. Extending through the yoke-shaped portion 401, of the member 400, is an adjusting screw 402, which engages in a depending lever arm 403, loosely mounted upon the shaft 384. The lower end of the lever arm 403 has a dove-tail-shaped plate 404 connected thereto, the function of the lever arm 403 will be presently referred to. Interposed between the lever arm 403 and the yoke-shaped portion 401 of the member 400 and mounted upon the screw 402, is a tension controlling spring 405, for forcing said arm 403 inwardly when occasion so requires, so that the dove-tailed plate 404 will perform its function. The front frame 367 is spaced from the rear frame by the bosses 406 carried by the front frame and engaging the bosses 407 carried by the rear frame. The bosses 406 and 407 are arranged at the bottom of the frame and through the bosses extend hold-fast devices 407ª for coupling the frames together. The frame 367 is further spaced from the frame 368 at the top, through the medium of the inwardly extending lugs 408 carried by the front frame 367 and abutting against the lugs 409 carried by the rear frame. Hold-fast devices 409ª extend through the lugs 408 and 409 for securing the frames together. The top of the frame 367 and also its bottom and the top of the frame 368 and also its bottom is provided with an inwardly extending flange 410. The inner face of the bottom of the frame 367 as well as the inner face of the bottom of the frame 368 is provided with a guide groove 411.

Arranged between and supported by the frames 367 and 368, are a pair of spring controlled housings 412, which are shifted toward and away from each other, the operating means for the housings 412 will be presently referred to. Each of the housings consists of a vertically-disposed pair of plates cut away as at 413 to provide a clearance for the operation of elements of the feeding mechanism to be presently referred to, and each of the plates is furthermore provided with a vertically-extending opening 415 to provide clearances for the bosses of the frames 367 and 368. Each of the plates of the housing is provided on its inner face at its outer end with a vertically disposed groove 416 and at its lower end with a longitudinally-extending groove 417. The inner face of each of the plates of the housing is provided with inwardly-extending bosses 418, the bosses of one plate abutting against the bosses of the other plate and through the bosses extend the hold fast devices for connecting the plates of the housing together. The outer face of each of the plates of each housing is formed with a rib 419, which extends in the groove 411, that is to say, the ribs carried by the inner plates of the housings extend in the grooves 411, formed in the inner frame 368 and the ribs on the outer plates of the housings extend in the grooves 411 of the outer frame 367. Interposed between each pair of plates is a pushing spring 412ª. The vertically-extending groove 416 of the back plate of each housing is provided with a vertically-extending elongated opening 420, through which projects a rearwardly-extending arm 421, of a vertically-movable actuating plate 422, which is disposed in the vertically-extending grooves 416 of the plates of a housing. The housing at each end is formed with an opening 423, through which projects a lug 424 carried by the plate 422, and the said lug 424 is adapted to engage a pair of cam tracks 425 and 426 formed on the inner face of a vertically-extending support 25 or 26, that is to say, each of the supports 25 and 26 is provided with a pair of cam tracks, said tracks indicated at 425 and 426, the tracks are spaced from each other, and in vertical alinement, but oppositely-disposed with respect to each other. When the carrier moves downwardly the lugs 424 ride against the track 425 and the housings gradually moved away from each other by the springs 412ᵃ, until the lugs reach the straight portion between the tracks 425 and 426, the housings as the lug passes over this straight portion of the tracks 425 and 426, said straight portion indicated at 427, remain in the position to which they have been adjusted, but immediately as the lug passes off of the straight portion and on the track 426 the housings gradually move toward each other. Regarding this movement of the housings it will be stated that the keepers which engage the bag and remove it from the tracks 348, will tension the bag on the downward movement of the carrier as the lugs pass off of tracks 425 and 426, the bag will be pulled to the greatest state of tension when the lug passes over the straight portions 427, as the lugs 424 pass upon the track 426, the carrier will then be forced inwardly to slacken the bag, so that it can be properly positioned upon the bag holding arms. The moving of the housings toward each other, when the carrier is at the limit of its upward movement, prevents any tension upon the mouth end of the bag and enables what may be termed the bag mouth opener, which will be presently referred to, to open the mouth end of the bag in a satisfactory manner as the carrier moves downwardly. If the bag was under a stretched condition when it left the tracks 348 there would not be sufficient slack to allow the openers to perform their function. As the bag is moved downwardly by the grippers with the mouth thereof held open by the openers, the bag is positioned upon the bag holding arms. After the bag has been positioned upon the end of a pair of holding arms, the openers disengage from the mouth end of the bag, but the downward movement of the bag upon the bag holding arms is continued by the grippers and during such movement the bag is placed under a state of tension, as the lugs travel against the straight portions 427 before the bag is again slackened by the passage of the lugs upon the tracks 426. When the mouth edge of the bags are moved in close proximity to the shoulders 41 the grippers are then freed from the bag.

The grippers are arranged in pairs, one pair carried by each housing, the grippers of each pair are indicated by the reference characters 428, 429, the grippers 428 are mounted in the longitudinal grooves 417 of the front plates of the housings and the grippers 429 are mounted in the longitudinal grooves 417 of the back plates of the housings. The grippers of each pair oppose each other and are pivotally-connected to the plates of the housing as at 430ᵃ and each gripper projects beyond the lower end of a vertical groove 416 and each gripper has its inner end formed with a right angular bend 430 which engages the bag, the angular bend of each pair of grippers oppose each other. That end of each gripper which extends across the lower end of the vertical groove 416, is beveled as at 431 and is adapted to be engaged by a means on the gripper actuating plate 422 to close the grippers. Each of the cam actuating gripper plates 422 is provided with a pair of vertically-disposed cam grooves 465 through which extend the beveled ends of a pair of grippers and the said plate 422 is furthermore provided with a pair of spring controlled members 466 which engage the beveled ends of the grippers to close the grippers. As the members 466 are spring controlled they are resilient so as to allow the grippers to engage the varying thicknesses of bag or if the bag should be doubled. The members 466 are pivoted at their lower ends as at 467 and the controlling spring for the members 466 is indicated by the reference character 468 and which engages the top of said members for spreading them apart.

Arranged at the rear of the frame 368 and loosely extending through the arms 421 which project from the gripper actuating plate 422, is a shaft 432, which has each end provided with a relatively wide pinion 433 adapted to mesh with the toothed portions 371 formed on the offsets 370 and the said pinions 433 are also adapted to mesh with vertically-disposed racks 434 secured to the supports 325 and 326. The arms 421 which project through the openings 423, not only constitute means for shifting the plates 422, due to the fact that the shaft 432 is vertically adjustable, but said arms furthermore constitute a means for elevating and lowering the carrier formed of the frames 367 and 368. The movement of the carrier however is after the actuation of the plates 422. The shaft 432 is connected to an oscillatory member 435, which projects rearwardly from the carrier and is pivotally-mounted in the vertically-disposed support 436 (Fig. 3) connected to the rear end of the supports 25 and 26. The oscillatory member 435 is provided with a rearward extending arm 437 which is pivotally-connected to the upper end of the rod 67. The offset portion 370 of the rear frame 368 and above and below the toothed portions 371, are provided with recesses 438. Pivotally-connected to the supports 367 and 368 between the racks 434 and the said supports are upper and lower holding lever arms 439, 439ᵃ, each of these arms has its free end provided with a rearwardly-extending angular portion 440 adapted to be engaged by the brackets 372ª for holding the carrier upwardly during the downward movement of the gripper actuating plates 422. During the downward movement of the plate 422, the pinions 433 mesh in the toothed portions 371 and the racks 434 thereby forming a locking device to hold the carrier up while the angular portions 440 are moved out of the path of the brackets and also to prevent a sudden downward movement of the housing. When the plates 422 have moved to the limit of their downward movement to close the grippers on the bag, at this time, the pinion has moved down over the toothed portions 371 into the lower recesses 438, thereby allowing the carrier to move downwardly. On the upward movement of the plate 422, a like action takes place, by utilizing the lower arms 439ª and the upper recesses 438. The holding of the carrier upwardly and downwardly is temporarily and until the plates 422 have been shifted to move the grippers to operative position, that is to engage the bag, just about the time this operation has taken place, the pinions 433 will pass off the pivoted end of the levers 439 or 439ª, whereby the angular ends 440 of that pair of levers 439 or 439ª will move from the path of the brackets 383ª and the carrier can then be moved upwardly or downwardly as the case may be. Connected to the rear frame 368 is a locking mechanism, the function of which is, that when the grippers are closed, this locking mechanism drops over the top of the shaft 432 in order to hold the shaft 432 in its position and also to prevent the housing from rubbing against the frame 368 that is carried by the shaft.

The locking mechanism consists of a shaft 441 mounted in bearing brackets 442, carried by the offset portions 370 of the rear frame 368, and the said shaft 441 at each end has connected thereto a vertically-disposed arm 443 provided with a roller 444 and connected at its upper end to a spring 445, the latter being attached to the front frame as at 446. The shaft 432 is of a length as to project from the pinion 433, and against the arms 443, and the said arms 443 are provided with forwardly extending studs 447, which are adapted to engage laterally-extending lugs 448 carried by the lower end of the racks 434, whereby when the carrier is at the limit of its downward movement, the said studs 447 will engage the lugs 448, and swing the arms 443 rearwardly, releasing the projecting ends of the shaft 432 so that the carrier can be moved upwardly. The springs 445 constitute means for returning the arms 443 to their normal position, after the projecting ends of the shaft 432 have passed beyond the rollers 444. The springs 445ª carried by the supports 325 and 326 constitute means for maintaining the free ends 440 of the levers 439 and 439ª in the path of the bracket 383ª.

The bag feeding element of the feeding mechanism comprises a pair of vertical movable carriers and as each of these carriers are of the same construction, but one will be described. The carriers are oppositely disposed with respect to each other and each consists of a vertically-disposed body portion 449 which is substantially U-shaped in sectional plan and is provided at its front and rear with three exteriorly-arranged vertically-disposed ribs 450, 451, and 452. The ribs upon the front oppose the ribs upon the rear and the said body portion is of less height than the housing. Each vertically-movable carrier is mounted in a housing and the ribs 452 extend through the vertical opening 415ª of the housing, the ribs 450 and 451 are enlarged at their lower ends, while the ribs 452 are the same width throughout. The ribs with the exception of the enlarged portions 453 of the ribs 450 and 451 are flush with the outer face of the plates of the housing. Pivotally-mounted between the enlarged ends of the ribs 450 and 451 is the vertically-disposed offset 454 of a suspension arm 455. Said arm 455 extends transversely with respect to the machine and below the body portion 449 as well as inwardly of the said body portion. The inner ends of each of the suspension arms 455 is formed with a depending grooved extension 456, in which is pivotally-mounted a lever arm 457 as at 457ª. The lever arm 457 projects above the arm 455 and is formed with a vertically-disposed lug 458. The lower end of each of the extensions 456 is bifurcated and pivoted as at 456ª in said bifurcated end, is a pair of gripping jaws 459, which are oppositely-disposed with respect to each other and which when operated, move toward each other, so as to grip the edges at mouth end of the bag to open said end when the carriers are moved apart. Surrounding the gripping jaws 459 is the recessed lower end 456ᵇ of the lever arm 457, and when the said lever arm 457 is moved on its pivot in one direction, the lower end 456ᵇ of said arm 457 will move around and engage the jaws 459 closing them so that they will grip the sides of the mouth end of the bag. Projecting from the offset portion 454 of each of the suspension arms 455, and extending outwardly of the housing and in the path of the angular ends 391 of the lever arms 389, is a protuberance 460, which when engaged by the angular ends of the lever arms 389, will shift the suspension arms 455 upon their pivots so as to swing the extensions 456 away from each other. Connected to the side of each body portion 449 is a vertically-disposed rod 461 which is provided with a head 462. The said rods 461 project through the bosses 418 and above the carrier, and each has mounted thereon a coil spring 463, which is interposed between the head and the bosses 418 of the housing 412. The function of the spring 463 is to maintain the body portions 449 in an elevated position, that is to say, against the lower face of the top of the housings when the housings are lowered. The body portions 449 are always held in an elevated position, that is against the tops of the housings 412, until the heads 462 of the rods 461 engage the stops 360ª, whereby as the carrier moves upwardly, the body portions 449 will be caused to move to the bottom of the housings, for a function to be hereinafter referred to. The shifting of the protuberance 460, by the angular end 391 of the lever arm 389, is had against the action of a spring 464, (Fig. 20) which when the protuberance 460 is released from engagement with the angular end 391 of the lever arm 389, the spring 464 returns the suspension arm 455, to its normal position, which is toward the other extension 456 of the other suspension arm 455. Each body portion carries two suspension arms, the front suspension arm of one body portion associates with the front suspension arm of the other body portion, so that the two front depending extensions of the two front suspension arms will engage one side of the bag and the other suspension arms will engage the other side of the bag.

Pivotally-connected to the front and to the rear of the body portion 449 is a latch arm 469, which is adapted to engage the protuberance 460, for holding the extensions 456 apart to allow the bag to pass down between the openers in a free manner, or in other words, so as to not impede the passage of the bag as it moves toward the jaws 459 so the jaws can engage the bag at the proper point. The latch arms 469 are adapted to hold the extensions in an open position when the lever arms 398 and 403 are clear of the protuberances. As the carriage moves upwardly, owing to the actions of the springs 463 the extensions 456 are moved together. On a further movement of the carriage the protuberances, which project from the front plates of the housing are engaged by collars 470 on the shaft 373, these collars engage the protuberances 460, swinging the same in and allowing the latch arms 469 to engage the protuberances and hold the outer extensions of the pair away from the inner extensions. The protuberances 460 which project from the rear of the housings, are engaged by the shaft 432, so as to shift the inner extensions away from the outer extensions, whereby the latch arms again swing at the rear of the protuberances 460, so that when the collars 470 on the shaft 432 pass clear of the protuberances 460, the springs 463 will force the protuberances 460 outwardly, and their movement will be arrested by the latch arms 469, whereby the extensions will be maintained in an open position until the latches are released. The latches 469 are released by depending pins 471, carried by the front and rear frames of the carriage and as the carriage moves downwardly the pins 471 move therewith, the movement of the body portions 449 being prevented, owing to the fact, that the heads 462 of the rods 461 engage with stops as before stated. As the carriage continues to move downwardly, the pins 471 engage with the latch arms 469 to shift them clear of the protuberances, whereby the springs 463 return the extensions to normal position, that is to say, each pair of openers to a closed position and grip the bag. On a further movement of the carriage downwardly, the rock shafts 382 and 384 are actuated and swing the lever arms 389 and 395 inwardly, which engage the protuberances 460 and move the openers apart whereby the mouth end of the bag is opened, and on a further downward movement of the carriage the bag is positioned on the holding arms, but the openers are released from the bag just about the time the bag is positioned upon the upper end of the bag holding arms. On the downward movement of the carriage the jaws 459 are moved together by the dovetailed plates 396 and 404 engaging with the lugs 458 of the levers 457, shifting them in the extensions 456, whereby the jaws are moved together and bite the bag so that when the extensions are open, the jaws carry the sides of the bag therewith to open the mouth end of the bag. The dove-tailed plates 404 and 396 remain in engagement with the lugs 458 until the lever arms 389 and 398 shift the suspension arms to move the lugs 458 clear of the dove-tailed plates 396 and 404 and as the lever arms 457 are moved against the action of the springs 473, it is evident, that when the dove-tailed plates are clear of the lugs 458, the springs 473 will shift the lever arms in an opposite direction whereby the jaws are opened and the bag released. This action is had just about the time the mouth end of the bag is being positioned upon the ends of the bag holding arms. The grippers however are not released until the bag is positioned upon the holding arms in proximity to the shoulders 41. The grippers are released from the bag when the cam plates 422 move upwardly but are moved to engagement with the bags when the cam plates are moved downwardly. The body portions 449 are recessed as at 474 and one wall of each of the said recesses 474 is adapted to engage on the upward movement of the carriage, the upper ends of the stop arms 361, so as to shift them upon their pivots and move the angular ends thereof clear of the lower end of the tracks, so that the bag can be pulled off the track by the grippers.

*Bag receiving mechanism.* (Figs. 1, 81 and 82.)—Associating with the bag delivering mechanism and arranged in operative relation with respect thereto, is, what may be termed, a bag receiving mechanism to which the bags are delivered and which also constitutes a means for counting the number of bags strung as well as arranging the bags in packs. The bag receiving mechanism comprises a conveyer wheel 475 formed with a circumferential series of pockets 476, each adapted to contain a predetermined number of bags, by way of example twenty-five, and arranged within each of the pockets 476 is a spring controlled follower 477, said follower has connected thereto a rod 478 which extends through the bottom of each pocket and which has its inner end loosely extending in a socket formed in the hub 480 of the wheel 475. Connected at one end to a collar 481 mounted on the rod 478 and attached at its other end to the hub 480, is a spring 482, which surrounds the rod 478 and the function thereof is to maintain the follower 477 in a projected position. The outward movement of the follower 477 is limited by the collar 481, which engages the inner face of the bottom of the pocket 476. The conveyer wheel 475 is intermittently operated in a manner as hereinafter set forth and is loosely mounted upon a shaft 483, which is fixed to a bearing 484 (Fig. 3) carried by the uprights 282. The shaft 483 projects inwardly from the bearing 484 and has loosely mounted thereon an intermittent gear 485 and interposed between the gear 485 and the conveyer wheel 475 and connected to the said wheel 475 is a female geneva 486. Supported in bearings 487 which project inwardly from the uprights 282, is a longitudinally extending rotatable shaft 488, which has its ends projecting from the bearing 487 and carries on one projecting end a sprocket pinion 489 and the shaft 488 also carries an intermittent pinion 490. Fixed to the transmission shaft 11 is a sprocket pinion 491 (Fig. 4) and engaging the sprocket pinions 489 and 491 is a transmission belt 492, which also travels over an idler 493, carried by an arm 494 projecting from the shaft 173. When the transmission shaft 11 is operated motion will be imparted to the shaft 488 as is obvious. The intermittent pinion 490 meshes with the intermittent gear 485 and is adapted to intermittently rotate the same, the ratio being 5 to 1. Mounted in bearings 495 carried by the uprights 282 and projecting inwardly therefrom is a rotatable shaft 496 having fixed thereon, a female geneva 497, which is adapted to be engaged and intermittently operated by a protuberance 498 which projects from the intermittent gear 485. Every one revolution of the intermittent gear 485 imparts a one-fifth revolution to the female geneva 497. Carried by the shaft 496 and rotated thereby, is a male geneva 499, which is arranged in the path of the female geneva 486, and at every revolution of the female geneva 497, it actuates the male geneva 499 and as the latter engages with the female geneva 486 it shifts the same one-twelfth of a revolution. This action is had in view of the fact that the conveyer wheel 475 is provided with twelve pockets, and the period between the shiftings of the female geneva 486 is of such duration, as to allow twenty-five bags to be deposited in a pocket 476, and after the depositing of the twenty-fifth bag, the female geneva 486 is shifted one-twelfth of a revolution to position an empty pocket for the reception of the completed bags.

Surrounding the conveyer wheel for a portion of its circumference is a pair of fixed retaining members 500, these members extend around eleven of the pockets, but that pocket over which the retaining members do not extend, is always at the upper side of the wheel so that the bags therein cannot fall out. The members 500 retain the bags in the pockets during the intermittent rotation of the wheel and at the same time prevent the follower from forcing the bags from the pocket. When the pocket over which the retaining members do not extend clears the retaining members and if the operator should not be present to remove the bags from the pocket, the follower 477 will be released and then projected outwardly by its spring thereby discharging the bags from the pocket. The retaining members are connected to the arms 501, 502 and 503 which project from the uprights 282 and extend transversely with respect to the conveyer wheel 475. The retaining members 500 are secured to the inner faces of the arms 501, 502 and 503. The conveyer wheel 475 has associating therewith what may be termed a holding down member 504, which engages the last bag placed in the pocket and holds the bags down, so that they can pass under the retaining members 500, when the conveyer wheel is shifted to position an empty pocket for the reception of the bags. The holding down member comprises two fingers carried by a rock arm 505, loosely mounted in the upper end of a lever 506, which is arranged at the inner face of the conveyer wheel 475 and which is pivoted as at 507 to the bearing 584, and has its lower end provided with a stud 508, upon which is pivotally-mounted an arm 509, having a notch 510, which is adapted to be engaged by the protuberance 511 of the intermittent gear 485, but the engagement of the protuberance in the notch 510 is not had until the arm 509 has its free end elevated, the elevating of the free end of the arm 509 is caused by a stud 509ª, which is carried on the inner face of the female geneva 497. The elevating of the arm 509 is not had until the female geneva 497 makes a complete revolution. If the arm is elevated, the notch can then receive the protuberance 511 and as the intermittent gear continues to travel the lever 506 is rocked on its pivot, which moves the holding down member 504 to a position to engage the bags in the pockets to compress them, so that they can pass under the members 500. The shifting of the member 504 is had against the action of the spring 513, which is connected at one end to the lever 506 and at its other end to an arm 514 which projects from the member 504. The latter is provided with a roller 515 which travels over a track 516 on a bracket secured to one of the uprights 282. The lever 506 is provided with an extension 517 at a point above its pivot and which is adapted to be engaged by the protuberance 498ª on the intermittent gear 485 for shifting the lever 506 back to its inoperative position, thereby moving the member 504 from over the bags and also from over the pocket which has been positioned to receive the bags from the delivering mechanism.

The bag receiving mechanism has as an element thereof a combined bag holding down and spreading device, the function thereof is to hold the bags down in the pocket as they are being fed thereto and against the action of the follower 477 and a further function is, to smooth out or spread the bags after they have been delivered to the pocket. The said combined bag holding down and spreading device consists of an intermittently operable shaft 518, mounted in the angular upper ends 519 of the uprights 282, the said shaft 518 projects from each of said angular ends and one of the foregoing ends of the shaft 518 is provided with a sprocket pinion 520, and also with an actuating member 521 for the trip arm 317. Said trip arm as before stated associates with the bag delivering mechanism. Fixed to the geneva 48, is a sprocket pinion 522 and traveling over the said pinion and the pinion 520 is a transmission belt 523, which also engages an idler 524 suspended in the bracket 525 from the platform 6. The geneva 48 is operated by a roller 526 carried by a cam disk for one of the knotter mechanisms to be hereinafter referred to. Fixed to the shaft 518 so as to be carried thereby is a holder formed of three arms, the intermediate arm indicated by the reference character 528 being of greater length than the outer arms 527. Pivoted to one face at the inner ends of the outer arm are T-shaped members 529 and 530 and pivoted to the other face at the outer ends of the outer arms are the T-shaped members 531 and 532. The T-shaped members are arranged in pairs, and one member of one pair is formed with a notch 533 and the other member of the same pair is formed with a lug 534 adapted to enter the notch 533. Each of the T-shaped members is provided with an arm 535, to which is pivotally-connected a spring controlled finger 536 extending at right angles with respect to its arm. The fingers which are carried by the members 529 and 530 extend in an opposite direction with respect to the fingers 536 carried by the members 531 and 532. The inner end of each finger is provided with an angular extension 537 which is connected to one end of a spring 538, the latter having its lower end connected to an outer arm of the holder. Each end of the intermediate arm 528 is bifurcated as at 540 and extending in each of the furcations is a stud 541 which projects from an angle-shaped presser plate 542. The stud 541 is pivotally-connected to the bifurcated end of the arm 528 and the said presser plate has connected thereto a spring 543, the latter being also connected to the intermediate arm 528. The presser plates 542 have their outer ends extending in opposite directions with respect to each other and the function of the said plates is to hold the bag down in the pockets against the action of followers 477. The fingers 536 constitute means for smoothing or spreading the bag after the bag is delivered to the pocket and also hold the bag in the pocket. The fingers of each pair normally are arranged in close proximity to each other, but when performing their spreading function they move laterally with respect to the pocket and such movement is had through the medium of a cam 544, mounted upon the other projecting end of the shaft 518 and which is adapted to engage the member 530 or the member 532 when either of said members has the arms 535 thereof extending downwardly and with the fingers projecting over the bags fed to the pockets. The cam 544 has an arm 545 extending inwardly therefrom and which is pivotally connected to a lifting arm 546, which has its lower end 547 enlarged and provided with an elongated slot through which extends the shaft 488. The latter has fixed thereto a cam 548, which is adapted to engage a roller 549, carried by the end 547 of the arm 546, whereby said arm will be elevated and thereby shift the cam 544, so that the latter will engage either the member 530 or the member 532 and shift it on its pivot and owing to the engagement of the lug 534 in the notch 533 in the member 530 or the member 532, either of these members, as the case may be, will be rocked on its pivot. When the members 529 and 530 or the members 531 and 532 are rocked on their pivots, the fingers 536 are moved laterally with respect to the pockets and spread or smooth the bag out, as well as hold it in the pocket. The angular end of one of the uprights 282 is provided with a stop 550 to limit the upward movement of the arm 545. Mounted upon the shaft 48, at the outer face of the conveyer wheel 475, is a collar 551, provided with a pair of vertically-disposed inclined bars 552, which have connected to their upper ends a plate 553 positioned in alinement with the outer end of that pocket which is receiving the bags to prevent the bags from sweeping out of the pockets. The plate 553 is provided with an angular extension 554 to prevent the strings from hanging upon the plate 553, which would be the case if said plate 553 was cut off abruptly or had a flat edge.

*Bag retaining means.* (Figs. 70, 71 and 74.)—The function of this device is to retain the bag on the turning head after the bag has been turned and while the head is turning during the spreading operation. The said retaining device embodies a spring controlled retainer arm 555, which is pivoted in extensions 556 of the turning head, the pivot for said arm being indicated at 557. The arm 555 projects beyond the pivot 557 and also beyond the extensions 556 and connected to the one end of the retainer arm 555, is a pair of rollers 558, which are adapted to engage the track 559 so as to shift the arm 555 away from the turning head to allow the bag to pass downward on the head. The rollers 558 only ride on the track 559 when the bag turning mechanism straightens up to turn the bag and when it comes down with the bag. When the bag turning mechanism extends in a horizontal position the rollers 558 are thrown clear away from the track as shown in Fig. 71. The shifting of the arm 555 by the track 559, is had against the action of the spring 560, so that when the rollers 558 clear the track 559, the spring 560 will swing the arm in an opposite direction, causing the upper end of the arm to bear against the bag on the retainer head and hold the bag thereon. The action of the spring 560 is such as not to prevent the delivering arm from withdrawing the bag from the turning head. The rollers 558 ride against the track 559 as it moves upwardly, while extending vertically.

The platform 6 at each end has secured thereto a receptacle 561 for a ball of thread 561ª. The receptacles are oppositely disposed with respect to each other at the ends of the machine and are provided with openings for the passage of the thread.

*Knotter mechanism.* (Figs. 52 to 68.)— The function of the knotter mechanism is to catch the thread after it has been successively inserted through both hems of the bag, then knot the thread and then cut the thread so that the completed string will slip away from the knotter, to enable the bag with the pair of strings to be stripped from the holding arms. Two knotter mechanisms are employed, but as the construction of both knotters is the same, but one will be described, the same reference characters being applied to both. There is a knotter mechanism positioned in suitable relation with respect to each pair of needle-guides, and the knotter mechanism upon one side of the machine associates with the needle upon the opposite side of the machine; and the position of the knotter mechanism is such, that when the needle passes through the guide of each pair of thread-guides, it will also enter an element of the knotter mechanism, said element catching the thread and holding it while the needle withdraws, after which it is given a half turn and forms a portion of the knot as at A, Fig. 42. After the needle is withdrawn and is shifted so as to pass through the other guide of each pair of needle guides, the knotter mechanism will also be shifted, so as to again receive the needle and catch and hold the thread while the needle withdraws, the knot being as shown at B, Fig. 44. While the needle is in the knotter, Fig. 43, the thread is pulled so as to assume the shape shown at C, Fig. 46. The needle withdraws from the knotter and the thread is cut. The knot is then completed.

Each of the knotter mechanisms is arranged in a plane between a needle guide and a transverse wall of the opening 7 and the elements of the knotter which catch the thread, as well as tie the knot, when in operative position extend at an inclination with respect to the perpendicular. Each of the knotter mechanisms consists of a vertically-disposed rectangular frame 563, with the lower bar of the frame enlarged as at 564 and provided with an opening 565 and a boss 566. One of the side bars of the frame indicated at 567 is provided with a threaded opening 568 and a boss 569. Mounted upon the inner end of the shaft 20 is a disk 570 and mounted upon the inner end of the shaft 21 is a disk 571, upon the disk 570 is secured the roller for operating the Geneva element 48. One of the frames 563 is mounted upon the inner end of the shaft 20 in proximity to the disk 570 and the other of the frames 563 is mounted on the shaft 21 in proximity to the disk 571. The frames 563 are capable of being oscillated upon the inner ends of the shafts 20 and 21 and to provide for the oscillations of the frames 563, to one frame is pivotally-connected a link 572 and to the other frame is pivotally-connected a link 573, these links are oppositely-disposed with respect to each other, so as to oscillate the frames 563 alternately in opposite directions with respect to each other. The links 572 and 573 are pivotally-connected to collars 574 mounted upon the rock shaft 118. The top bar 575 of each frame 563, is provided with an opening 576 and the lower bar 564 of the frame is formed with a bearing socket 577 and an opening 577ª and mounted in said socket 577 and extending through the opening 576 is a vertically-movable and rotatable operating shaft 578. The shaft 578 is provided with a vertically-disposed key 579 for coupling to the shaft 578, a pinion 580 which when driven is adapted to rotate the shaft 578. The operating shaft 578 is grooved from end to end as at 581, and is further provided with a vertically-extending groove 572, which is disposed substantially at right angles with respect to the groove 581. The pinion 580 is provided with an elongated hub 583 and the key 579 for coupling the pinion 580 to the shaft 578 is of greater length than the groove 584 in the hub 583, in which extends the key 579. The vertical movement of the shaft 578 is limited by the key 579 engaging the top wall of the groove 584. Mounted in the groove 581 and of a length as to extend below and slightly above the shaft 578 is a thread holding down bar 585, which at its upper end is formed with a right angularly disposed lug 586 and at its lower end with a right angular bend 587. The bar is formed at a point between its center and its lower end with a right angularly-disposed lug 588, which extends in an opposite direction with respect to the lug 586. The bar 585 is vertically movable and the lug 586 projects over the top of the shaft 578 and when the said bar 585 is lowered, the lug 586 engages the thread and pulls it down on the top of the shaft 578. Mounted in the groove 572 is a thread looper 589, provided below its center with a pair of spaced lugs, indicated at 590 and 591. The upper end of the looper 589 is provided with an overhanging inclined finger 592 and an overhead protuberance 593, the latter being separated from the finger 592 by a recess 594 having a curved wall. The looper 589 is of less length than the groove 582. Mounted upon the shaft 578 and surrounding the bar 585 and the looper 589, as well as being fixed to said shaft, is a collar 595 and mounted upon the lower portion of the shaft 578 and surrounding the bar 585, as well as being loosely mounted upon the said shaft is a collar 596. The latter is provided with a notch through which extends the lug 588. Fixed to the lower end of the shaft 578 and surrounding the bar 585 is a collar 597.

The collars 595, 596, and 597 do not interfere with the vertical movement of the bar 585. Surrounding the shaft 578 and interposed between the collars 595 and 596 is a coil spring 598 which is always in engagement with the upper face of the collar 596. The upper end of the shaft 578 is formed with an overhanging finger 599 to provide an eye 600 through which the needle extends, and the wall of the eye 600 is flared to constitute a guide for the needle during its travel through the eye. The top of the shaft 578 opposite the finger 599 is provided with a projection 602 which guides the thread when the knotters are shifted.

The inner face of each of the side bars of the frame 563, is formed with a vertically-disposed pocket 603, in which is seated a bar 604, which projects inwardly from the inner face of the side bars of the frame and the said bars 604 constitute guides. Vertically-movable upon the bars 604 are the slides 605 and 606, the slides being grooved at their ends whereby they can straddle the bars 604. The slides 605 are arranged above the slides 606. The slide 605 is what may be termed a thread looper operating slide and extends between the spaced lugs 590 and 591, and the slide 606 is what may be termed a shaft operating slide and said slide 606 is provided with an apertured boss 607 through which extends a shaft 578. The lower face of the slide 606 rests against the collar 597 on the downward movement of said slide and on the upward movement of said slide and on the upward movement engages the lug 588 of the thread holding down bar 585. The slide 606 is provided at its top with a pair of vertically-disposed spaced extensions 608, which are grooved on their outer face to straddle the bars 604 and each of said extensions has its inner face provided with an offset 609 constituting guides for a slide 610, the latter having its ends grooved whereby it can straddle the offset 609. The slide 610 constitutes a means for operating a thread puller to complete the formation of the knot just prior to the time that the knot is tightened. The slide 605 is formed with a pair of vertically-disposed extensions 611, which are grooved in their outer face whereby said extensions can straddle the bars 604. The inner face of each of the extensions 611 is offset as at 612, said offsets constitute guides for a slide 613, the latter has its ends grooved for straddling the offsets and constituting operating means for the thread cutters, said cutters severing the thread after the knot has been formed. Each of the slides 605, 606, 610, and 613 is provided with a laterally-extending stud 614. Upon the stud of the slide 605 is mounted a roller 615, upon the stud of the slide 606 is mounted a roller 616, upon the stud of the slide 610 is mounted a roller 617, and upon the stud of the slide 613 is mounted a roller 618. Each of the disks 570 and 571 has its inner face provided with four cam tracks indicated by the reference characters 619, 620, 621 and 622, the roller 616 is adapted to travel in the track 620, the roller 617 is adapted to travel in the track 619, the roller 615 in the track 621, and the roller 618 in the track 622. Each of the disks 570 and 571 is provided on its inner face with two sets of teeth indicated respectively at 623 and 624, the teeth are arranged at the perimeter of the disk. The teeth 624 are adapted to engage with pinion 580 and impart to the shaft 578 a half-revolution. This half revolution is imparted to the shaft, after the needle passes backward, the knotter is then shifted in the opposite direction to again receive the needle and to complete the loop and the knot, then as the needle moves backwardly the knotter is shifted in the opposite direction and during such operation the teeth 623 complete the revolution to the shaft 578. The upper end of the shaft 578 is bifurcated and mounted in the furcation is a vertically-disposed arm 625 which is pivoted to the shaft as at 626. The lower end of the arm 625 is enlarged, so as to project from each side of the shaft, the enlarged end of the arm being indicated at 627. The upper end of the arm 625 is reduced and is formed with a right-angularly disposed hook 628 having a recess 629 and an inclined surface 630. Secured upon the top bar 575 of the frame 563 is a cam plate 631, which is formed with a curved cut away portion 632, the wall of which is adapted to engage, when the shaft 578 is rotated, one side of the enlarged portion of the arm 625 and rock it on its pivot, whereby the hook 628 is swung clear of the upper end of the shaft 578 and out of the path of the means for pulling the thread through the loop. On a further rotation of the shaft 578, the other side of the lower portion of the arm 625 is engaged by the wall of the cut away portion 632 and the arm 625 is rocked in an opposite direction, to swing the hook 628 to its normal position, such position being the extending of the hook over the needle and its looper, in order to hold the side of the loop down in Fig. 37. The function of the hook 628 is to hold the thread down, while the finger 592 extends up between the thread and the needle just prior to the time that the thread is moved around the upper end of the looper 589, that is to say, around the finger 592 and the protuberance 593. Projecting from the upper end of the shaft 578, at one side of the upper end of the furcations at the top of the shaft, is a vertically-disposed tapering projection 633 which constitutes a guide for the thread, to prevent the thread from hanging under the finger 592, while the knotter is shifted bodily from one position to the other. One of the side bars of each frame 563 is provided with a vertically-disposed groove 634 in proximity to the bar 604. The groove 634 in one frame is in the rear side wall and the groove 634 in the other frame is in the front side wall. In each of the grooves 634 is arranged a vertically-disposed shift bar 635, which has its lower end formed with an angular extension 636 connected to the slide 610 on that side opposite to the side provided with the stud 614. Hold-fast devices 637 connect the extension 636 to the slide 610.

The shift bar 635 extends through and above the top bar 575 of the frame 563. Mounted upon and fixed to the upper end of the shift bar 635 is a base 638, provided with an opening 639 through which extends a rod 640, which is adapted to engage the top bar 575 of the frame 563 to shift the slide 641, the latter is mounted in an inverted L-shaped arm 642 carried by the base 638. The slide 641 is shifted against the action of a spring 643 and the rod 640 is shifted against the action of a spring 644. The slide 641 is provided with an opening 645 through which extends a hook 646 which depends from the arm 642. The opening 645 constitutes a guide for the hook 646 and the edge of the opening 645 bites the thread when the hook carries the thread and is elevated. The hook 646 pulls the thread through the loop to complete the formation of the knot, after which the thread looping mechanism hereinbefore referred to, in connection with the hook which holds the thread, draws the knot tight as said thread looping mechanism moves downwardly. When the shift bar 635 moves downwardly, the slide 641 is carried therewith and such movement is continued until the rod 640 engages the top bar of the frame 563, when on a further movement of the bar 635 the hook passes downwardly through the opening 645 and engages the thread. When the shift bar 635 moves upwardly, the hook 646 carries the thread up through the opening 645 and the edge of the opening bites the thread and holds it in position on the hook, so that the thread looping mechanism can perform its function to tighten the knot in connection with the hook 646. In connection with the knotter mechanism it will be stated that as the needle passes through a needle guide and travels to the knotter mechanism, the needle passes through the eye 600. After the needle has entered the eye 600 the holding down member 585 engages the thread and pulls it down on the top of the shaft 578 as the needle advances, at this time, the looper 589 is elevated and the finger 592 extends between the thread and the needle, the needle then moves backward. As the needle moves backward and clears the knotter, the shaft 578 is given a half revolution which loops the thread around the finger 592 and protuberance 593, the thread, prior to this operation passes through the eye 600 and under the hook 628. The knotter is then bodily shifted so that it will be arranged in the path of the needle on the next forward movement thereof. During the shifting of the knotter the shaft 578 is given a half revolution, so as to throw the hook 628 clear of the upper end of the shaft 578 and also to finish the loop and to position the recess 594 in the path of the needle as it advances. The thread is so positioned on the looper that as the needle advances, it will pass under one side of the loop and over the other side of the loop. While the needle is in the recess 594, its movement is temporarily arrested. During such stoppage of the needle, the hook 646 is lowered to catch that portion of the thread which extends under the lug 586 of the member 585. The hook 646 is then elevated to draw the thread through the loops between the thread and the needle and such operation completes the formation of the knot. During the step of drawing the thread by the hooks 646 the needle recedes. After the hook 646 has reached the limit of its upward movement, the thread is clipped. In this connection it will be stated that the needle recedes sufficiently to allow of the operation of the clipping mechanism, the needle having its receding movement temporarily arrested during the operation of the clipping movement. After the thread is clipped, the looping mechanism recedes and in connection with the hook 646 tightens the knot. After the knot has been tightened the hook 646 moves downwardly to release the thread.

The thread clipping or cutting mechanism which forms a part of the knotter mechanism consists of a vertically-movable plate 647 which extends in a pair of grooves 648 formed in the inner face of the side bars of the frame 563 and which is connected to the slide 613 by hold-fast devices so as to be actuated by said slide 613. The plate 647 is cut away as at 650 to provide a clearance for the pinion 580. Connected to the top of the plate 647 centrally thereof by the holdfast device 649 is the lower end of a vertically-disposed supporting arm 651, which extends through the top bar of the frame 563. The upper end of the arm 651 is bifurcated and arranged in the furcations, is a pair of blades 652 and 653 which associate with each other and arranged also in the furcations is a biting arm 654. The blades and arms 654 are mounted upon the pivot 655 and project below said pivot. The blades 652 and 653 extend in an opposite direction with respect to each other and the lower ends of the blades as well as the lower ends of the arm 654 are adapted to engage a pair of cam pieces 656, so that on the vertical movement of the shaft 578, the blades will be shifted toward each other to clip the string and the arm 654 will be shifted toward the blade 652 so as to bite the thread to hold it during the cutting operation. The cam pieces 656 are mounted upon the top bar of the frame 563. The arm 654 also bites and holds the thread during the operation of drawing the knot tight. The clipping and cutting of the thread is had after the needle recedes to allow sufficient thread to project free from the eye of the needle for the next operation of stringing the bag. When the arm 651 has moved upwardly, the blades 652 and 653 straddle the needle but do not close entirely to grip it. The arm 651 does not have a continuous upward movement, it pauses for a few moments so that sufficient time is allowed for the needle to pass clear of the blades and the blades are closed to an extent to cut the threads. This action is had by so shaping the cam track 622 to continue the upward movement of the arm 651 by the roller until the needle has passed clear of the blades. Each of the blades at its lower end is formed with a lug 657, which is engaged by the cam pieces 656, after the arm 651 starts to move upwardly again, the engagement of the lugs 657 with the cam pieces which shift the blades to cut the thread. Each of the blades 652 and 653 as well as the biting arm 654 is formed with a protuberance 658, which on the downward movement of the supporting arm 651 engages the cam pieces 656 and shifts the biting arm to inoperative position and also opens the blades 652 and 653.

*String reversing and loop releasing mechanism.* (Figs. 30 and 31.)—This mechanism is designed to properly position the draw strings after being connected to the bag, so as to prevent any possibility of the strings locking the bag closed when the mouth is drawn together and to furthermore release the thread looping mechanism from the thread after the knotted ends of the string are being pulled away from the sides of the bag. This mechanism consists of a pair of transversely-extending arms 659, 660 which are arranged over the needle guides and which are pivoted in the lug 661 carried upon the top of the needle guides at one end thereof. Each of the arms 659, 660 at its inner end is formed with a depending hook 662, which is normally maintained in a lowered position by the springs 663 which are interposed between the inner ends of the arms 659, 660, and the needle guides. The hooks 662 extend down between the needle guides of each pair and rest on the supporting bars of the needle guide mechanism. The arms 659, 660 are extended outwardly as at 664 so that when the needle guides are opened the projecting ends of the arms will be engaged by the rollers 665 carried by the supporting arm 210 secured to the platform 6, and owing to the engagement of the projecting ends of the arms 659, 660 with the rollers 665 the said arms will be rocked on their pivots thereby elevating the hooks 662. The normal position of the hooks 662 is at the outer vertical edges of the grippers of the bag holding arms, so that when the knot is drawn and released from the knott , the thread looping mechanism will recede, whereby the knotted ends of the strings will be drawn against the hooks 662. At this moment the needle guides begin to open which carry the hooks 662 therewith and draw the looped ends of the strings and the loopers toward the bag under the knotted ends of the strings. As the knotted ends of the strings are pulled outwardly the loopers are drawn toward the bag and with the looped end below the knotted end. In other words the knotted ends of the strings are pulled up through the looped ends of the strings. As the loopers are continued to be pulled toward the bag, the upper end of the hooks of the thread looping mechanism engages the shanks of the hooks 662, the hooks of the thread looping mechanism are rocked on their pivots and release the thread. The operating mechanism for the thread looping mechanism shifts the hooks of the thread looping mechanism inwardly to the extent of an engagement between the shanks of the hooks 662 and the vertical portions of the hooks of the looper mechanism so as to rock them on their pivots. After the thread looping mechanism has been released from the string the knotted ends are held by the hooks. When the hooks of the thread looping mechanism engage the shanks of the hook 662 so that the looper hooks will be shifted, the extensions 158$^b$ of the hooks of the looper mechanism will be moved under the knotted end of the string and hold it on the hook 662 until the strippers have pulled the bag from the holding arms down far enough to allow the looped end of the string to come against the side of the bag, at this time the looper hooks recede to allow the threads to slip off the hooks 662, and after another bag on the bag holding arm has been positioned in the path of the needles, the needle guides start to close and on their closing movements the outer ends of the arms 659, 660 pass clear of the rollers 665 and the hooks 662 are moved to their lowered position owing to the action of the spring 663.

*Bag holding arm spreading mechanism.* (Figs. 3, 7 and 106 to 112.)—The function of this mechanism is to spread a pair of bag holding arms after the bag has been positioned thereon to take up any slack in the bag. This mechanism consists of a pair of transversely-extending arms which are normally in what may be termed closed position and which are indicated by the reference characters 667 and 668 and are of a length as to extend to the opposite side of the center of the machine so as to engage the arms at a point just where they project from the extensions having the sockets in which the bag holding arms are secured. Mounted upon and connected to the platform 6 is a supporting bracket 669 provided with an inward extension 670 which is bifurcated as at 671. Mounted in the furcations 671 is a pair of pivoted supporting members 672, and each of which project from the extension 670 and is provided with a head 673 from which projects a headed stud 674. Pivoted upon the studs 674 are the arms 667 and 668. The pivots for the supporting members 672 are indicated by the reference character 675. Interposed between the supporting members 672 is a plurality of springs 675$^a$, the function of which is to maintain the spreading arms 667 and 668 into engagement with the inner ends of a pair of bag holding arms, so as to normally maintain said bag holding arms open or spread, so as to take up any slack in the bag during the passage of the needles with the thread through the hems at the mouth end of the bag. After the needle guides are opened to allow the turning mechanism to operate, the arms 667 and 668 are released from the bag holding arms and such release is had as follows: The arms 667 and 668 are extended outwardly from the stud 674 and the arm 667 at its outer end is formed with a vertically-disposed stud 676, and the arm 668 at its outer end has an angle-shaped extension 678$^a$ formed with a depending stud 678. Mounted upon the shaft 215 is a cross head 679 provided at each end with notches indicated as at 680, 681. In the notch 680 extends the stud 676 and in the notch 681 extends the stud 678. The foregoing mechanism which is used to maintain the bag holding arms extended or spread to take up any slack in the bag during the operation of the needle is operated from released position conjointly with the opening of the needle guides, to limit the movement in either direction of the supporting members 672, each of which is provided with a slot 683 through which extends a pin 684 carried by the extension 675.

The machine further comprises a means to maintain the needles out of the line of travel of the looper hooks, so that these latter will always take up the thread or string on the second stroke of the needles. The said means consists of a pair of transversely-extending beveled projections 682, which are secured to the members 107 so as to engage the needles, if they should be out of normal position and to hold the needles so they will go on the right side of the looper hooks, so that these latter can take up the thread, or in other words, if the needles should be sprung in a lateral direction in such a manner so as not to pass on the right side of the loopers on the second stroke of the needle, the projections 682 will hold the needle up to its work, so that the looper hooks will catch the thread.

The specific operation of the machine is as follows: It will be assumed that the clutch mechanism has been thrown so as to couple the machine with a prime mover. It will also be assumed that the bag has been positioned on a pair of bag holding arms and that the bag has been moved in the path of the line of travel of the needles, each of the latter being provided with thread, the latter passing through the combined thread holder and feeder to the needles, the needles advance and penetrate the hems upon opposite sides of the bag, the needles passing through the hems of the bag and carrying the thread to the knotters so that the latter will take up the thread to form a loop, each needle passing through a duplex needle guide as it travels toward a knotter mechanism. As the needles recede the knotter mechanism is actuated to form a loop, the needles recede until they clear the needle guides as well as the knotter mechanisms and until they reach the end of their backward stroke, after which the needles are transversely shifted and then advance to pass the thread through the hems at the opposite side of the bag. As the needles advance for the second stroke, the thread looping mechanism catches the thread to form what may be termed a loop in each string. The needles pass through the hems on the opposite sides of the bag, through the needle guides and into the knotters. As the needles recede the knotter mechanisms complete the knot. After the needles have reached the terminus of the second outward stroke they are again transversely shifted to the necessary position to enter the next bag to be strung. During the operation of the needles and knotter mechanism as well as the thread looper the bag holding mechanism remains idle. During the stringing of the bag the bag feeding mechanism positions a bag upon a pair of bag holding arms. After the operation of the needles and knotter mechanism and the positioning of the bag on the bag holding arms, the bag holding mechanism is shifted to position another bag in the line of travel of the needles and to further position a pair of bag holding arms in the line of travel of the bag feeding mechanism to receive another bag. After a pair of strings have been connected to the mouth end of the bag, the bag strippers, turner, and spreaders are thrown into operation, not only to strip the bag from the pair of holding arms, but to also turn the bag right side out and to further spread the bags. During the feeding of the bag to a pair of bag holding arms, the delivering mechanism removes a bag from the turning head and carries the bag to one of the pockets of the conveyer wheel, this mechanism operating in conjunction with the bag delivering mechanism. During the operation of the bag feeding mechanism and also the bag turning mechanism, the bag pushing mechanism is thrown into operation so as to engage a pair of bags upon the bag holding arms to shift the edges of the mouth end of the bag in parallelism with respect to each other, so that the hems will be properly positioned to receive the threads from the needles. The foregoing operations are carried out successively for stringing the desired number of bags. During the operation of the bag feeding mechanism after it places the bag upon a pair of bag holding arms, another bag is thrown downwardly, so that when another pair of bag holding arms is positioned in the path of the bag feeding mechanism the said last-mentioned bag will be mounted upon said arms. During the operation of the feeder the lowermost bag is severed from the bag above, so that it can be drawn by the grippers of the bag feeding mechanism down upon a pair of bag holding arms. The threads which couple the bags together constitute means for pulling the bags downwardly when the lowermost bag is engaged by the grippers of the bag feeding mechanism and as before stated when the feeding mechanism starts to place a bag upon a pair of bag holding arms, that is when the mouth end of the bag is opened, the strings which connect said bag to another bag are separated by the cutters.

After a bag is positioned the needles are operated, on the first stroke of the needles the knotters are alternately-disposed with respect to each other to receive the needles with the thread at the end of the forward stroke of the needles. As the needles move back on their outward stroke and clear the knotters the knotters are shifted alternately in opposite directions with respect to each other so that they will be disposed to receive the needles and the thread on the second forward stroke of the needles. Before the needles have their second stroke imparted to them, they are shifted transversely of the machine so that the knotters after being shifted will lie in the path of travel of the needles on the second forward stroke of the needles. During the operation of the needles and knotters, the bag feeding mechanism positions the bag upon a pair of bag holding arms and after the needles clear the bag on their second outward stroke, the needle guides open and the spreading means for the bag holding arms is released. After the needle guides are opened the bag turning and spreading mechanism is thrown into operation and during the operation of the bag turning and spreading mechanism, the needles and knotters are shifted transversely to dispose them at their first or normal position. On the second forward stroke of the needles the thread looping mechanism is thrown into operation and on the second outward stroke of the needles the draw string reversing mechanism is thrown into operation conjointly with the thread looping mechanism, whereby the knotted ends of the draw strings are pulled away from the sides of the bag and those ends of the draw strings held by the thread loopers are passed under the knotted portions of the strings so as to prevent any possibility of the draw strings locking the bag when the mouth end of the bag is pulled tight. While the needles are stringing the bag, the pushing mechanism is shifting the edges of the mouth end of a pair of bags, the delivering mechanism is removing a bag from the turning mechanism and depositing it in one of the pockets of the conveyer and the feeding mechanism is positioning a bag upon a pair of bag holding arms. The knotter mechanism is operated when the needles extend therein on the forward stroke of the needles, also operated on the first rearward stroke of the needle, operated when the needle enters the knotters on the second forward stroke of the needles and further operated on the second rearward stroke of the needles.

After the bag delivering mechanism delivers a bag in a pocket of the conveyer wheel, the combined bag holding and smoothing device is thrown into operation so as to engage the bag and hold it in the pocket against the action of the spring follower and to furthermore smooth out the bag when occasion so requires. The operation of the bag holding down and smoothing device is had during the time that a bag is stripped from the bag holding arm and during the turning of the bag by the turning head. After a predetermined number of bags has been delivered to a pocket, said number, by way of example, being twenty-five, the conveyer wheel is actuated to position an empty pocket in the line of the delivery mechanism to be filled and while the delivery mechanism is moving inwardly to take up a turned and strung bag. The conveyer wheel in which are arranged the pockets is intermittently operated, the bags being held in the pockets as the wheel revolves by the retaining band and until one pocket clears the retaining band. If the operator should not remove the bags they are projected therefrom by the follower. Just prior to the time of shifting a filled pocket from in the line of travel of the delivering mechanism, the bag holding down means extends across the bags in said filled pocket and holds the bags down so that the bags can pass under the retaining band.

In Fig. 88 is shown the completed bag, the bag being indicated by the reference character 323ª and the draw strings by the reference characters 324ª and 324ᵇ, and the tucked in corners of the bag by the reference character 323ᵇ.

What I claim is:—

1. A bag stringer machine comprising a bag holding mechanism and a bag feeding mechanism including means for severing bags successively from a chain of bags and further including means for engaging and opening the severed bags and positively placing them on the bag holding mechanism.

2. A bag stringer machine comprising a bag holding mechanism, and a bag feeding mechanism for feeding bags successively from a chain of bags to said bag holding mechanism and having as an element thereof cutters for disconnecting one bag of the chain from another.

3. A bag stringer machine comprising a bag holding mechanism, a bag feeding mechanism for mounting bags upon the holding mechanism, and a bag edge positioning mechanism having as an element thereof a plurality of pushers for positioning the edges at the mouth end of the bag in parallelism with respect to each other when the bags are upon the holding mechanism.

4. A bag stringer machine comprising a bag holding mechanism, a bag feeding mechanism for mounting bags upon the holding mechanism and having as an element thereof bag mouth openers, and a bag edge positioning mechanism having as an element thereof a plurality of pushers for positioning the edges at the mouth end of the bag in parallelism with respect to each other when the bags are upon the holding mechanism.

5. A bag stringer machine comprising a bag holding mechanism, a bag feeding mechanism for mounting bags upon the holding mechanism and having as an element thereof a plurality of grippers for carrying the bags to the holding mechanism, and a bag edge positioning mechanism having as an element thereof a plurality of pushers for positioning the edges at the mouth end of the bag in parallelism with respect to each other when the bags are upon the holding mechanism.

6. A bag stringer machine comprising a bag holding mechanism, a bag feeding mechanism for feeding bags successively from a chain of bags to said bag holding mechanism, and a bag edge positioning mechanism having as an element thereof a plurality of pushers for positioning the edges at the mouth end of the bag in parallelism with respect to each other when the bags are upon the holding mechanism.

7. A bag stringer machine comprising a bag holding mechanism, a bag feeding mechanism for feeding bags successively from a chain of bags to said bag holding mechanism and having as an element thereof cutters for disconnecting one bag of the chain from another, and a bag edge position mechanism having as an element thereof a plurality of pushers for positioning the edges at the mouth end of the bag in parallelism with respect to each other when the bags are upon the holding mechanism.

8. A bag stringer machine comprising thread carrying and thread inserting needles, a bag holding mechanism for successively positioning bags in the path of the needles for the insertion of threads therein, and a bag feeding mechanism including means for successively opening and then mounting the bags positively upon said holding mechanism.

9. In a bag stringing machine, a bag feeding mechanism including bag mouth openers each comprising two pairs of pivoted supporting members, a pair of jaws pivoted in and projecting from the inner side of each of said members of each pair, a pivoted actuating member for each pair of jaws, each of said actuating members mounted in a supporting member and having its lower portion surrounding a pair of jaws and adapted when actuated in one direction to move the jaws of a pair toward each other for gripping the sides of a bag at the mouth end for opening the latter when the lower portions of the supporting members move outwardly, means for shifting the supporting members, and means for shifting the actuating members.

10. In a bag stringing machine, a bag feeding mechanism including bag mouth openers each comprising two pairs of pivoted supporting members, a pair of jaws pivoted in and projecting from the inner side of each of said members of each pair, a pivoted actuating member for each pair of jaws, each of said actuating members mounted in a supporting member and having its lower portion surrounding a pair of jaws and adapted when actuated in one direction to move the jaws of a pair toward each other for gripping the sides of a pair at the mouth end for opening the latter when the lower portions of the supporting members move outwardly, means for shifting the supporting members, means for shifting the actuating members, and a carrier for each pair of supporting members.

11. In a bag stringing machine, a bag feeding mechanism including bag mouth openers each comprising two pairs of pivoted supporting members, a pair of jaws pivoted in and projecting from the inner side of each of said members of each pair, a pivoted actuating member for each pair of jaws, each of said actuating members mounted in a supporting member and having its lower portion surrounding a pair of jaws and adapted when actuated in one direction to move the jaws of a pair toward each other for gripping the sides of a pair at the mouth end for opening the latter when the lower portions of the supporting members move outwardly, means for shifting the supporting members, means for shifting the actuating members, a carrier for each pair of supporting members, and a spring controlled laterally movable housing for each of said carriers.

12. A bag stringing machine including draw string inserting needles, a bag holding mechanism for successively positioning bags in the path of the needles for the insertion of the strings therein, and a bag feeding mechanism for feeding bags successively from a chain of bags to said bag holding mechanism and having as an element thereof cutters for disconnecting one bag of the chain from another.

13. A bag stringing machine including draw string inserting needles, a bag holding mechanism for successively positioning bags in the path of the needles for the insertion of the strings therein, a bag feeding mechanism for feeding bags successively from a chain of bags to said bag holding mechanism and having as an element thereof cutters for disconnecting one bag of the chain from another, and a bag edge positioning mechanism having as an element thereof a plurality of pushers for positioning the edges at the mouth end of the bag in parallelism with respect to each other when the bags are upon the holding mechanism.

14. A bag stringer machine comprising draw string inserting needles, a bag holding mechanism for successively positioning bags with the mouth end opened in the path of the needles for the insertion of the strings therein, a bag feeding mechanism for successively opening the mouth end of the bags and then mounting the bags onto said holding mechanism, needle guide mechanisms for said needles, looper mechanisms coöperating with said needles, and knotter mechanisms coöperating with said needles for knotting the threads inserted by the needles at the mouth end of the bag to form a pair of draw strings.

15. A bag stringing machine including thread carrying and inserting needles, a bag holding mechanism for successively positioning bags with the mouth end opened in the path of the needles for the insertion of threads therein, a bag feeding mechanism including means for feeding bags successively with the mouth end opened from a chain of bags, then mounting the open bags onto said bag holding mechanism, needle guide mechanisms for said needles, looper mechanisms coöperating with said needles, and knotter mechanisms coöperating with said needles for knotting the threads inserted by the needles at the mouth end of the bag to form a pair of draw strings.

16. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, needle guide mechanisms for said needles, looper mechanisms coöperating with said needles, and knotter mechanisms coöperating with said needles for knotting the threads inserted by the needles at the mouth end of the bag to form a pair of draw strings.

17. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, and knotter mechanisms coöperating with said needles for knotting the threads inserted by the needles at the mouth end of the bag to form a pair of draw strings.

18. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, and knotter mechanisms coöperating with said needles for knotting the threads inserted by the needles at the mouth end of the bag to form a pair of draw strings.

19. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, and knotter mechanisms coöperating with said needles for knotting the threads inserted by the needles at the mouth end of the bag to form a pair of draw strings.

20. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotter end of one draw string with respect to the looped end of the other draw string.

21. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string.

22. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string.

23. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string.

24. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string.

25. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, a bag edge positioning mechanism having as an element thereof a plurality of pushers for positioning the edges at the mouth end of the bag in parallelism with respect to each other when the bags are upon the holding mechanism, needle guide mechanisms for said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string.

26. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, and a bag delivering mechanism arranged in operative relation with respect to said bag stripping, turning and stretching mechanism.

27. A bag stringing machine including thread carrying and thread inserting needles, a bag holding mechanism for successively positioning bags in the path of the needles for the insertion of threads therein, a bag feeding mechanism for feeding bags successively from a chain of bags to said bag holding mechanism, needle guide mechanisms for said needle, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, and a bag delivering mechanism arranged in operative relation with respect to said bag stripping, turning and stretching mechanism.

28. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, and a bag delivering mechanism arranged in operative relation with respect to said bag stripping, turning and stretching mechanism.

29. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, and a bag delivering mechanism arranged in operative relation with respect to said bag stripping, turning and stretching mechanism.

30. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, and a bag delivering mechanism arranged in operative relation with respect to said bag stripping, turning and stretching mechanism.

31. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, a bag edge positioning mechanism having as an element thereof a plurality of pushers for positioning the edges at the mouth end of the bag in parallelism with respect to each other when the bags are upon the holding mechanism, needle guide mechanisms for said needle, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, and a bag delivering mechanism arranged in operative relation with respect to said bag stripping, turning and stretching mechanism.

32. A bag stringer machine comprising thread carrying and inserting needles, a bag holding mechanism for successively positioning bags in the path of the needles for the insertion of threads therein, a bag feeding mechanism for successively mounting the bags upon said holding mechanism, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the positioning of the knotter end of one draw string with respect to the looped end of the other draw string, a combined bag stripping, turning and stretching mechanism arranged in operative relation with respect to the bag holding mechanism, a bag delivering mechanism arranged in operative relation with respect to said bag stripping, turning and stretching mechanism, and a bag receiving and pack forming mechanism associating with said bag delivering mechanism.

33. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, needle guide mechanism for said needle, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, a bag delivering mechanism arranged in operative relation with respect to said bag stripping, turning and stretching mechanism, and a bag receiving and pack forming mechanism associating with said bag delivering mechanism.

34. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the positioning of the knotted end of one draw string with respect to the looped end of the other draw string, a combined bag stripping, turning and stretching mechanism arranged in operative relation with respect to the bag holding mechanism, a bag delivering mechanism arranged in operative relation with respect to said bag stripping, turning and stretching mechanism, and a bag receiving and pack forming mechanism associating with said bag delivering mechanism.

35. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, a bag delivering mechanism arranged in operative relation with respect to said bag stripping, turning and stretching mechanism, and a bag receiving and pack forming mechanism associating with said bag delivering mechanism.

36. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, a bag delivering mechanism arranged in operative relation with respect to said bag stripping, turning and stretching mechanism, and a bag receiving and pack forming mechanism associating with said bag delivering mechanism.

37. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, a bag edge positioning mechanism having as an element thereof a plurality of pushers for positioning the edges at the mouth end of the bag in parallelism with respect to each other when the bags are upon the holding mechanism, needle guide mechanisms for said needle, looper mechanisms coöperating with said needles, knotter mechanisms coöperating with said needles for knotting the threads inserted by the needles at the mouth end of the bag to form a pair of draw strings, means coöperating with said looper mechanisms for reversing the position of the knotted end of one draw string with respect to the looped end of the other draw string, a combined bag stripping, turning and stretching mechanism arranged in operative relation with respect to the bag holding mechanism, a bag delivering mechanism arranged in operative relation with respect to said bag stripping, turning and stretching mechanism, and a bag receiving and pack forming mechanism associating with said bag delivering mechanism.

38. A bag stringer machine comprising thread carrying and thread inserting needles, a bag holding mechanism for successively positioning bags in the path of the needles for the insertion of threads therein, a bag feeding mechanism for successively opening and then mounting the bags onto said holding mechanism, needle guide mechanisms for said needles, looper mechanisms coöperating with said needles, and knotter mechanisms coöperating with said needles for knotting the threads inserted by the needles at the mouth end of the bag to form a pair of draw strings and having as an element thereof cutters for severing the threads between the knotting mechanism and the needles after the knots have been formed by the knotter mechanisms.

39. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, needle guide mechanisms for said needles, looper mechanisms coöperating with said needles, and knotter mechanisms coöperating with said needles for knotting the threads inserted by the needles at the mouth end of the bag to form a pair of draw strings and having as an element thereof cutters for severing the threads between the knotting mechanism and the needles after the knots have been formed by the knotter mechanism.

40. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, needle guide mechanisms for said needles, looper mechanisms coöperating with said needles, and knotter mechanisms coöperating with said needles for knotting the threads inserted by the needles at the mouth end of the bag to form a pair of draw strings and having as an element thereof cutters for severing the threads between the knotting mechanism and the needles after the knots have been formed by the knotter mechanisms.

41. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, and knotter mechanisms coöperating with said needles for knotting the threads inserted by the needles at the mouth end of the bag to form a pair of draw strings and having as an element thereof cutters for severing the threads between the knotting mechanism and the needles after the knots have been formed by the knotter mechanisms.

42. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, and knotter mechanisms coöperating with said needles for knotting the threads inserted by the needles at the mouth end of the bag to form a pair of draw strings and having as an element thereof cutters for severing the threads between the knotting mechanism and the needles after the knots have been formed by the knotter mechanisms.

43. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, and knotter mechanisms coöperating with said needles for knotting the threads inserted by the needles at the mouth end of the bag to form a pair of draw strings and having as an element thereof cutters for severing the threads between the knotting mechanism and the needles after the knots have been formed by the knotter mechanisms.

44. A bag stringer machine comprising thread carrying and thread inserting needles, a bag holding mechanism for successively positioning bags in the path of the needles for the insertion of threads therein, a bag feeding mechanism for successively mounting the bags upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotter end of one draw string with respect to the looped end of the other draw string, and cutters for severing the threads between the knotting mechanism and the needles after the knots have been formed by the knotter mechanisms.

45. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string, and cutters for severing the threads between the knotting mechanism and the needles after the knots have been formed by the knotted mechanisms.

46. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string, and cutters for severing the threads between the knotting mechanism and the needles after the knots have been formed by the knotter mechanisms.

47. A bag stringer machine comprising thread carrying and thread inserting needles, a bag holding mechanism for successively positioning bags in the path of the needles for the insertion of threads therein, a bag feeding mechanism for successively mounting the bags upon said holding mechanism, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string, and cutters for severing the threads between the knotting mechanisms and the needles after the knots have been formed by the knotter mechanisms.

48. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism, a bag edge positioning mechanism, having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string, and cutters for severing the threads between the knotting mechanism and the needles after the knots have been formed by the knotter mechanisms.

49. A bag stringing machine including thread carrying and inserting needles, a bag holding mechanism for successively positioning bags in the path of the needles for the insertion of threads therein, a bag feeding mechanism for feeding bags successively from a chain of bags to said bag holding mechanism and having as an element thereof cutters for disconnecting one bag of the chain from another, a bag edge positioning mechanism having as an element thereof a plurality of pushers for positioning the edges at the mouth end of the bag in parallelism with respect to each other when the bags are upon the holding mechanism, needle guide mechanisms for said needles, looper mechanisms coöperating with said needles, knotter mechanisms coöperating with said needles for knotting the threads inserted by the needles at the mouth end of the bag to form a pair of draw strings, and means coöperating with said looper mechanisms for reversing the position of the knotted end of one draw string with respect to the looped end of the other draw string, and cutters for severing the threads between the knotting mechanism and the needles after the knots have been formed by the knotter mechanisms.

50. In a bag stringing machine, a bag feeding mechanism comprising a reciprocatory carrier and further embodying pairs of pivoted grippers supported by the carrier for engaging opposite sides of the bag for pulling it down positively on the bag holding mechanism.

51. In a bag stringing machine, a bag feeding mechanism for successively feeding bags from a chain of bags comprising a vertically movable carrier, and cutters supported by the carrier and adapted to sever one bag from another to allow of the feeding of the bag.

52. In a bag stringing machine, a bag feeding mechanism for successively feeding bags from a chain of bags to a bag holding mechanism and comprising a vertically movable carrier, and cutters supported by the carrier and adapted to sever one bag from another to allow of the feeding of the bag and grippers supported by the carrier and adapted to grip the severed bag for carrying it to a support for stringing.

53. In a bag stringing machine, a bag feeding mechanism for successively feeding bags comprising a reciprocatory carrier, grippers supported by the carrier for engaging opposite sides of the bag for carrying it to a support for stringing, and bag mouth openers supported by the carrier and adapted to open the mouth end of the bag when carried by the grippers whereby the bag can be mounted onto the support.

54. In a bag stringing machine, a bag feeding mechanism for successively feeding bags comprising a reciprocatory carrier, grippers supported by the carrier and adapted to grip a bag for carrying it to a support for stringing, bag mouth openers supported by the carrier and adapted to open the mouth end of the bag when carried by the grippers whereby the bag can be mounted onto the support, and means for causing a slack in the bag to facilitate the opening of the mouth end of the bag by the openers.

55. In a bag stringing machine, a bag feeding mechanism for successively feeding bags from a chain of bags comprising a vertically movable carrier, cutters supported by the carrier and adapted to sever one bag from another to allow of the feeding of the bag and grippers supported by the carrier and adapted to grip the severed bag for carrying it to a support for stringing, bag mouth openers supported by the carrier and adapted to open the mouth end of the bag when carried by the grippers.

56. In a bag stringing machine, a bag feeding mechanism for successively feeding bags from a chain of bags comprising a vertically movable carrier, cutters supported by the carrier and adapted to sever one bag from another to allow of the feeding of the bag and grippers supported by the carrier and adapted to grip the severed bag for carrying it to a support and stringing and bag mouth openers supported by the carrier and adapted to open the mouth end of the bag when carried by the grippers, and means for causing a slack in the bag to faciliate the opening of the mouth end of the bag by the openers.

57. In a bag stringing machine, a bag feeding mechanism for successively feeding bags comprising a reciprocatory carrier, pair of laterally movable spring controlled housings, grippers mounted in the housings and adapted to grip a bag for carrying it to a support for stringing, and bag mouth openers supported by the housings and adapted to open the mouth end of the bag when carried by the grippers whereby the bag can be mounted on a bag holding mechanism.

58. In a bag stringing machine, a bag feeding mechanism for successively feeding bags comprising a reciprocatory carrier, a pair of laterally movable spring controlled housings, grippers mounted in the housings and adapted to grip a bag for carrying it to a support for stringing, bag mouth openers supported by the housings and adapted to open the mouth end of the bag when carried by the grippers whereby the bag can be mounted onto the support, and means for moving the housings toward each other to cause a slack in the bag to facilitate the opening of the mouth end of the bag by the openers.

59. In a bag stringing machine, a bag feeding mechanism for successively feeding bags from a chain of bags comprising a reciprocatory carrier, cutters supported by the carrier and adapted to sever one bag from another to allow of the feeding of the bag, a pair of laterally movable housings, grippers mounted in the housings and adapted to grip the severed bag for carrying it to a support for stringing, and bag mouth openers supported by the housings and adapted to open the mouth end of the bag when carried by the grippers whereby the bag can be mounted onto said support.

60. In a bag stringing machine, a bag feeding mechanism for successively feeding bags from a chain of bags comprising a reciprocatory carrier, cutters supported by the carrier and adapted to sever one bag from another to allow of the feeding of the bag, a pair of laterally movable housings, grippers mounted in the housings and adapted to grip the severed bag for carrying it to a support for stringing, bag mouth openers supported by the housings and adapted to open the mouth end of the bag when carried by the grippers whereby the bag can be mounted onto the support, and means for moving the housings toward each other to cause a slack in the bag to facilitate the opening of the mouth end of the bag by the openers.

61. In a bag stringing machine, a bag feeding mechanism for successively feeding bags from a chain of bags to a bag holding mechanism and comprising a vertically movable carrier, cutters supported by the carrier and adapted to sever one bag from another to allow of the feeding of the bag, and means supported by the carrier for actuating the cutters.

62. In a bag stringing machine, a bag feeding mechanism for successively feeding bags from a chain of bags to a support for stringing and comprising a vertically movable carrier, a pair of grippers supported by the carrier and adapted to grip the severed bag for carrying it to the support, cutters supported by the carrier and adapted to sever one bag from another to allow of the feeding of the bag, means supported by the carrier for actuating the cutters, means exteriorly of the carrier for operating the actuating means for the cutters, and means exteriorly of the carrier for operating the actuating means for the grippers.

63. In a bag stringing machine, a bag feeding mechanism for successively feeding bags from a chain of bags to a support for stringing and comprising a vertically movable carrier, cutters supported by the carrier and adapted to sever one bag from another to allow of the feeding of the bag and grippers supported by the carrier and adapted to grip the severed bag for carrying it to the support, means supported by the carrier for actuating the grippers, bag mouth openers and means supported by the carrier for actuating the openers.

64. In a bag stringing machine, the combination with a bag holding mechanism of a bag feeding mechanism for successively feeding bags to the bag holding mechanism and comprising a reciprocatory carrier, grippers supported by the carrier and adapted to grip a bag for carrying it to the bag holding mechanism, bag mouth openers supported by the carrier and adapted to open the mouth end of the bag when carried by the grippers whereby the bag can be mounted on the bag holding mechanism, means for causing a slack in the bag to facilitate the opening of the mouth end of the bag by the openers, means supported by the carrier for actuating the grippers, and means supported by the carrier for actuating the openers.

65. In a bag stringing machine, the combination with a bag holding mechanism of a bag feeding mechanism for successively feeding bags from a chain of bags to the bag holding mechanism and comprising a vertically movable carrier, cutters supported by the carrier and adapted to sever one bag from another to allow of the feeding of the bag and grippers supported by the carrier and adapted to grip the severed bag for carrying it to the bag holding mechanism and bag mouth openers supported by the carrier and adapted to open the mouth end of the bag when carried by the grippers, means supported by the carrier for actuating the grippers, means supported by the carrier for actuating the openers, means supported by the carrier for actuating the cutters.

66. In a bag stringing machine, the combination with a bag holding mechanism of a bag feeding mechanism for successively feeding bags to the bag holding mechanism comprising a reciprocatory carrier, a pair of laterally movable spring controlled housings, grippers mounted in the housings and adapted to grip a bag for carrying it to the bag holding mechanism, and bag mouth openers supported by the housings and adapted to open the mouth end of the bag when carried by the grippers whereby the bag can be mounted on the bag holding mechanism, and means supported by the housings for actuating the grippers.

67. In a bag stringing machine, the combination with a bag holding mechanism of a bag feeding mechanism for successively feeding bags to the bag holding mechanism comprising a reciprocatory carrier, a pair of laterally movable spring controlled housings, grippers mounted in the housings and adapted to grip a bag for carrying it to the bag holding mechanism, bag mouth openers supported by the housings and adapted to open the mouth end of the bag when carried by the grippers whereby the bag can be mounted on the bag holding mechanism, means for moving the housings toward each other to cause a slack in the bag to facilitate the opening of the mouth end of the bag by the openers, means supported by the housings for actuating the grippers, and means exteriorly of the carrier for operating the actuating means for the grippers.

68. In a bag stringing machine, the combination with a bag holding mechanism of a bag feeding mechanism for successively feeding bags from a chain of bags to the bag holding mechanism and comprising a reciprocatory carrier, cutters supported by the carrier and adapted to sever one bag from another to allow of the feeding of the bag, a pair of laterally movable housings, grippers mounted in the housings and adapted to grip the severed bag for carrying it to the bag holding mechanism, bag mouth openers supported by the housings and adapted to open the mouth end of the bag when carried by the grippers whereby the bag can be mounted on the bag holding mechanism, means for moving the housings toward each other to cause a slack in the bag to facilitate the opening of the mouth end of the bag by the openers, means supported by the housings for actuating the grippers, means exteriorly of the carrier for actuating the cutters, means supported by the carrier for actuating the openers, means exteriorly of the housings for operating the actuating means for the grippers, means exteriorly of the carrier for operating the actuating means for the cutters, and means exteriorly of the carrier for operating the actuating means for the openers.

69. In a bag stringing machine, the combination with a bag holding mechanism of a bag feeding mechanism for successively feeding bags to the bag holding mechanism comprising a reciprocatory carrier, a pair of laterally movable spring controlled housings, grippers mounted in the housings and adapted to grip a bag for carrying it to the bag holding mechanism, bag mouth openers supported by the housings and adapted to open the mouth end of the bag when carried by the grippers whereby the bag can be mounted on the bag holding mechanism, means for moving the housings toward each other to cause a slack in the bag to facilitate the opening of the mouth end of the bag by the openers, means supported by the housings for actuating the grippers, means exteriorly of the carrier for operating the actuating means for the grippers, means for reciprocating the carrier, and means for temporarily locking the carrier at the limit of its movement in either direction.

70. In a bag stringing machine, the combination with a bag holding mechanism of a bag feeding mechanism for successively feeding bags from a chain of bags to the bag holding mechanism and comprising a reciprocatory carrier, cutters supported by the carrier and adapted to sever one bag from another to allow of the feeding of the bag, a pair of laterally movable housings, grippers mounted in the housings and adapted to grip the several bags for carrying it to the bag holding mechanism, bag mouth openers supported by the housings and adapted to open the mouth end of the bag when carried by the grippers whereby the bag can be mounted on the bag holding mechanism, means for moving the housings toward each other to cause a slack in the bag to facilitate the opening of the mouth end of the bag by the openers, means supported by the housings for actuating the grippers, means exteriorly of the carrier for actuating the cutters, means supported by the carrier for actuating the openers, means exteriorly of the housings for operating the actuating means for the grippers, means exteriorly of the carrier for operating the actuating means for the cutters, means exteriorly of the carrier for operating the actuating means for the openers, means for reciprocating the carrier, and means for temporarily locking the carrier at the limit of its movement in either direction.

71. In a bag string machine, a bag feeding mechanism including bag mouth openers each comprising two pairs of pivoted supporting members, a pair of jaws pivoted to each of said members, and a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly.

72. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, means for shifting the supporting members, and means for shifting the actuating members.

73. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, and a spring controlled carrier for each pair of supporting members.

74. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, means for shifting the supporting members, means for shifting the actuating members, and a spring controlled carrier for each pair of supporting members.

75. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, a spring controlled carrier for each pair of supporting members, and a laterally movable housing for each of said carriers.

76. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, means for shifting the supporting members, means for shifting the actuating members, a spring controlled carrier for each pair of supporting members, and a laterally movable housing for each of said carriers.

77. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, a spring controlled carrier for each pair of supporting members, a laterally movable housing for each of said carriers, and means for moving the housings laterally.

78. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, means for shifting the supporting members, means for shifting the actuating members, a spring controlled carrier for each pair of supporting members, a laterally movable housing for each of said carriers, and means for moving the housings laterally.

79. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, a spring controlled carrier for each pair of supporting members, a laterally movable housing for each of said carriers, and a vertically movable supporting means for the housings.

80. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, means for shifting the supporting members, means for shifting the actuating members, a spring controlled carrier for each pair of supporting members, a laterally movable housing for each of said carriers, and a vertically movable supporting means for the housings.

81. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, a spring controlled carrier for each pair of supporting members, a laterally movable housing for each of said carriers, means for moving the housings laterally, and a vertically movable supporting means for the housings.

82. In a bag string machine, a bag feeding mechanism including bag mouth openers each comprising two pairs of pivoted supporting members, a pair of jaws pivoted to each of said members, a pivoted actuating member for each pair of jaws, said actuating members surrounding said jaws and adapted when moved in one direction to move the jaws toward each other for gripping the sides of a bag at the mouth end for opening the latter when the lower portions of the supporting members move outwardly, means for shifting the supporting members, means for shifting the actuating members, a spring controlled carrier for each pair of supporting members, a laterally movable housing for each of said carriers, means for moving the housings laterally, and a vertically movable supporting means for the housings.

83. A bag stringing machine including draw string inserting mechanisms, draw string reversing mechanisms for reversing the looped end of one string with respect to the knotted end of the other string, looper mechanisms coöperating with the draw string reversing mechanisms and string inserting mechanisms, and means for moving the draw string reversing mechanisms laterally against the pull of the looper mechanisms.

84. A bag stringing machine comprising the combination with means for connecting a pair of draw strings to the mouth end of a bag and with each of said strings having a looped and a knotted end, said means including looper mechanisms, of string reversing mechanisms coöperating with said looper mechanisms and reversing the looped end of one string with respect to the knotted end of the other string.

85. A bag stringing machine comprising means for connecting a pair of threads to and looping them at the mouth end of a bag to provide the latter with a pair of draw strings, a bag holding mechanism for positioning the bag to be acted on by said means, a bag feeding mechanism for mounting the bags upon said holding mechanism, and means for reversing the position of the looped end of one string with respect to the knotted end of the other string.

86. A bag stringing machine comprising means for connecting a pair of threads to and looping them at the mouth end of a bag to provide the latter with a pair of draw strings, a bag holding mechanism for positioning the bag to be acted on by said means, a bag feeding mechanism for mounting the bags upon said holding mechanism, means for reversing the position of the looped end of one string with respect to the knotted end of the other string after being connected to the bag, means for delivering the bag from the machine, and a bag receiving and pack forming mechanism coöperating with said delivering means.

87. A bag stringing machine comprising an intermittently operable bag holding member for positioning a bag to be strung, operating means therefor, a bag tensioning device for applying tension to the mouth end of the bag after the latter has been positioned by said member, an intermittently operable bag feeding mechanism for mounting bags upon said bag holding member, operating means for said feeding mechanism, a pusher mechanism for alining the edges at the mouth end of the bag when the latter is mounted on the holding member, operating means for the pusher mechanism, needle guides arranged in operative relation with respect to the said member and at each side thereof, shifting means for the guides, a pair of reciprocatory and transversely shiftable needles adapted to insert the threads in the bag at the mouth end thereof and further adapted to pass through the said guides, means for transversely shifting the needles to position them with respect to the guides, a pair of reciprocatory combined thread guides and thread and needle holders, a pair of loopers for the threads, a pair of thread knotters for knotting the threads after being looped, operating means therefor, means for reversing the position of the looped end of one string with respect to the knotted end of the other string after being connected to the bag, bag strippers for removing the bag from said member after the bag has been strung, operating means therefor, a combined bag turner and stretcher adapted to operate in conjunction with the strippers for turning and stretching the bag, operating means for the combined bag turner and stretcher, means for delivering the bags from the turner and stretcher, and a receiving and pack forming mechanism coöperating with the delivering means.

88. A bag stringing machine comprising means for holding a bag open under tension, duplex means for simultaneously inserting a pair of threads in and looping them at the mouth end of the bag, duplex means for simultaneously knotting the ends of each of the looped threads to form a pair of draw strings, and means for reversing the knotted end of one string with respect to the looped end of the other string.

89. A bag stringing machine comprising means for holding a bag open under tension, duplex means for simultaneously inserting a pair of threads in and looping them at the mouth end of the bag, duplex means for simultaneously knotting the ends of each of the looped threads to form a pair of draw strings and carrying thread cutting devices for severing the threads from said inserting means.

90. A bag stringing machine comprising means for simultaneously inserting a pair of threads in and looping them at the mouth end of a bag turned inside out, means for simultaneously knotting the ends of each of the looped threads to form a pair of draw strings, means for turning the bag right side out after the draw strings have been formed, and means for reversing the knotted end of one string with respect to the looped end of the other string before the bag is completely turned right side out.

91. A bag stringing machine comprising separate means operating upon opposite sides of a bag and each of which is transversely shiftable for inserting a pair of threads in and looping them at the mouth end of the bag turned inside out, separate means transversely shiftable with respect to said inserting means for knotting the ends of each of the looped threads to form a pair of draw strings, means for turning the bag rightside out after the draw strings have been formed, means for stretching the mouth end of the bag after the same has been turned rightside out, means for removing the bag from the stretching means and delivering it from the machine, and a bag receiving and pack forming mechanism coöperating with said delivery means.

92. A bag stringing machine comprising a pair of reciprocatory and transversely shiftable needles to insert threads at opposite sides of a bag mouth, said needles reciprocating in an opposite direction with respect to each other, means for shifting the needles transversely, causing the needles to alternately pass through each side of the bag mouth, a pair of shiftable and spring controlled needle guides for each needle, and an operative connection between the guides of each pair to simultaneously shift the guides of a pair with respect to each other.

93. A bag stringing machine comprising a pair of reciprocatory and transversely shiftable needles to insert threads at opposite sides of a bag mouth, said needles reciprocating in an opposite direction with respect to each other, means for shifting the needles transversely, causing the needles to alternately pass through each side of the bag mouth, a pair of shiftable and spring controlled needle guides for each needle, an operative connection between the guides of each pair to simultaneously shift the guides of a pair with respect to each other, and independent means for actuating each operative connection.

94. A bag stringer machine comprising means for supporting the bags for stringing, a bag feeding mechanism for mounting the bags onto said supporting means, and a bag edge positioning mechanism for positioning the edges at the mouth end of the bag in parallelism with respect to each other when the bags are on said supporting means.

95. A bag stringer machine comprising a bag holding mechanism having holding arms, a bag feeding mechanism for opening and then mounting bags upon the arms of the holding mechanism, and a bag edge positioning mechanism for positioning the edges at the mouth end of the bag in parallelism with respect to each other when the bags are upon the arms of the holding mechanism.

96. A bag stringer machine comprising means for supporting the bags for stringing, a bag feeding mechanism for mounting the bags onto said supporting means, a bag edge positioning mechanism for positioning the edges at the mouth end of the bag in parallelism with respect to each other when the bags are on said supporting means, means for connecting a pair of draw strings to the mouth end of the bag when the bag is upon said supporting means and with each of said strings having a looped and a knotted end, and string reversing means for reversing the looped end of one string with respect to the knotted end of the other string.

97. A bag stringer machine comprising a bag holding mechanism having holding arms, a bag feeding mechanism for opening and then mounting bags upon the arms of the holding mechanism, a bag edge positioning mechanism for positioning the edges at the mouth end of the bag in parallelism with respect to each other when the bags are upon the arms of the holding mechanism, means for connecting a pair of draw strings to the mouth ends of the bag when mounted upon said arms and with each of the strings having a looped and knotted end and means for reversing the looped end of one string with respect to the knotted end of the other string.

98. A bag stringing machine comprising means for supporting a bag in position for connecting thereto a pair of drawing strings to the mouth end of the bag and with each of said strings having a looped and a knotted end, means for mounting the bag inside out upon said supporting means, means for connecting the strings to the mouth end of the bag, means for reversing the looped end of one string with respect to the knotted end of the other string to prevent the strings locking when drawn when the bag is turned right side out, and means for turning the bag rightside out.

99. In a bag stringing machine, a bag feeding mechanism for successively feeding bags from a chain of bags to a bag holding mechanism and comprising a vertically movable carrier, a pair of inwardly-extending cutters supported at the top of the carrier and adapted to sever one bag from another to allow of the feeding of the bag, and means positioned exteriorly of the carrier and engaging with the cutters for actuating them.

100. In a bag stringing machine, a bag feeding mechanism for successively feeding bags from a chain of bags to a bag holding mechanism and comprising a vertically movable carrier, cutters supported at the top of the carrier and extending inwardly with respect thereto, each of said cutters provided with an angle shaped slotted extension, and means arranged exteriorly of the carrier for actuating the cutters whereby said angular extensions will cause the cutters to move together to sever one bag from another to allow of the feeding of the bag.

In testimony whereof I affix my signature in presence of two witnesses.

JOHN T. DALTON.

Witnesses:
W. H. CROWELL,
ALLEN BRYANT.